United States Patent
Matono et al.

(10) Patent No.: US 7,061,719 B2
(45) Date of Patent: Jun. 13, 2006

(54) THIN FILM MAGNETIC HEAD AND METHOD OF MANUFACTURING THE SAME

(75) Inventors: Naoto Matono, Saku (JP); Norikazu Ota, Tokyo (JP); Yuichi Watabe, Tokyo (JP); Susumu Aoki, Tokyo (JP); Yasuyuki Notsuke, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 197 days.

(21) Appl. No.: 10/673,333

(22) Filed: Sep. 30, 2003

(65) Prior Publication Data

US 2004/0061988 A1    Apr. 1, 2004

(30) Foreign Application Priority Data

Oct. 1, 2002  (JP)  ............................. 2002-288872
Oct. 17, 2002 (JP)  ............................. 2002-302982

(51) Int. Cl.
*G11B 5/147* (2006.01)

(52) U.S. Cl. ...................................................... 360/126

(58) Field of Classification Search ................. 360/126
See application file for complete search history.

(56) References Cited

U.S. PATENT DOCUMENTS 4,745,506 A * 5/1988 Nakamura et al. .......... 360/123
4,974,110 A * 11/1990 Kanamine et al. .......... 360/126
6,693,768 B1 * 2/2004 Crue et al. .................. 360/126
6,757,141 B1 * 6/2004 Santini et al. .............. 360/317
2002/0036871 A1 * 3/2002 Yano et al. .................. 360/317

FOREIGN PATENT DOCUMENTS

| JP | A 6-180810   | 6/1994 |
| JP | A 6-274811   | 9/1994 |
| JP | A 2002-197611 | 7/2002 |
| JP | A 2002-197615 | 7/2002 |

* cited by examiner

*Primary Examiner*—A. J. Heinz
(74) *Attorney, Agent, or Firm*—Oliff & Berridge, PLC

(57) ABSTRACT

A thin film magnetic head which has a thin film coil for generating a magnetic flux and a magnetic pole layer for emitting the magnetic flux generated by the thin film coil toward a recording medium. The magnetic pole layer having a stacked structure including a main magnetic pole layer, an auxiliary magnetic pole layer, and a non-magnetic pole layer. The main magnetic pole layer is disposed so as to be exposed in a recording medium facing surface which faces the recording medium. The auxiliary magnetic pole layer has one end face recessed from the recording medium facing surface and which is disposed so as to face a part of the main magnetic pole layer. The non-magnetic layer is disposed so as to be sandwiched between the main magnetic pole layer and the auxiliary magnetic pole layer.

22 Claims, 31 Drawing Sheets

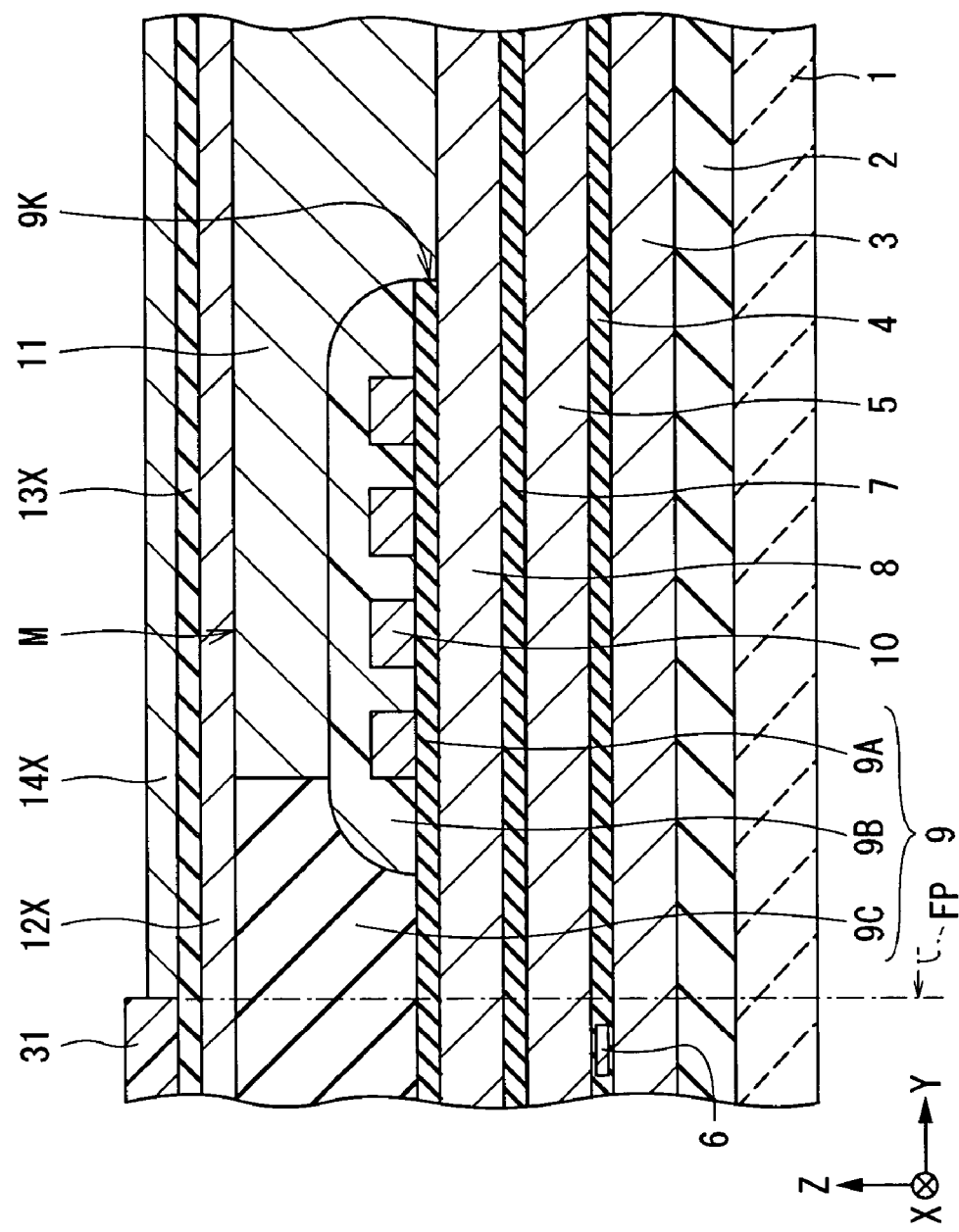
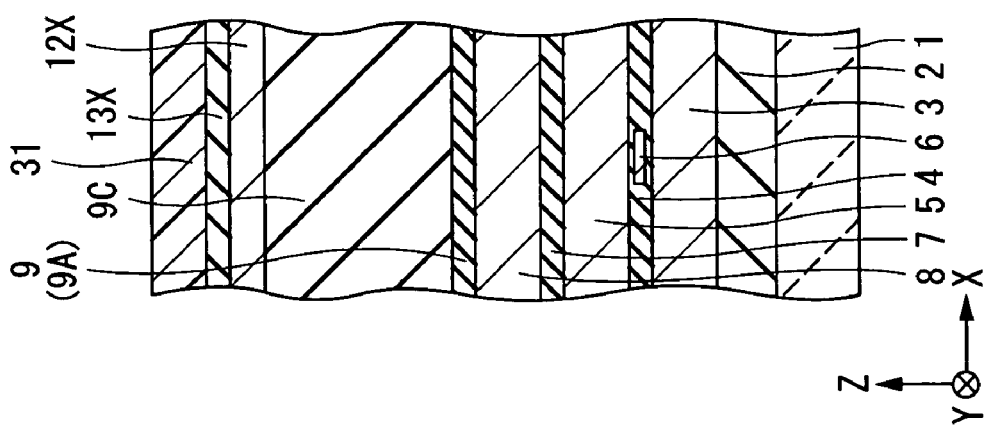
FIG. 6B
FIG. 6A

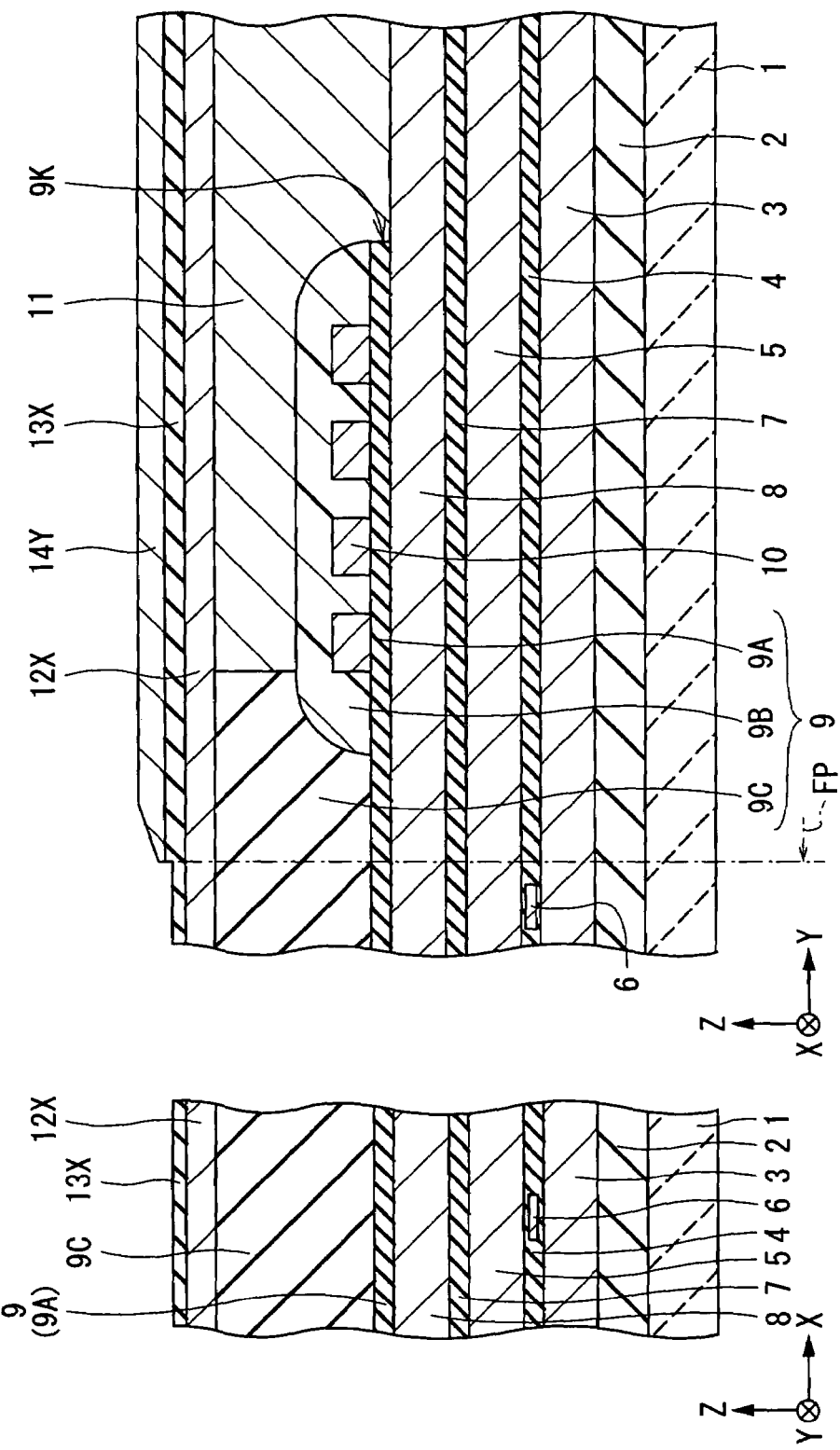

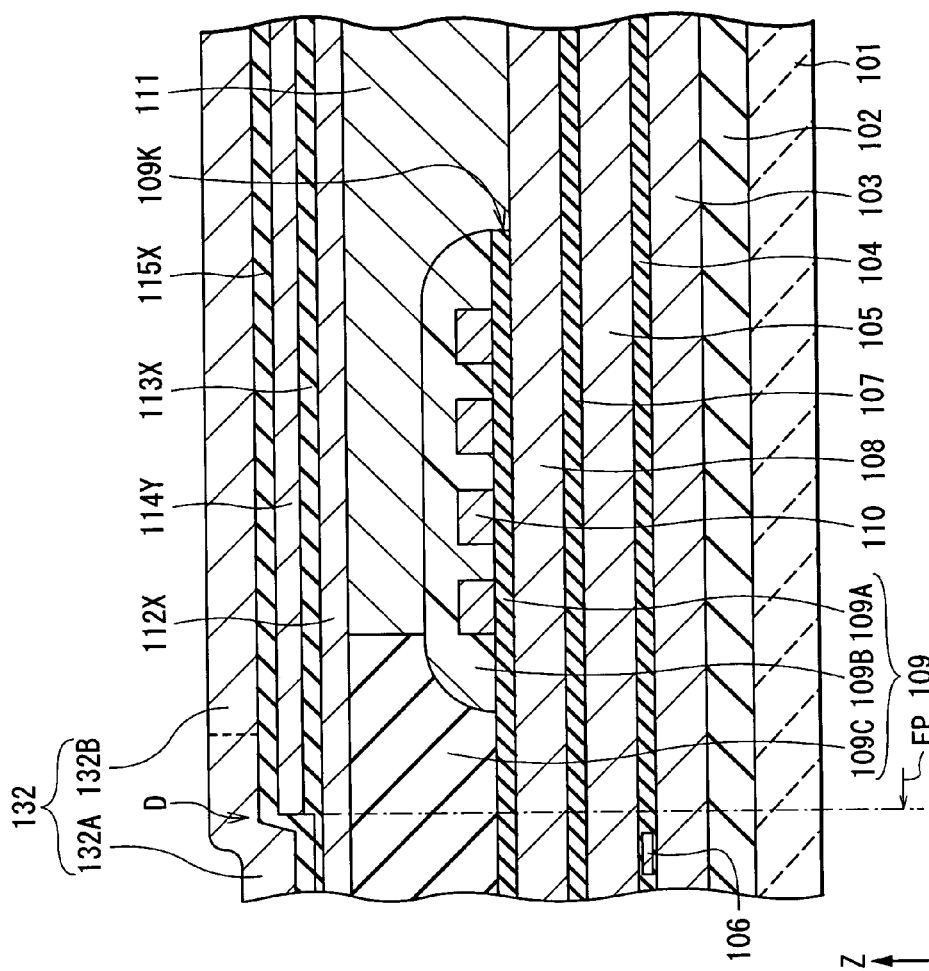
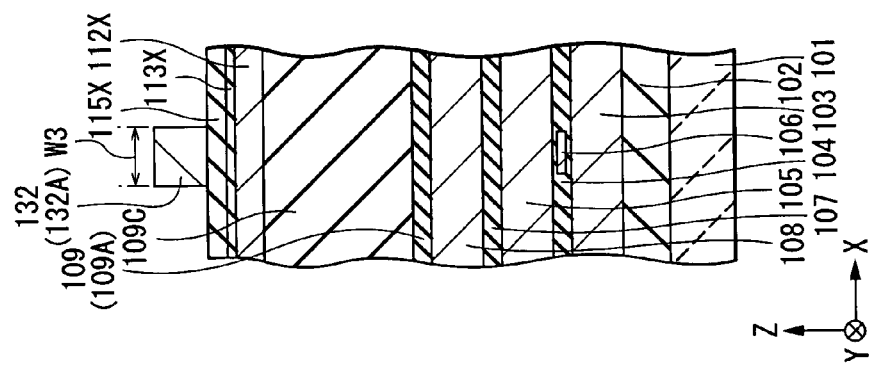
FIG. 27B
FIG. 27A

THIN FILM MAGNETIC HEAD AND METHOD OF MANUFACTURING THE SAME

BACKGROUND OF THE INVENTION

1. Field of the Invention

The present invention relates to a thin film magnetic head having at least an inductive magnetic transducer for recording and a method of manufacturing the same.

2. Description of the Related Art

In recent years, improvement in performance of a thin film magnetic head is demanded as the areal density of a magnetic recording medium (hereinbelow, simply called "recording medium") such as a hard disk increases. As magnetic recording methods applied to a thin film magnetic head, for example, a longitudinal recording method in which the orientation of a signal magnetic field is set to an in-plane direction (longitudinal direction) of a recording medium and a perpendicular recording method in which the orientation of a signal magnetic field is set to a direction which perpendicularly crosses the face of a recording medium are known. At present, the longitudinal recording method is widely used. However, when a market trend accompanying improvement in areal density is considered, it is assumed that, in place of the longitudinal recording method, the perpendicular recording method will be regarded as a promising method in future for the following reason. The perpendicular recording method has advantages such that high linear recording density can be assured and a recorded recording medium is not easily influenced by thermal fluctuations.

As recording modes using the perpendicular recording method, for example, the following modes are proposed; (1) a mode of using a head (ring-type head) facing each other with a gap on one end side and are magnetically connected to each other on the other end side and a recording medium in which a main component has a single-layer configuration, and (2) a mode of using a head (single-pole type head) disposed perpendicular to a recording medium and a recording medium in which a main component has a two-layer configuration. Out of the modes, the mode of using the combination of the single-pole type head and the recording medium of the two-layer structure has a remarkably excellent resistance to thermal fluctuations. Consequently, attention is being paid to the mode as a mode which can realize improvement in the performance of the thin film magnetic head.

To improve the recording performance of the thin film magnetic head of the perpendicular recording method, for example, a sufficient amount of a magnetic flux has to be supplied to a main magnetic pole layer as the main path of a magnetic flux in the single-pole type head in order to assure intensity of a magnetic field for recording (perpendicular magnetic field) and to assure a stabilized recording operation.

A thin film magnetic head capable of addressing the demand is considered to have, for example, a main magnetic pole layer, an auxiliary magnetic pole layer of which one end face is recessed from an air bearing surface and which is disposed so as to face a part of the main magnetic pole layer, and a non-magnetic layer disposed so as to be sandwiched between the main magnetic pole layer and the auxiliary magnetic pole layer. By the main magnetic pole layer, non-magnetic layer, and auxiliary magnetic pole layer, a stacked structure is constructed. In the thin film magnetic head, in spite of the fact that the auxiliary magnetic pole layer is completely isolated from the main magnetic pole layer via the non-magnetic layer, the auxiliary magnetic pole layer plays the role of supplying a magnetic flux to the main magnetic pole layer in an auxiliary manner. Consequently, as compared with the case where only the main magnetic pole layer is provided and the auxiliary magnetic pole layer is not provided, an amount of the magnetic flux supplied to the main magnetic pole layer increases.

In the thin film magnetic head, for a reason of a manufacturing process, the front end position of the auxiliary magnetic pole layer (position on the side close to the air bearing surface) inevitably coincides with the flare point. The flare point is the position from which the width of the magnetic pole layer (including the main magnetic pole layer) as a path of a magnetic flux increases from a uniform width specifying the recording track width of a recording medium to a width larger than the uniform width. The flare point is one of important factors determining the recording performance of a thin film magnetic head.

However, when the method of manufacturing a thin film magnetic head introduced above is used, although there is an advantage from the viewpoint of supplying the magnetic flux to the main magnetic pole layer on the basis of the existence of the auxiliary magnetic pole layer, in some cases, it is feared that a normal recording operation is disturbed. From the viewpoint of properly setting the flare point, when the auxiliary magnetic pole layer is set too close to the air bearing surface, the perpendicular magnetic field distribution on the trailing side of the main magnetic pole layer may be disturbed by the influence of the magnetic flux concentrated on the area at the tip of the auxiliary magnetic pole layer.

To improve the recording performance of the thin film magnetic head of the perpendicular recording method, in addition to supply of a sufficient amount of the magnetic flux to the main magnetic pole layer as described above, there are mainly the following two important points in design of the main magnetic pole layer.

First, to increase the recording density, it is necessary to form at high precision a portion having a very small uniform width specifying the recording track width of a recording medium (hereinbelow, called "track width specifying portion") in the main magnetic pole layer. Hitherto, the main magnetic pole layer is formed by, for example, forming a magnetic layer and patterning the magnetic layer so as to have a predetermined pattern shape by using the photolithography technique, etching technique, and the like. At the time of forming the main magnetic pole layer, high processing precision is requested to form the track width specifying portion.

Second, in order to suppress magnetic saturation and to supply a sufficient amount of a magnetic flux to the track width specifying portion, it is necessary to set a portion having a width larger than that of the track width specifying portion (hereinbelow, called "magnetic flux supply portion") in the main magnetic pole layer close to the air bearing surface to a degree that excessive emission of the magnetic flux is not induced. The position of the front edge of the magnetic flux supply portion (the edge on the side close to the air bearing surface) specifies the position from which the main magnetic pole layer is widened from the track width specifying portion to the magnetic flux supply portion and is generally called "flare point". The flare point is the position where the magnetic flux flowing from the magnetic flux supply portion to the track width specifying portion in the main magnetic pole layer is converged. From the viewpoint of supplying the magnetic flux into the track width specifying portion, the flare point is one of important factors to determine the recording performance of a thin film magnetic head.

The conventional method of manufacturing a thin film magnetic head has, however, a problem that, in spite of the necessity of high precision in formation of the track width specifying portion and proper setting of the flare point in order to improve the recording performance, it is difficult to realize both of the high precision and the proper setting for the following reason.

For example, at the time of forming a photoresist pattern necessary to form a main magnetic pole layer by selectively exposing a photoresist by using the photolithography technique, if the exposure pattern includes both of a very narrow area corresponding to the track width specifying portion and a wide area corresponding to the magnetic flux supply portion, the very narrow area and its peripheral area are excessively exposed due to the influence of reflection light generated at the time of exposure and there is a case that the exposed area expands. When the exposed area expands, precision in formation of the photoresist pattern deteriorates so that it becomes difficult to form the track width specifying portion at high precision. Moreover, the problem of the precision in formation of the track width specifying portion becomes more conspicuous the closer the flare point to the air bearing surface is and the higher the occupation ratio of the wide area in the very narrow area is. In the conventional techniques, therefore, the high precision in formation of the track width specifying portion and the proper setting of the flare point have the relation of a trade-off. To prove practical use and future potential of the perpendicular recording method and spread a hard disk drive of a large capacity using the method, it is urgently needed to solve the problems and realize improvement in the recording performance.

There are already some prior arts directed to improve the recording performance of a thin film magnetic head of the perpendicular recording method.

Concretely, first, Japanese Unexamined Patent Publication (JP-A) No. 6-274811 discloses a method of realizing high-density recording by properly selecting a material of a head. Second, JP-A No. 2002-197611 discloses a method of forming a main magnetic pole layer by plating so as to have a predetermined shape by properly setting the shape of a yoke layer. Third, JP-A No. 2002-197615 discloses a method of improving precision in formation of a main magnetic pole layer by forming the main magnetic pole layer on a flat surface. Fourth, JP-A No. 6-180810 discloses a method of improving signal quality of a reproduction waveform by avoiding the phenomenon of unnecessary concentration of a magnetic flux by notching a portion facing a main magnetic pole in a return yoke layer.

From the above-described methods, however, no guideline is obtained regarding realization of high precision in formation of a main magnetic pole layer and proper setting of a flare point which are pointed out in the above.

SUMMARY OF THE INVENTION

The present invention has been achieved in consideration of such problems and its first object is to provide a thin film magnetic head capable of assuring a normal recording operation by stabilizing a perpendicular magnetic field distribution.

A second object of the invention is to provide a method of easily manufacturing a thin film magnetic head of the invention having an auxiliary magnetic pole layer and capable of assuring a normal recording operation.

A third object of the invention is to provide a thin film magnetic head of improved recording performance.

A fourth object of the invention is to provide a method of manufacturing a thin film magnetic head capable of realizing both high precision in formation of a main magnetic pole layer and proper setting of a flare point and contributing to improvement in recording performance from a manufacturing viewpoint.

According to a first aspect of the invention, a thin film magnetic head comprises: a thin film coil for generating a magnetic flux; and a magnetic pole layer for emitting the magnetic flux generated by the thin film coil toward a recording medium. The magnetic pole layer has a stacked structure including a main magnetic pole layer disposed so as to be exposed in a recording medium facing surface which faces the recording medium, an auxiliary magnetic pole layer of which one end face is recessed from the recording medium facing surface and which is disposed so as to face a part of the main magnetic pole layer, and a non-magnetic layer disposed so as to be sandwiched between the main magnetic pole layer and the auxiliary magnetic pole layer. The auxiliary magnetic pole layer includes a film-thickness-changing portion of which film thickness gradually degreases from a position backward of the one end face recessed from the recording medium facing surface toward the one end face.

In the thin film magnetic head according to the first aspect of the invention, the auxiliary magnetic pole layer is constructed so as to include the film-thickness-changing portion of which film thickness gradually degreases from a position backward of the one end face recessed from the recording medium facing surface toward the one end face. Consequently, the area of the one end face is smaller as compared with the case where the whole auxiliary magnetic pole layer has a constant film thickness. Also in the case where the auxiliary magnetic pole layer is set close to the recording medium facing surface, the influence of the magnetic flux concentrated on and around the front end of the auxiliary magnetic pole layer is reduced. Thus, an adverse influence on the perpendicular magnetic field distribution, caused by the magnetic flux flowing in the auxiliary magnetic pole layer is suppressed.

A method of manufacturing the thin film magnetic head according to the first aspect of the invention comprises: a thin film coil for generating a magnetic flux; and a magnetic pole layer for emitting the magnetic flux generated by the thin film coil toward a recording medium, the magnetic pole layer having a stacked structure including a main magnetic pole layer disposed so as to be exposed in a recording medium facing surface which faces the recording medium, an auxiliary magnetic pole layer of which one end face is recessed from the recording medium facing surface and which is disposed so as to face a part of the main magnetic pole layer, and a non-magnetic layer disposed so as to be sandwiched between the main magnetic pole layer and the auxiliary magnetic pole layer. A step of forming the auxiliary magnetic pole layer includes the steps of: forming a first precursor auxiliary magnetic pole layer pattern as a preparation layer of the auxiliary magnetic pole layer, so as to have an end face including the one end face; forming a second precursor auxiliary magnetic pole layer pattern so as to include a portion of which film thickness gradually degreases from a position backward of the end face recessed from the recording medium facing surface toward the end face by selectively etching a portion close to the end face in the first precursor auxiliary magnetic pole layer pattern; and forming the auxiliary magnetic pole layer so as to include the one end face and a film-thickness-changing portion of which film thickness gradually decreases from a position backward of the one end face recessed from the recording medium facing surface toward the one end face by patterning the second precursor auxiliary magnetic pole layer pattern by etching while using a mask for etching.

In the method of manufacturing the thin film magnetic head according to the first aspect of the invention, a first precursor auxiliary magnetic pole layer pattern as a preparation layer of the auxiliary magnetic pole layer is formed so as to have an end face including the one end face. Subsequently, a second precursor auxiliary magnetic pole layer pattern is formed so as to include a portion of which film thickness gradually degreases from a position backward of the end face recessed from the recording medium facing surface toward the end face by selectively etching a portion close to the end face in the first precursor auxiliary magnetic pole layer pattern. Finally, by patterning the second precursor auxiliary magnetic pole layer pattern by etching while using a mask for etching, the auxiliary magnetic pole layer is formed so as to include the one end face and a film-thickness-changing portion of which film thickness gradually decreases from a position backward of the one end face recessed from the recording medium facing surface toward the one end face.

A thin film magnetic head according to a second aspect of the invention comprises: a thin film coil for generating a magnetic flux; and a magnetic pole layer for emitting the magnetic flux generated by the thin film coil toward a recording medium, the magnetic pole layer having a plane shape including a uniform width area having a uniform width which specifies a recording track width of a recording medium and a wide area which is wider than the uniform width area and having a stacked structure including: a main magnetic pole layer disposed so that one end face is exposed in a recording medium facing surface which faces the recording medium; an auxiliary magnetic pole layer of which one end face is recessed from the recording medium facing surface and which is disposed so as to face a part of the main magnetic pole layer; and a non-magnetic layer disposed so as to be sandwiched between the main magnetic pole layer and the auxiliary magnetic pole layer. The main magnetic pole layer in the magnetic pole layer includes a first main magnetic pole layer portion extended with a uniform width from the recording medium facing surface in a direction apart from the surface and a second main magnetic pole layer portion connected to the rear end of the first main magnetic pole layer portion and having a width larger than that of the first main magnetic pole layer portion. A width increase position from which the width of the magnetic pole layer increases from the uniform width area to the wide area is specified by a connection position of the first and second main magnetic pole layer portions. The second main magnetic pole layer portion in the main magnetic pole layer has a main magnetic pole wide portion of which width gradually increases from the width increase position in a direction apart from the width increase position.

In the thin film magnetic head according to the second aspect of the invention, when a magnetic flux flows from the second main magnetic pole layer portion to the first main magnetic pole layer portion in the main magnetic pole layer, the magnetic flux flows into the first main magnetic pole layer portion while being gradually converged as the main magnetic pole wide portion in the second main magnetic pole layer portion is narrowed.

A method of manufacturing a thin film magnetic head according to the second aspect of the invention comprises: a thin film coil for generating a magnetic flux, a magnetic pole layer for emitting the magnetic flux generated by the thin film coil toward a recording medium, the magnetic pole layer having a plane shape including a uniform width area having a uniform width which specifies a recording track width of a recording medium and a wide area which is wider than the uniform width area and having a stacked structure pattern including: a main magnetic pole layer disposed so that one end face is exposed in a recording medium facing surface which faces the recording medium; an auxiliary magnetic pole layer of which one end face is recessed from the recording medium facing surface and which is disposed so as to face a part of the main magnetic pole layer; and a non-magnetic layer disposed so as to be sandwiched between the main magnetic pole layer and the auxiliary magnetic pole layer; and a non-magnetic mask layer patterned so as to be adjacent to the magnetic pole layer. A step of forming the magnetic pole layer includes: a first step of forming and stacking a precursor main magnetic pole layer as a preparation layer of the main magnetic pole layer and a precursor non-magnetic layer as a preparation layer of the non-magnetic layer in accordance with this order; a second step of forming a precursor auxiliary magnetic pole layer pattern defining the wide area, as a preparation layer of the auxiliary magnetic pole layer in an area corresponding to the wide area on the precursor non-magnetic layer; a third step of forming a precursor non-magnetic mask layer as a preparation layer of the non-magnetic mask layer on the precursor auxiliary magnetic pole layer pattern and its peripheral area; a fourth step of forming a mask layer in an area corresponding to both of the uniform width area and the wide area on the precursor non-magnetic mask layer; a fifth step of forming the non-magnetic mask layer defining the uniform width area by patterning the precursor non-magnetic mask layer by etching by using the mask layer and, subsequently, forming a precursor non-magnetic layer pattern by patterning the precursor non-magnetic layer by etching by using both of the non-magnetic mask layer and the precursor auxiliary magnetic pole layer pattern as a mask; and a sixth step of forming the auxiliary magnetic pole layer by patterning the precursor auxiliary magnetic pole layer pattern by etching using the non-magnetic mask layer, subsequently, forming the non-magnetic layer by etching the precursor non-magnetic layer pattern together with the precursor main magnetic pole layer by using the non-magnetic mask layer, the precursor auxiliary magnetic pole layer pattern, and the precursor non-magnetic layer pattern as a mask to selectively etch both wings of the precursor non-magnetic layer pattern to be recessed so as to be gradually widened, and forming the main magnetic pole layer by patterning the precursor main magnetic pole layer in accordance with a change in the shape of the precursor non-magnetic layer pattern.

In the method of manufacturing the thin film magnetic head according to the second aspect of the invention, first, in the first step, a precursor main magnetic pole layer as a preparation layer of the main magnetic pole layer and a precursor non-magnetic layer as a preparation layer of the non-magnetic layer are formed and stacked in accordance with this order. Subsequently, in the second step, a precursor auxiliary magnetic pole layer pattern defining the wide area is formed as a preparation layer of the auxiliary magnetic pole layer in an area corresponding to the wide area on the precursor non-magnetic layer. In the third step, a precursor non-magnetic mask layer is formed as a preparation layer of the non-magnetic mask layer on the precursor auxiliary magnetic pole layer pattern and its peripheral area. In the fourth step, a mask layer is formed in an area corresponding to both of the uniform width area and the wide area on the precursor non-magnetic mask layer. In the fifth step, the non-magnetic mask layer defining the uniform width area is formed by patterning the precursor non-magnetic mask layer by etching by using the mask layer and, subsequently, a precursor non-magnetic layer pattern is formed by patterning the precursor non-magnetic layer by etching by using both of the non-magnetic mask layer and the precursor auxiliary magnetic pole layer pattern as a mask. In the sixth step, the auxiliary magnetic pole layer is formed by patterning the precursor auxiliary magnetic pole layer pattern by etching using the non-magnetic mask layer. Subsequently, the non-magnetic layer is formed by etching the precursor non-magnetic layer pattern together with the precursor main magnetic pole layer by using the non-magnetic mask layer, the precursor auxiliary magnetic pole layer pattern, and the precursor non-magnetic layer pattern as a mask to selectively etch both wings of the precursor non-magnetic layer pattern to be recessed so as to be gradually widened. The main magnetic pole layer is formed by patterning the precursor main magnetic pole layer in accordance with a change in the shape of the precursor non-magnetic layer pattern. In such a manner, the magnetic pole layer having the stacked structure including the main magnetic pole layer, non-magnetic layer, and auxiliary magnetic pole layer is formed.

In the thin film magnetic head according to the first aspect of the invention, preferably, the auxiliary magnetic pole layer further includes a film thickness uniform portion connected to the rear end of the film-thickness-changing portion and having a uniform film thickness, and a ratio of the film thickness of the one end face in the film-thickness-changing portion to the film thickness of the film thickness uniform portion lies within a range from 0 to 0.8. In this case, more preferably, the one end face of the auxiliary magnetic pole layer has a uniform film thickness and the ratio of the film thickness lies within the range from 0 to 0.5.

In the thin film magnetic head according to the first aspect of the invention, preferably, the film-thickness-changing portion has a slope which is positioned in correspondence with an area of which film thickness decreases, and an angle formed by the slope and an plane extended from the auxiliary magnetic pole layer lies within the range from 15 degrees to 75 degrees.

In the thin film magnetic head according to the first aspect of the invention, the magnetic pole layer may emit a magnetic flux for magnetizing the recording medium in the direction which crosses perpendicular to the surface of the recording medium.

In the method of manufacturing a thin film magnetic head according to the first aspect of the invention, preferably, the auxiliary magnetic pole layer further includes a film thickness uniform portion connected to the rear end of the film-thickness-changing portion and having a uniform film thickness, and a ratio of the film thickness of the one end face in the film-thickness-changing portion to the film thickness of the film thickness uniform portion lies within a range from 0 to 0.8.

In the method of manufacturing a thin film magnetic head according to the first aspect of the invention, preferably, the first precursor auxiliary magnetic pole layer pattern is formed by growing a plating film.

In the method of manufacturing a thin film magnetic head according to the first aspect of the invention, preferably, the first precursor auxiliary magnetic pole layer pattern is etched while being irradiated with an ion beam from a direction at an angle in a range of plus or minus 10 degrees of 35 degrees from a direction orthogonal to a plane extended from the first precursor auxiliary magnetic pole layer pattern by using ion milling.

In the thin film magnetic head according to the second aspect of the invention, preferably, an end face on the side close to the recording medium facing surface of the main magnetic pole wide portion is gradually inclined with distance from the first main magnetic pole layer portion.

In the thin film magnetic head according to the second aspect of the invention, preferably, the auxiliary magnetic pole layer includes: a first auxiliary magnetic pole layer portion extended with a uniform width from the connection position in the same direction as the direction of extension of the first main magnetic pole layer portion; and a second auxiliary magnetic pole layer portion connected to the rear end of the first auxiliary magnetic pole layer portion and having a width larger than that of the first auxiliary magnetic pole layer portion, and the second auxiliary magnetic pole layer portion in the auxiliary magnetic pole layer has an auxiliary magnetic pole wide portion which is gradually widened from the connection position of the first and second auxiliary magnetic pole layer portions with distance from the position.

In the thin film magnetic head according to the second aspect of the invention, preferably, a non-magnetic mask layer having a plane shape corresponding to a body obtained by combining the first main magnetic pole layer portion, the first auxiliary magnetic pole layer portion, and the second auxiliary magnetic pole layer portion is adjacent to the magnetic pole layer.

In the thin film magnetic head according to the second aspect of the invention, preferably, the main magnetic pole layer is made of a material having a saturated magnetic flux density equal to or higher than a saturated magnetic flux density of the auxiliary magnetic pole layer.

In the thin film magnetic head according to the second aspect of the invention, the magnetic pole layer may emit a magnetic flux for magnetizing the recording medium in a direction orthogonal to the surface of the recording medium.

In the method of manufacturing a thin film magnetic head according to the second aspect of the invention, preferably, in the first step, the precursor non-magnetic layer is formed by using a material of which etching rate is lower than that of the precursor auxiliary magnetic pole layer pattern and, in the third step, the precursor non-magnetic mask layer is formed by using a material of which etching rate is lower than that of each of the precursor auxiliary magnetic pole layer pattern and the precursor main magnetic pole layer.

In the method of manufacturing a thin film magnetic head according to the second aspect of the invention, preferably, in the fourth step, the mask layer is formed and a portion corresponding to the uniform width area in the mask layer is selectively etched in the width direction, thereby narrowing the portion corresponding to the uniform width area and, in the fifth step, an etching process is performed by using the mask layer having the narrowed portion corresponding to the uniform width area. In this case, preferably, the mask layer is etched while being irradiated with an ion beam from a direction at an angle in a range of plus or minus 5 degrees of about 70 degrees from a direction orthogonal to a plane extended from the mask layer by using ion milling.

In the method of manufacturing a thin film magnetic head according to the second aspect of the invention, preferably, in the fourth step, the mask layer is formed by growing a plating film.

In the method of manufacturing a thin film magnetic head according to the second aspect of the invention, preferably, in the sixth step, an etching process is performed while being irradiated with an ion beam from a direction at an angle in a range of plus or minus 10 degrees of 35 degrees from a direction orthogonal to a plane extended from the precursor auxiliary magnetic pole layer pattern by using ion milling. In this case, it is also possible to form the main magnetic pole layer and, after that, perform an etching process on a portion corresponding to the uniform width area, in the main magnetic pole layer by irradiating the portion with an ion beam from a direction at an angle in a range of plus or minus 10 degrees of 60 degrees from a direction orthogonal to a plane extended from the main magnetic pole layer by using ion milling.

Other and further objects, features and advantages of the invention will appear more fully from the following description.

BRIEF DESCRIPTION OF THE DRAWINGS

FIGS. 6A and 6B are cross sections for explaining a process in a method of manufacturing the thin film magnetic head according to the first embodiment of the invention.

FIGS. 7A and 7B are cross sections showing a process subsequent to FIGS. 6A and 6B.

FIGS. 27A and 27B are cross sections showing a process subsequent to FIGS. 26A and 26B.

DETAILED DESCRIPTION OF THE PRFERRED EMBODIMENTS

Embodiments of the invention will now be described in detail hereinbelow with reference to the drawings.

First Embodiment

Figures 1A, 1B:
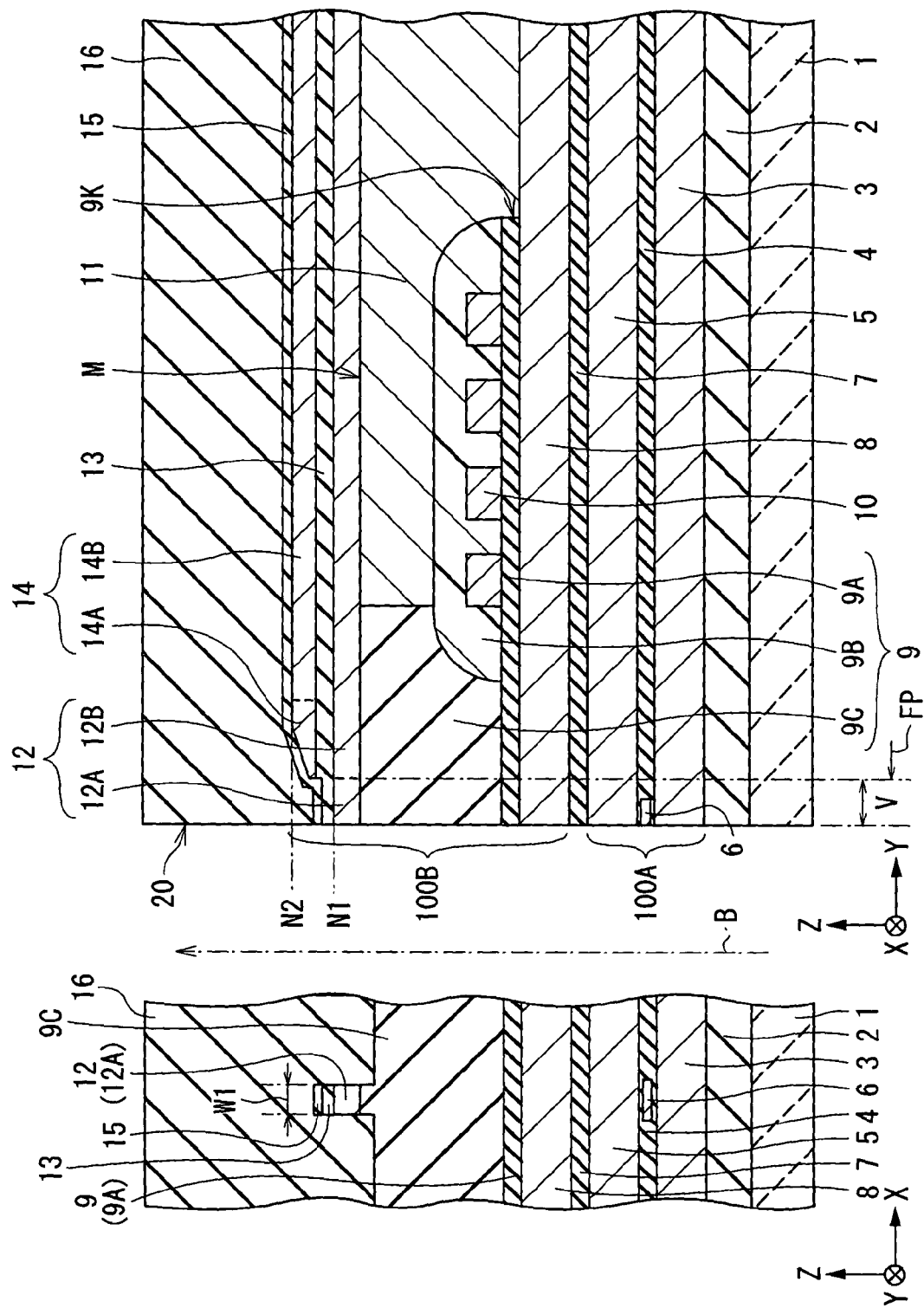
FIGS. 1A and 1B are cross sections showing a sectional configuration of a thin film magnetic head according to a first embodiment of the invention.
Figure 2:
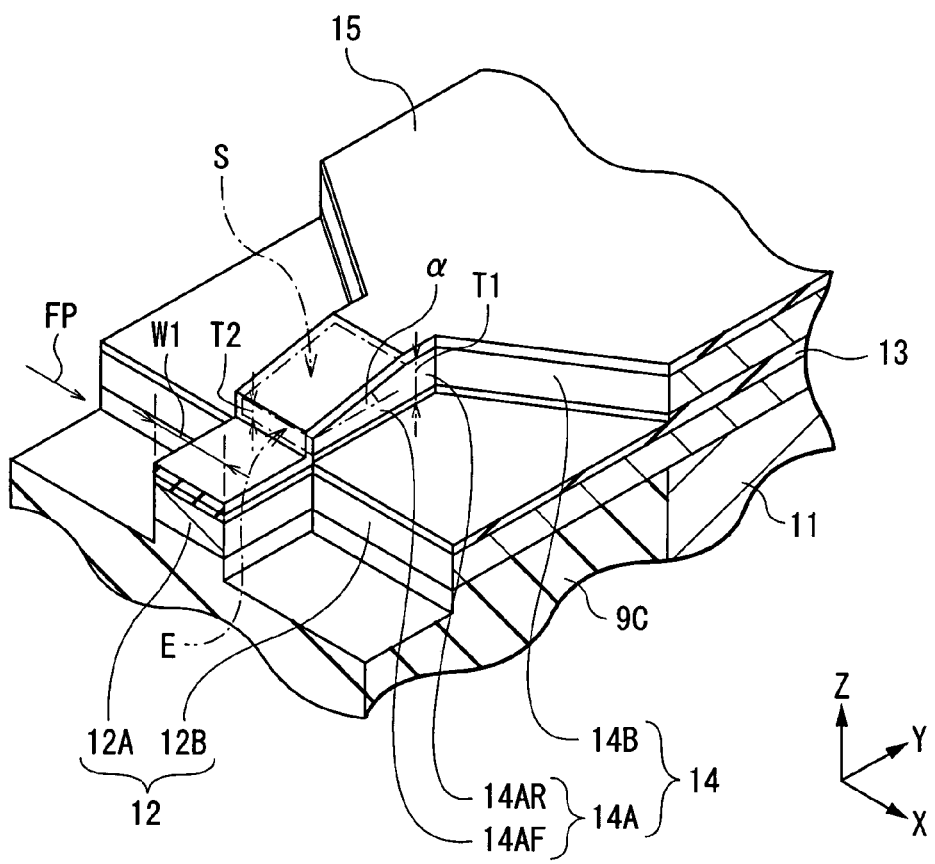
FIG. 2 is an enlarged perspective view of main components of the thin film magnetic head shown in FIGS. 1A and 1B.
Figure 3:
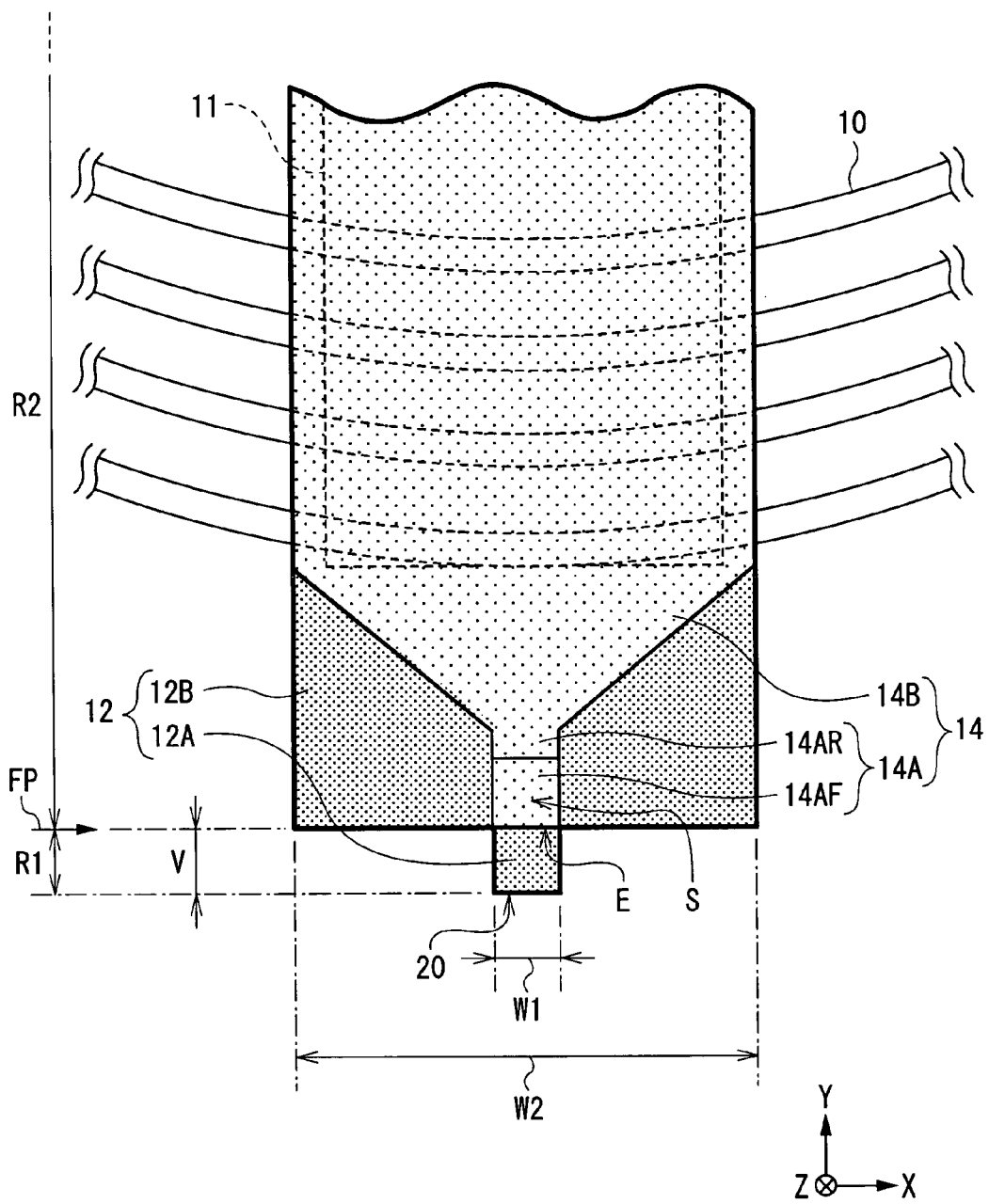
FIG. 3 is an enlarged plan view showing the configuration of main components of the thin film magnetic head illustrated in FIGS. 1A and 1B.

First, the configuration of a thin film magnetic head according to a first embodiment of the invention will be described with reference to FIGS. 1A and 1B to FIG. 3. FIGS. 1A and 1B show sectional configurations of a thin film magnetic head. FIG. 1A shows a section parallel to an air bearing surface 20 and FIG. 1B shows a section perpendicular to the air bearing surface 20. FIG. 2 is an enlarged perspective view showing the configuration of a main component of the thin film magnetic head illustrated in FIGS. 1A and 1B. FIG. 3 is an enlarged plan view showing the configuration of a main component of the thin film magnetic head. An upward arrow B shown in FIGS. 1A and 1B indicates the travel direction of a recording medium (not shown) relative to the thin film magnetic head.

In the following description, the distance in the X-axis direction shown in FIGS. 1A and 1B to FIG. 3 will be described as "width", the distance in the Y-axis direction will be described as "length", and the distance in the Z-axis direction will be described as "thickness". The side closer to the air bearing surface 20 in the Y-axis direction will be described as "front side" and the side opposite to the front side will be described as "rear side". The description will be similarly used in FIGS. 4A and 4B and subsequent drawings.

The thin film magnetic head is, for example, a composite head capable of executing the functions of both recording and reproducing. As shown in FIGS. 1A and 1B, the thin film magnetic head has a configuration obtained by stacking, on a substrate 1 made of a ceramic material such as AlTiC ($Al_2O_3 \cdot TiC$), an insulating layer 2 made of a non-magnetic insulating material such as aluminum oxide ($Al_2O_3$, hereinbelow, simply called "alumina"), a reproducing head 100A for executing a reproducing process by using a magneto-resistive (MR) effect, a non-magnetic layer 7 made of a non-magnetic material such as alumina, a recording head 100B of a single magnetic pole type for executing a recording process of a perpendicular recording method, and an overcoat layer 16 made of a non-magnetic insulating material such as alumina. The layers are stacked in this order.

The reproducing head 100A has, for example, a configuration in which a lower shield layer 3, a shield gap film 4, and an upper shield layer 5 are stacked in this order. In the shield gap film 4, an MR device 6 as a reproducing device is buried so that one end face is exposed in the recording medium facing surface (air bearing surface) 20 which faces a recording medium.

The lower and upper shield layers 3 and 5 are made of, for example, a magnetic material such as a nickel iron alloy (NiFe (for example, Ni: 80% by weight and Fe: 20% by weight) which will be simply called "permalloy (trademark)" hereinbelow). Each of the layers has a thickness of about 1.0 to 2.0 μm. The shield gap film 4 is used to electrically isolate the MR device 6 from the periphery and is made of, for example, a non-magnetic insulating material such as alumina. The MR device 6 is provided to execute a reproducing process by using GMR (Giant Magneto-resistive) effect or TMR (Tunneling Magneto-resistive) effect.

The recording head 100B has a configuration obtained by, for example, sequentially stacking a return yoke layer 8, a thin film coil 10 for generating a magnetic flux buried by a gap layer 9 having an opening 9K, a yoke layer 11 magnetically connected to the return yoke layer 8 through the opening 9K, a main magnetic pole layer 12 magnetically connected to the return yoke layer 8 via the yoke layer 11, an auxiliary magnetic pole layer 14 sandwiching a non-magnetic 13 with the main magnetic pole layer 12, and a buffer layer 15. In FIG. 3, the non-magnetic layer 13 and the buffer layer 15 are not shown. A stacked structure obtained by stacking the main magnetic pole layer 12, non-magnetic layer 13, and auxiliary magnetic pole layer 14 in this order corresponds to a concrete example of a "magnetic pole layer" in the invention.

The return yoke layer 8 is provided to return a magnetic flux emitted from the main magnetic pole layer 12 to the outside into the recording head 100B. The return yoke layer 8 is made of a magnetic material such as permalloy (for example, Ni of 80% by weight and Fe of 20% by weight) and has a thickness of about 1.0 μm to 5.0 μm.

The gap layer 9 includes a gap layer portion 9A with the opening 9K provided on the return yoke layer 8, a gap layer portion 9B provided on the gap layer portion 9A and covering spacings between turns of the thin film coil 10 and the peripheral area of the thin film coil 10, and a gap layer portion 9C which partially covers the gap layer portions 9A and 9B. The gap layer portion 9A is made of a non-magnetic insulating material such as alumina and has a thickness of about 0.1 μm to 1.0 μm. The gap layer portion 9B is made of, for example, a photoresist (photosensitive resin) which exhibits fluidity when heated, spin on glass (SOG), or the like. The gap layer portion 9C is made of, for example, a non-magnetic insulating material such as alumina or silicon oxide ($SiO_2$) and has a thickness larger than that of the gap layer portion 9B.

The yoke layer 11 is provided to magnetically connect the return yoke layer 8 and the magnetic pole layer 12 and is made of, for example, a magnetic material such as permalloy (Ni: 80% by weight and Fe: 20% by weight). The surface level in the thickness direction of the yoke layer 11 is flush with the surface level in the thickness direction of the gap layer portion 9C, that is, the yoke layer 11 and the gap layer portion 9C form a flat surface M.

The thin film coil 10 is made of a high-conductive material such as copper (Cu) and has a winding structure that a wire is wound in a spiral shape around a connection portion between the return yoke layer 8 and the yoke layer 11. In each of FIG. 1A and FIG. 3, only a part of a plurality of turns constructing the thin film coil 10 is shown.

The stacked structure obtained by stacking the main magnetic pole layer 12, non-magnetic layer 13, and auxiliary magnetic pole layer 14 in this order (hereinbelow, also simply called "stacked structure") holds a magnetic flux generated from the thin film coil 10 and emits the magnetic flux toward a recording medium (not shown). The stacked structure as a whole has, for example, as shown in FIG. 3, a plane shape including a uniform width area R1 having a uniform width W1 specifying the recording track width of the recording medium and a wide area R2 having a width W2 (W2>W1) wider than the uniform width area R1. The "plane shape" in this case denotes a silhouette shape of the plane configuration of the stacked structure constructed by the main magnetic pole layer 12, non-magnetic layer 13, and auxiliary magnetic pole layer 14 and is, concretely, the shape of the area indicated by a thick line in FIG. 3. The position from which the width of the stacked structure from the uniform width area R1 to the wide area R2 corresponds to a "flare point FP" as one of important factors which determine the recording performance of the thin film magnetic head. The main magnetic pole layer 12 and the auxiliary magnetic pole layer 14 have, for example, plane shapes different from each other.

The main magnetic pole layer 12 is a portion as a main path of a magnetic flux. The main magnetic pole layer 12 is made of a magnetic material having a saturated magnetic flux density higher than that of the auxiliary magnetic pole layer 14, for example, permalloy (for example, Ni of 80% by weight and Fe of 20% by weight or Ni of 45% by weight and Fe of 55% by weight), iron nitride (FeN), iron-cobalt-based alloys or the like. The thickness of the main magnetic pole layer 12 is about 0.1 µm to 0.5 µm. Examples of the iron-cobalt-based alloys are iron cobalt alloy (FeCo), iron cobalt alloy nitride (FeCoN), iron cobalt alloy oxide (FeCoO), and cobalt iron nickel alloy (CoFeNi).

The main magnetic pole layer 12 has one end face exposed in the air bearing surface 20 and extends rearward from the air bearing surface 20. The main magnetic pole layer 12 includes, for example, in order from the side close to the air bearing surface 20, a front end portion 12A and a rear end portion 12B connected to the rear end of the front end portion 12A. The front end portion 12A mainly functions as a main magnetic flux emitting portion for emitting a magnetic flux to the outside in order to generate a perpendicular magnetic field for recording. The front end portion 12A has the uniform width W1 specifying the recording track width of the recording medium, and the uniform width area R1 is specified by the plane shape. The rear end portion 12B mainly functions as a main magnetic flux holding portion for holding the magnetic flux generated by the thin film coil 10. The rear end portion 12B has, for example, the uniform width W2 larger than the width W1 of the front end portion W1 (W2>W1). The flare point FP is specified by the connection portion between the front end portion 12A and the rear end portion 12B. The peripheral area of the front end portion 12A in the gap layer portion 9C is partially etched deep.

The non-magnetic layer 13 mainly functions as a stopper layer for suppressing progress of an etching process at the time of forming the main magnetic pole layer 12 and is provided so as to be sandwiched between the main magnetic pole layer 12 and the auxiliary magnetic pole layer 14. The details of the function of the non-magnetic layer 13 as the stopper layer will be described later in "Method of Manufacturing Thin Film Magnetic Head". The non-magnetic layer 13 is made of, for example, a non-magnetic material having an etch rate lower than that of the auxiliary magnetic pole layer 14, which is concretely alumina. The thickness of the non-magnetic layer 13 is about 0.015 µm to 0.65 µm. The non-magnetic layer 13 has, for example, the same plane shape as that of the main magnetic pole layer 12. The non-magnetic layer 13 corresponds to a concrete example of "non-magnetic layer" in the invention.

The auxiliary magnetic pole layer 14 is a portion serving as an auxiliary magnetic flux path for supplying the magnetic flux to the front end portion 12A of the main magnetic pole layer 12 and is completely isolated from the main magnetic pole layer 12 sandwiching the non-magnetic layer 13. The auxiliary magnetic pole layer 14 is made of a magnetic material such as permalloy (made of, for example, 80% by weight of Ni and 20% by weight of Fe or 45% by weight of Ni and 55% by weight of Fe), a cobalt iron nickel alloy or the like and has a thickness of about 0.1 µm to 0.6 µm.

One end face (front end face) E of the auxiliary magnetic pole layer 14 is recessed from the air bearing surface 20. The auxiliary magnetic pole layer 14 is disposed in the wide area R2 so as to be apart from the air bearing surface 20 by a predetermined distance (recess distance V=about 0.1 µm to 1.0 µm). The auxiliary magnetic pole layer 14 extends rearward from the flare point FP and includes, for example, in order from the side close to the flare point FP, a front end portion 14A having the uniform width W1 like the front end portion 12A and a rear end portion 14B having a width larger than that of the front end portion 14A.

In particular, as shown in FIGS. 2 and 3, the front end portion 14A includes: a front side portion 14AF of which thickness gradually decreases from a position backward of the front end face E facing the air bearing surface 20 toward the front end face E; and a rear side portion 14AR connected to the back of the front side portion 14AF and having a uniform thickness. In the case where the film thickness of the rear side portion 14AR is set as T1 and the film thickness of the front end face E of the front side portion 14AF is set as T2, the ratio of the film thickness T2 to the film thickness T1 (film thickness ratio T2/T1) lies, for example, within the range of 0□T2/T1□0.8, preferably, 0□T2/T1□0.5. FIGS. 1A and 1B and FIG. 2 show the case where the film thickness ratio T2/T1≠0(0<T2/T1), that is, the front end face E has a uniform film thickness. The front side portion 14AF has, as shown in FIGS. 2 and 3, a flat slope S corresponding to the area of which film thickness decreases. The angle (inclination angle) α formed between the slope S and an extended face (plane including the X-axis and Y-axis) of the auxiliary magnetic pole layer 14 lies in a range of, for example, 15 degrees □ α □ 75 degrees, concretely, 45 degrees. The front side portion 14AF corresponds to a concrete example of "film thickness changing portion" in the invention, and the rear side portion 14AR corresponds to a concrete example of "film thickness uniform portion" in the invention.

The buffer layer 15 mainly functions as a stopper layer for suppressing progress of an etching process at the time of forming the main magnetic pole layer 12 and the auxiliary magnetic pole layer 14 in a manner similar to the non-magnetic layer 13. The details of the function of the buffer layer 15 as the stopper layer will be described later. The buffer layer 15 is made of, for example, a material similar to that of the non-magnetic layer 13. The buffer layer 15 has a plane shape corresponding to a body obtained by combining the front end portion 12A of the main magnetic pole layer 12 and the front end portion 14A and the rear end portion 14B of the auxiliary magnetic pole layer 14.

The operation of the thin film magnetic head will now be described with reference to FIGS. 1A and 1B to FIG. 3.

In the thin film magnetic head, at the time of recording information, when a current flows into the thin film coil 10 of the recording head 100B via a not-shown external circuit, a magnetic flux is generated by the thin film coil 10. The magnetic flux generated at this time is held by the main magnetic pole layer 12 via the yoke layer 11 and is also held by the auxiliary magnetic pole layer 14 via the non-magnetic layer 13. The magnetic flux held in the main magnetic pole layer 12 flows from the rear end portion 12B to the front end portion 12A. On the other hand, the magnetic flux held in the auxiliary magnetic pole layer 14 similarly flows from the rear end portion 14B to the front end portion 14A. At this time, the magnetic flux flowing from the rear end portion 12B to the front end portion 12A in the main magnetic pole layer 12 is converged at the flare point FP as the width of the main magnetic pole layer 12 decreases (from W2 to W1). The magnetic flux flowing from the rear end portion 14B to the front end portion 14A in the auxiliary magnetic pole layer 14 is concentrated on a portion near the tip of the front end portion 14A. After that, the magnetic flux flows again into the front end portion 12A in the main magnetic pole layer 12 via the non-magnetic layer 13. By the operation, the magnetic flux is concentrated mainly on a trailing side portion in the front end portion 12A. When the magnetic flux is emitted from the front end portion 12A to the outside, a magnetic field (perpendicular magnetic field) is generated in the direction orthogonal to the surface of a recording medium and the recording medium is magnetized in the vertical direction by the perpendicular magnetic field, thereby magnetically recording information onto the recording medium. The magnetic flux emitted to the outside at the time of recording returns to the recording head 100B via the return yoke layer 8.

The "trailing side" is, when a movement state of the recording medium in the travel direction B of the recording medium (refer to FIGS. 1A and 1B) is regarded as a flow, the outflow side of the recording medium (medium outflow side). Concretely, the trailing side is the side (upper side) far from the gap layer 9 in the thickness direction (Z-axis direction). On the other hand, the inflow side (relative inflow side), that is, the side close to the gap layer 9 is called a "leading side".

At the time of reproducing, when a sense current flows into the MR device 6 in the reproducing head 100A, the resistance value of the MR device 6 varies according to a signal magnetic field for reproduction from the recording medium. By detecting the resistance change as a change in the sense current, the information recorded on the recording medium is magnetically read out.

In the thin film magnetic head according to the embodiment, since the auxiliary magnetic pole layer 14 includes the front side portion 14AF of which film thickness gradually decreases toward the front end face E, as compared with the case where the whole auxiliary magnetic pole layer 14 has a constant film thickness, the area of the front end face E is smaller. In this case, as described above in "Description of the Related Art", when the flare point FP is set on the side close to the air bearing surface 20 so that the auxiliary magnetic pole layer 14 is close to the air bearing surface 20, as the area of the front end portion E decreases, the influence of the magnetic flux concentrated on the area near the tip of the auxiliary magnetic pole layer 14 decreases. Therefore, in the embodiment, the adverse influence on the perpendicular magnetic field distribution caused by the magnetic flux flowing in the auxiliary magnetic pole layer 14 is suppressed and the perpendicular magnetic field distribution on the trailing side of the main magnetic pole layer 12 is stabilized. Thus, normal recording operation can be assured.

In the embodiment, with respect to the front end portion 14A of the auxiliary magnetic pole layer 14, the ratio of the film thickness T2 of the front side portion 14AF to the film thickness T1 of the rear side portion 14AR (film thickness ratio T2/T1) is set to be within the range of $0 \leq T2/T1 \leq 0.8$, preferably, $0 \leq T2/T1 \leq 0.5$. Consequently, by making the film thickness ratio T2/T1 proper, the peak magnetic field intensity in the perpendicular magnetic field distribution (the perpendicular magnetic field intensity corresponding to a track position to be recorded) increases, and the magnetic field gradient (the difference between the perpendicular magnetic field intensity corresponding to the track position to be recorded and the perpendicular magnetic field intensity corresponding to a recorded track position) is assured. Therefore, the invention can contribute to stabilization of the perpendicular magnetic field distribution from the viewpoints.

Further, in the embodiment, the inclination angle α of the slope S of the auxiliary magnetic pole layer 14 is set within a proper range of 15 degrees $\leq \alpha \leq$ 75 degrees. Consequently, the sectional area of the front end portion 14A gradually decreases along the slope S, and the magnetic flux flowing in the auxiliary magnetic pole layer 14 is properly reduced as the sectional area decreases. Therefore, the tendency of concentration of the magnetic flux in the auxiliary magnetic pole layer 14 inducing disturbance in the perpendicular magnetic field distribution is suppressed by using the magnetic flux reducing action, so that the invention can contribute to stabilization of the perpendicular magnetic field distribution also from the viewpoint. When the inclination angle α is smaller than the range, the sectional area of the front side portion 14AF is extremely smaller than that of the rear side portion 14AR. It is therefore feared that magnetic flux saturation occurs when the magnetic flux flows from the rear side portion 14AR to the front side portion 14AF in the front end portion 14A. On the other hand, when the inclination angle α is larger than the range, the inclination area decreases in the front side portion 14A and the magnetic flux reducing action accordingly decreases. It increases the possibility that the magnetic flux is concentrated near the tip of the auxiliary magnetic pole layer 14.

Figure 4:
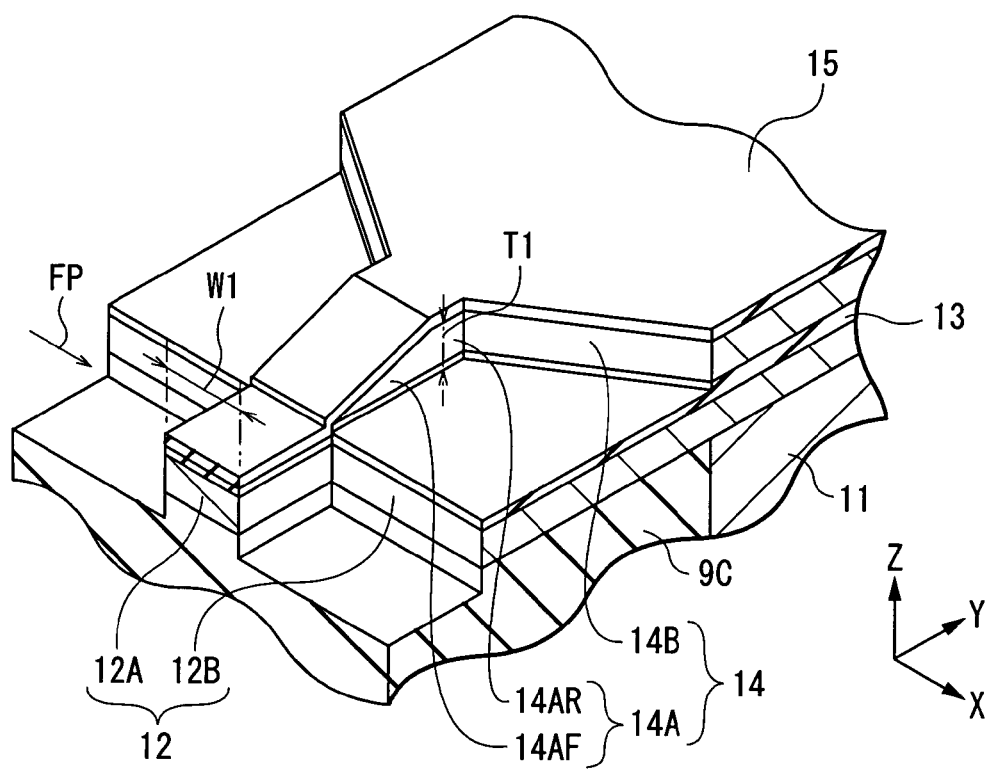
FIG. 4 is a perspective view showing a modification of the configuration of the thin film magnetic head according to the first embodiment of the invention.

In the embodiment, with respect to the front end portion 14A of the auxiliary magnetic pole layer 14, as shown in FIG. 2, the film thickness ratio T2/T1 is set so as not to be equal to 0 (T2/T1≠0) and the front end face E is set to have a constant film thickness. However, the invention is not always limited to the embodiment. As described above, the film thickness ratio T2/T1 may be equal to 0 (T2/T1=0) (T2=0). In this case, as shown in FIG. 4, an area around the tip of the front side portion 14AF becomes a sharp knife edge.

Figure 5:
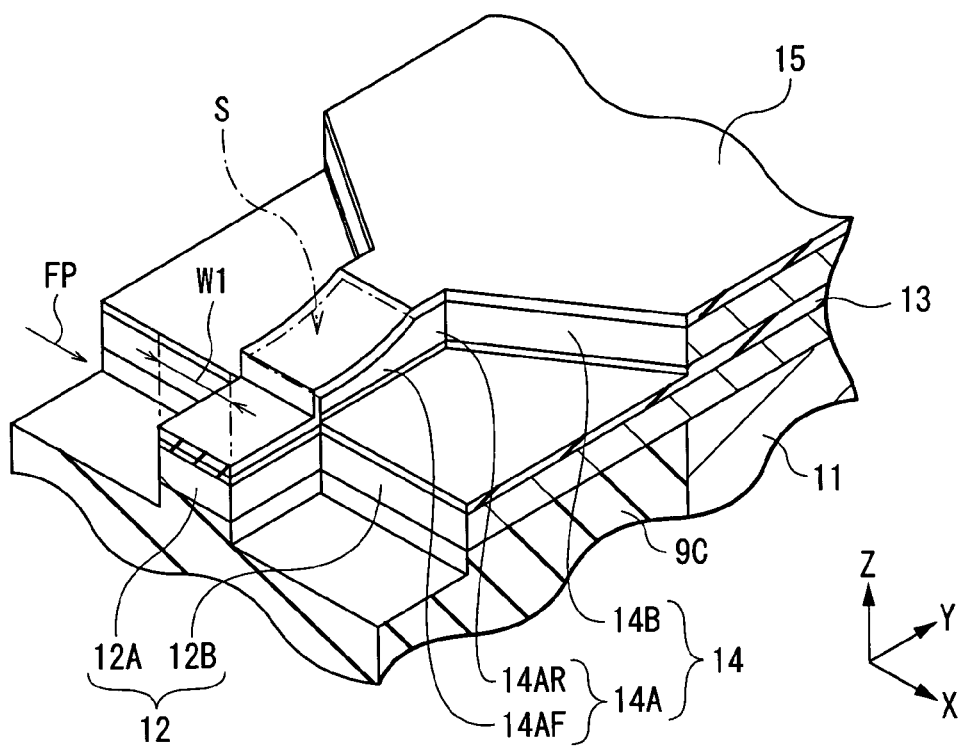
FIG. 5 is a perspective view showing another modification of the configuration of the thin film magnetic head according to the first embodiment of the invention.

In the embodiment, with respect to the front end portion 14A of the auxiliary magnetic pole layer 14, as shown in FIG. 2, the case where the slope S is flat has been described. However, the invention is not always limited to the case. For example, as shown in FIG. 5, the slope S may be curved so as to be recessed or projected.

In the embodiment, the upper shield layer 5 and the return yoke layer 8 are separated from each other with the non-magnetic layer 7 in between so that the upper shield layer 5 and the return yoke layer 8 are layers different from each other. However, the invention is not always limited to the embodiment. For example, the non-magnetic layer 7 may not be provided and the upper shield layer 5 and the return yoke layer 8 may be integrally formed. In this case, the thickness of an integral layer of the upper shield layer 5 and the return yoke layer 8 (an upper shield layer-cum-return yoke) can be set properly.

A method of manufacturing the thin film magnetic head according to the embodiment will be described with reference to FIGS. 1A and 1B to FIG. 16. FIGS. 6A and 6B to FIGS. 11A and 11B are cross sectional views illustrating a series of processes in the process of manufacturing the thin film magnetic head. FIG. 12 to FIG. 16 are perspective views corresponding to the processes shown in FIGS. 6A and 6B to FIGS. 10A and 10B, respectively.

In the following, first, an outline of processes of manufacturing a thin film magnetic head as a whole will be described. After that, processes of forming main components, that is, the main magnetic pole layer 12, non-magnetic layer 13, and auxiliary magnetic pole layer 14 to which the method of manufacturing the thin film magnetic head of the invention is applied will be described in detail. At the time of describing the method of manufacturing the thin film magnetic head and the method of forming the main components, since the materials, positions, structural features, and the like of the components of the thin film magnetic head have been already described in detail in "Configuration of Thin Film Magnetic Head", their description will not be repeated.

The thin film magnetic head is manufactured by sequentially forming components and stacking the components by using, mainly, a thin film process including a film forming technique such as plating and sputtering, a patterning technique such as photolithography technique, and an etching technique such as dry etching. Specifically, first, the insulating layer 2 is formed on the substrate 1 and, after that, the lower shield layer 3, the shield gap film 4 in which the MR device 6 is buried, and the upper shield layer 5 are stacked on the insulating layer 2 in accordance with this order, thereby forming the reproducing head 100A.

Subsequently, the non-magnetic layer 7 is formed on the reproducing head 10A. On the non-magnetic layer 7, the return yoke layer 8, the gap layer 9 (9A, 9B, and 9C) having the opening 9K and burying the thin film coil 10, the yoke layer 11 connected to the return yoke layer 8 through the opening 9K, the main magnetic pole layer 12 magnetically connected to the return yoke layer 8 via the yoke layer 11, the non-magnetic layer 13, the auxiliary magnetic pole layer 14, and the buffer layer 15 are stacked in this order, thereby forming the recording head 100B.

Finally, the overcoat layer 16 is formed on the recording head 100B and, after that, the air bearing surface 20 is formed by using mechanical process and polishing process, thereby completing the thin film magnetic head.

Figure 12:
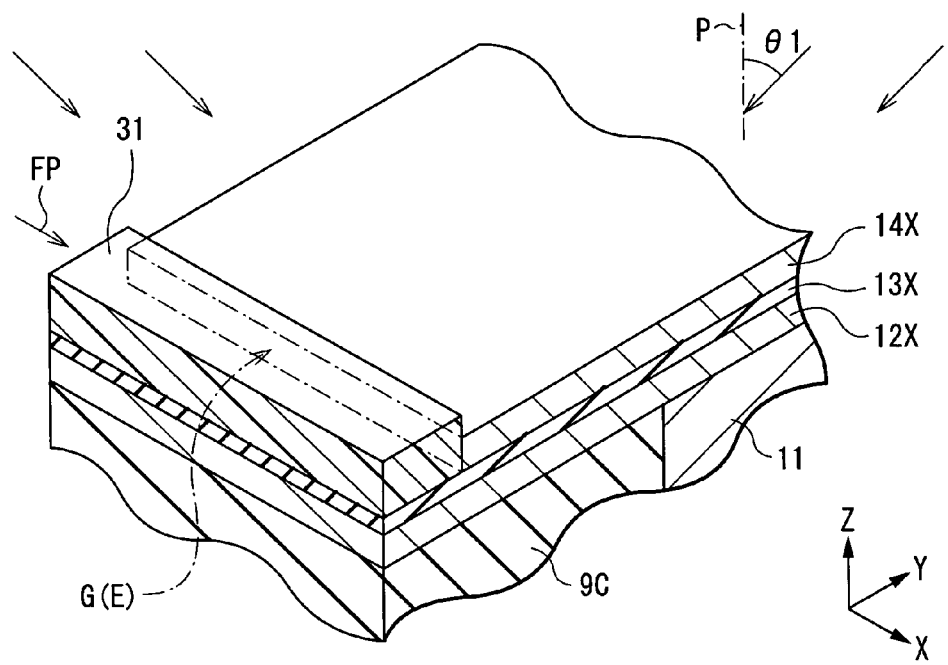
FIG. 12 is a perspective view corresponding to the sectional configuration shown in FIGS. 6A and 6B.

At the time of forming the main components of the thin film magnetic head, the yoke layer 11 is formed. By the yoke layer 11 and the gap layer portion 9C, the flat surface M is formed. After that, as shown in FIGS. 6A and 6B and FIG. 12, a precursor main magnetic pole layer 12X made of a material having high saturation magnetic flux density and a precursor non-magnetic material layer 13X made of alumina or the like are formed and stacked in this order on the flat surface M1 by using sputtering or the like. The precursor main magnetic pole layer 12X is a preparation layer which becomes the main magnetic pole layer 12 by being patterned in a post process. Similarly, the precursor non-magnetic layer 13X is a preparation layer which becomes the non-magnetic layer 13 in a post process.

Subsequently, as shown in FIGS. 6A and 6B and FIG. 12, for example, by using plating, a precursor auxiliary magnetic pole layer pattern 14X made of a material having high saturation magnetic flux density is selectively formed in an area corresponding to the wide area R2 (refer to FIG. 3) on the precursor non-magnetic layer 13X. The precursor auxiliary magnetic pole layer pattern 14X is a preparation layer which becomes the auxiliary magnetic pole layer 14 in a post process.

The procedure of forming the precursor auxiliary magnetic pole layer pattern 14X by using plating is as follows. First, an electrode film (not shown) as a seed layer for performing an electrolytic plating process is formed on the precursor non-magnetic layer 13X. On the electrode film, for example, a positive photoresist is applied to form a photoresist film (not shown). As the material of the electrode film, for example, a material similar to that of the precursor auxiliary magnetic pole layer pattern 14X is used. Subsequently, by using a mask (not shown) for exposure having a pattern opening corresponding to the plane shape of the precursor auxiliary magnetic pole layer pattern 14X, the photoresist film is selectively exposed to light via the pattern opening and the exposed area is developed, thereby forming a photoresist pattern 31 necessary to perform a plating process. Finally, the photoresist pattern 31 is used as a mask, the electrode film formed in the preceding process is used as a seed layer, and the plating film is selectively grown, thereby forming the precursor auxiliary magnetic pole layer pattern 14X. At the time of forming the precursor auxiliary magnetic pole layer pattern 14X, as shown in FIG. 12, the photoresist pattern 31 is positioned so that the precursor auxiliary magnetic pole layer pattern 14X has a front end face (end face) G including the front end face E (refer to FIG. 2) of the auxiliary magnetic pole layer 14 formed at last and the position of the front end face G coincides with the flare point FP (set position). After forming the precursor auxiliary magnetic pole layer pattern 14X, the photoresist pattern 31 is removed and the unnecessary electrode film remaining in the area other than the area in which the precursor auxiliary magnetic pole layer pattern 14X is formed is removed by etching. The precursor auxiliary magnetic pole layer pattern 14X corresponds to a concrete example of "first precursor auxiliary magnetic pole layer pattern" in the invention.

Subsequently, a method of forming the main components of the thin film magnetic head will be described.

Figure 13:
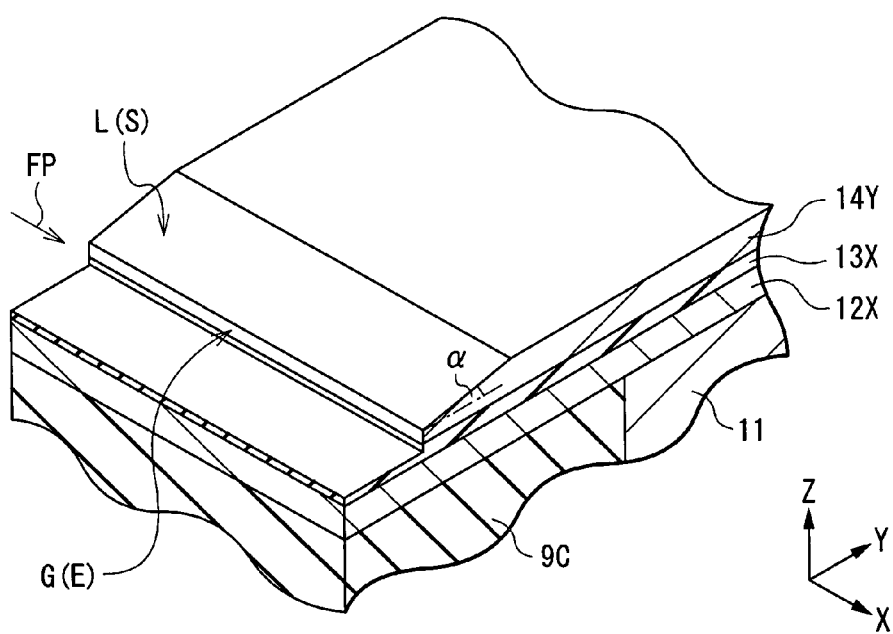
FIG. 13 is a perspective view corresponding to the sectional configuration shown in FIGS. 7A and 7B.

After forming the precursor auxiliary magnetic pole layer pattern 14X, for example, by using ion milling, the front side portion (portion on the side close to the front end face G) of the precursor auxiliary magnetic pole layer pattern 14X is selectively etched. Concretely, for example, as shown in FIG. 12, the etching process is performed while emitting an ion beam at a relatively small angle (irradiation angle) θ of about 35 degrees ±10 degrees from the perpendicular P to the plane extended from the precursor auxiliary magnetic pole layer pattern 14X (plane including the X-axis and Y-axis). By the etching process, mainly, priority is placed on an etching action in the thickness direction more than an etching action in the width direction. The front portion of the precursor auxiliary magnetic pole layer pattern 14X is selectively etched from the upper portion on the basis of the etching action in the thickness direction and the etching amount gradually decreases from the flare point FP to the rear side. Consequently, as shown in FIGS. 7A and 7B and FIG. 13, a precursor auxiliary magnetic pole layer pattern 14Y is formed so as to have a slope L including the slope S (refer to FIG. 2) of the auxiliary magnetic pole layer 14 and so that the thickness of the portion corresponding to the slope L gradually decreases from a position backward of the front end face G toward the front end face G. At the time of forming the precursor auxiliary magnetic pole layer pattern 14Y, for example, the etching amount is adjusted so that the film thickness ratio T2/T1 lies within the range of $0 \leq T2/T1 \leq 0.8$ and the inclination angle α formed between the slope L and the plane extended from the precursor auxiliary magnetic pole layer pattern 14Y (plane including the X-axis and Y-axis) lies within the range of 15 degrees$\leq \alpha \leq$75 degrees. At the time of forming the precursor auxiliary magnetic pole layer pattern 14Y, in an area forward of the flare point FP, the precursor non-magnetic layer 13X made of alumina of which etching rate is slow functions as a stopper layer. Consequently, even when the influence of etching is exerted, the precursor non-magnetic layer 13X is etched but slightly. Since excessive progress of the etching process is suppressed, the etching process is prevented from being performed even on the precursor main magnetic pole layer 12X which is not to be etched. The precursor auxiliary magnetic pole layer pattern 14Y corresponds to a concrete example of "second precursor auxiliary magnetic pole layer pattern" in the invention.

Figures 8A, 8B:
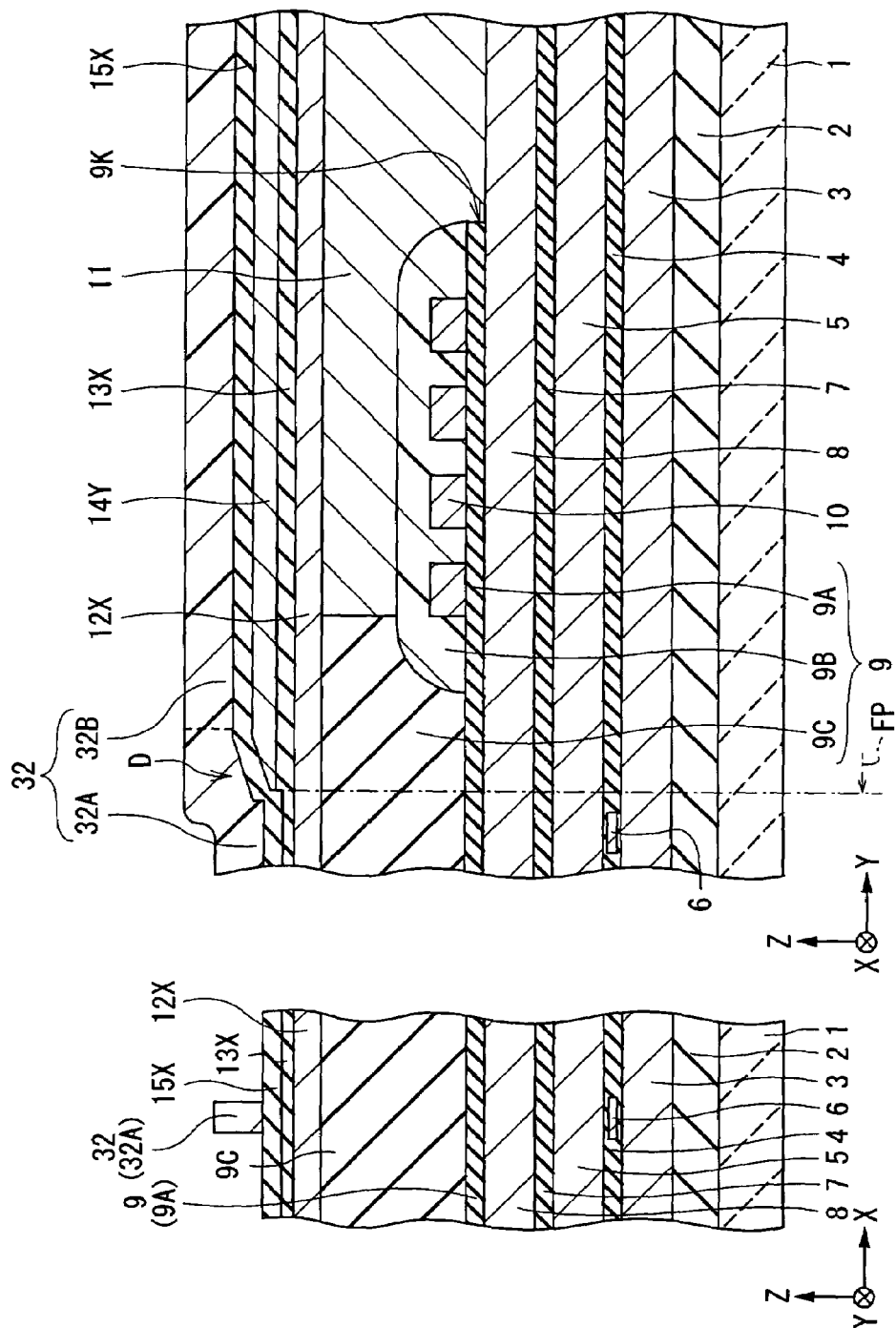
FIGS. 8A and 8B are cross sections showing a process subsequent to FIGS. 7A and 7B.
Figure 14:
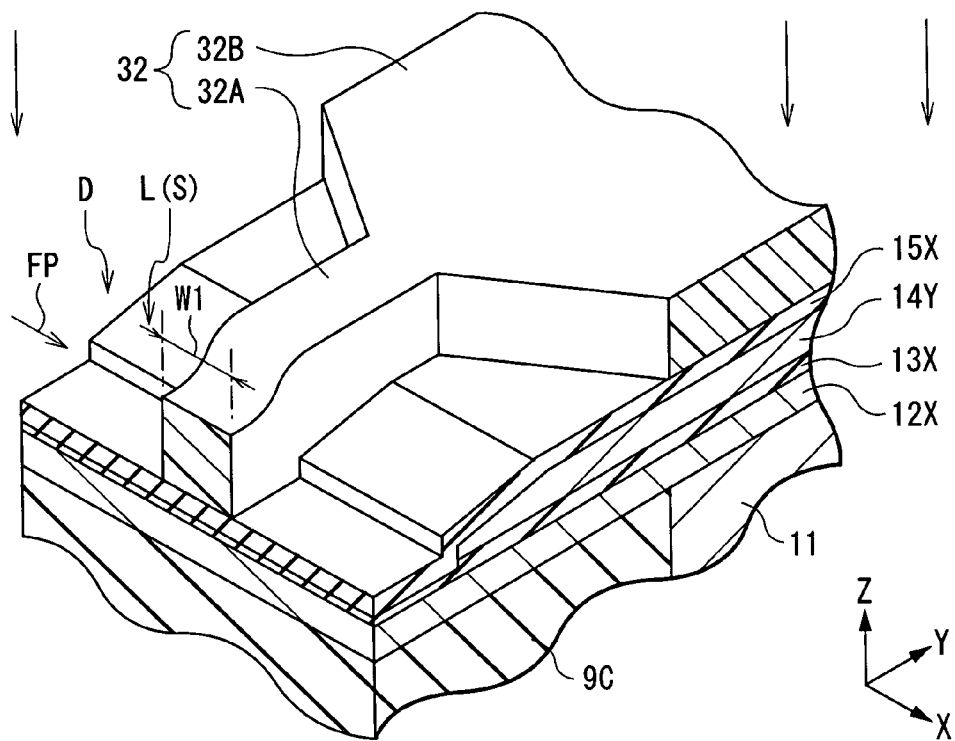
FIG. 14 is a perspective view corresponding to the sectional configuration shown in FIGS. 8A and 8B.

Subsequently, as shown in FIGS. 8A and 8B and FIG. 14, a precursor buffer layer 15X made of, for example, alumina is formed so as to entirely cover the exposed surface of the precursor non-magnetic layer 13X and the surface of the precursor auxiliary magnetic pole layer pattern 14Y by using sputtering or the like. The precursor buffer layer 15X is a preparation layer which becomes the buffer layer 15 in a post process and is formed so as to include a step D in correspondence with an under structure constructed by the precursor non-magnetic layer 13X and the precursor auxiliary magnetic pole layer pattern 14Y.

Subsequently, as shown in FIGS. 8A and 8B and FIG. 14, a mask layer 32 for etching made by a photoresist film is selectively formed in the area corresponding to the uniform width area R1 and the wide area R2 (refer to FIG. 3) on the precursor buffer layer 15X by using a photolithography process. The mask layer 32 is formed so as to have, for example, a pattern shape including a front end portion 32A having a uniform width W1 similar to that of the front end portion 14A and a rear end portion 32B wider than the front end portion 32A in almost correspondence with the plane shape of the auxiliary magnetic pole layer 14 finally formed. In particular, the front end portion 32A is allowed to extend from the position which becomes the air bearing surface 20 in a post process via the step D to the rear side. The mask layer 32 corresponds to a concrete example of "mask" in the invention.

Figure 9B:
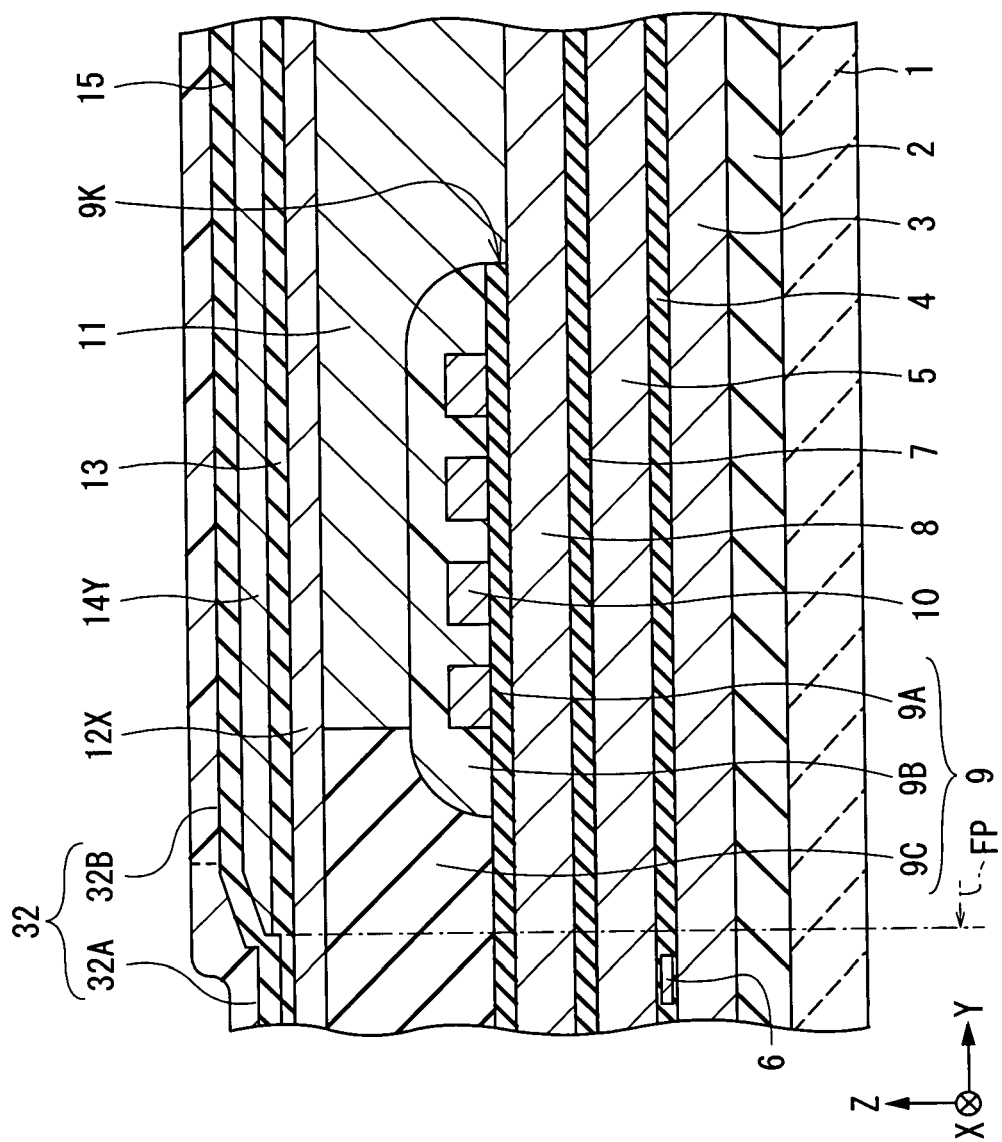
FIGS. 9A and 9B are cross sections showing a process subsequent to FIGS. 8A and 8B.
Figure 9A:
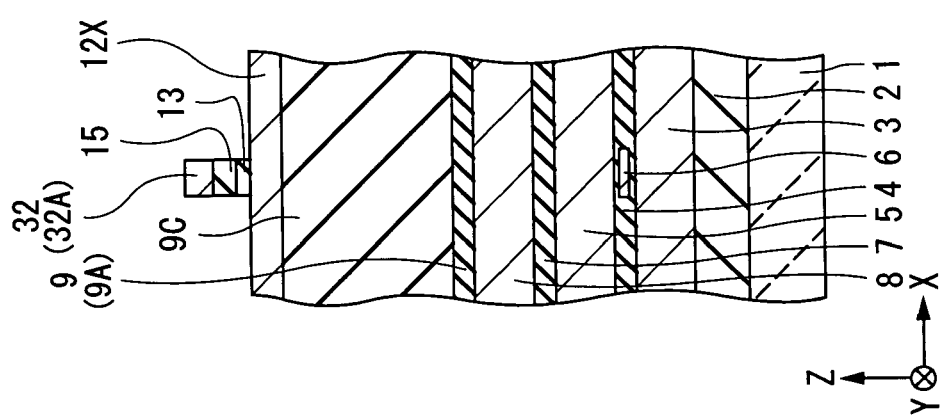
Figure 15:
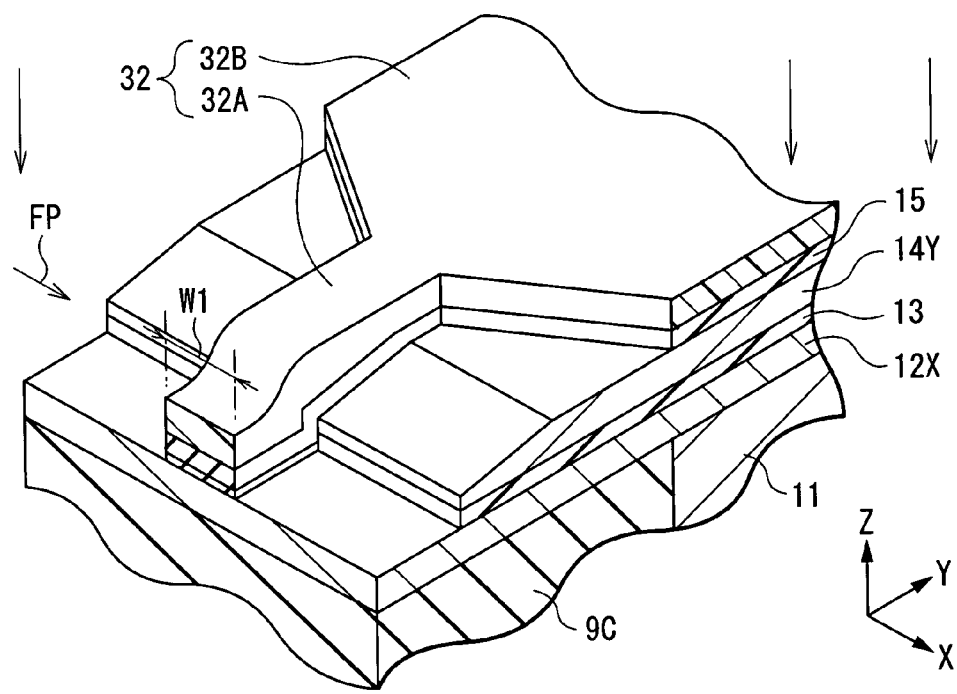
FIG. 15 is a perspective view corresponding to the sectional configuration shown in FIGS. 9A and 9B.

Subsequently, a mask layer 32 is used and the precursor buffer layer 15X is patterned by using, for example, reactive ion etching (RIE). As shown in FIGS. 9A and 9B and FIG. 15, the buffer layer 15 is formed so as to have a plane shape almost similar to that of the mask layer 32. When the buffer layer 15 is formed, the mask layer 32 itself is also etched together with the precursor buffer layer 15X, so that the thickness is reduced. At the time point when the buffer layer 15 is formed, the mask layer 32 may remain (refer to FIGS. 9A and 9B and FIG. 15) or may not remain.

Subsequently, by using the mask layer 32, buffer layer 15, and precursor auxiliary magnetic pole layer pattern 14Y as a mask and continuously performing the etching process using RIE, the precursor non-magnetic layer 13X is continuously patterned. By the etching process, as shown in FIGS. 9A and 9B and FIG. 15, the non-magnetic layer 13 is formed so as to have a plane shape corresponding to a body obtained by combining the buffer layer 15 and the precursor auxiliary magnetic pole layer pattern 14Y.

Figure 10B:
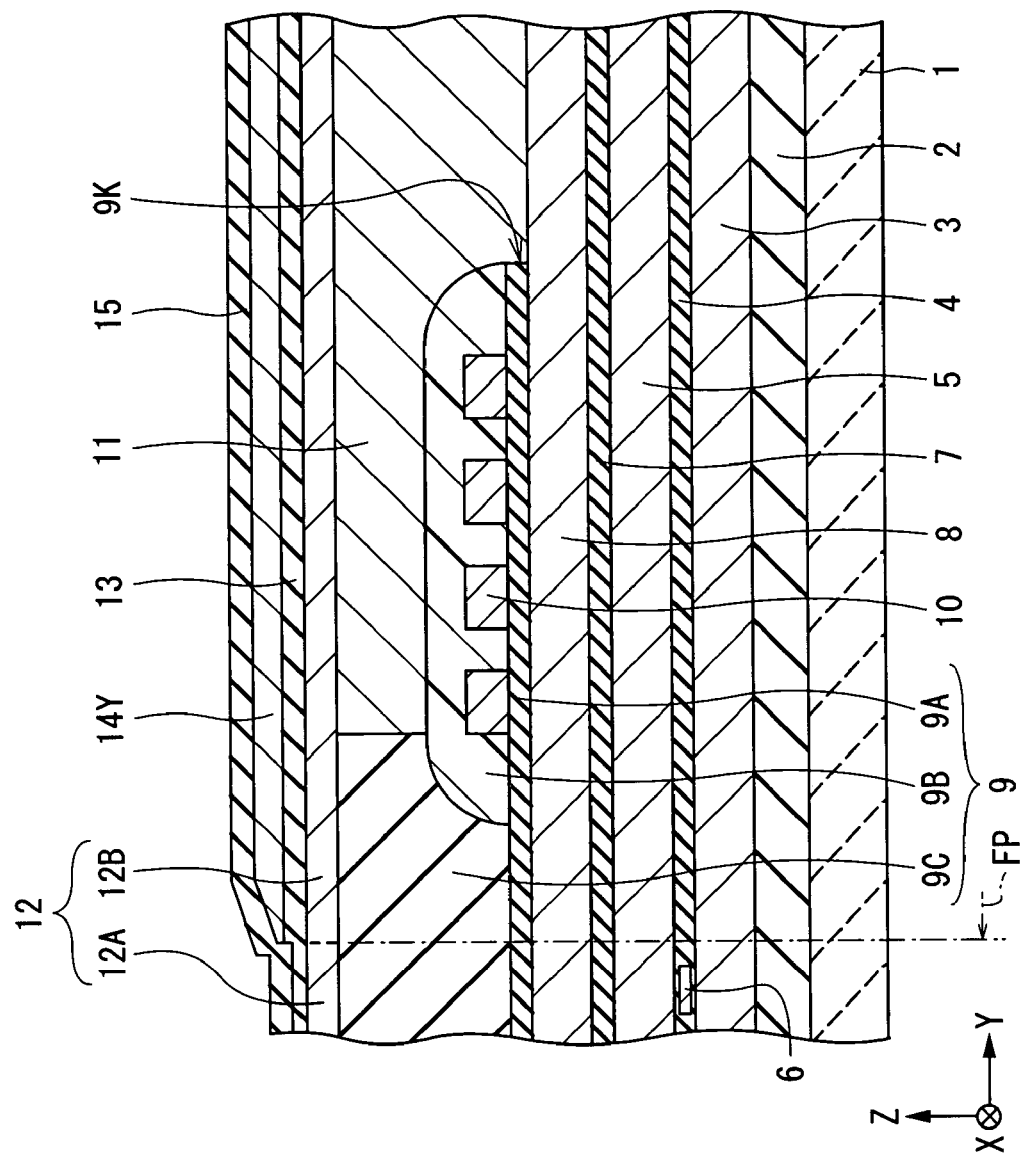
FIGS. 10A and 10B are cross sections showing a process subsequent to FIGS. 9A and 9B.
Figure 10A:
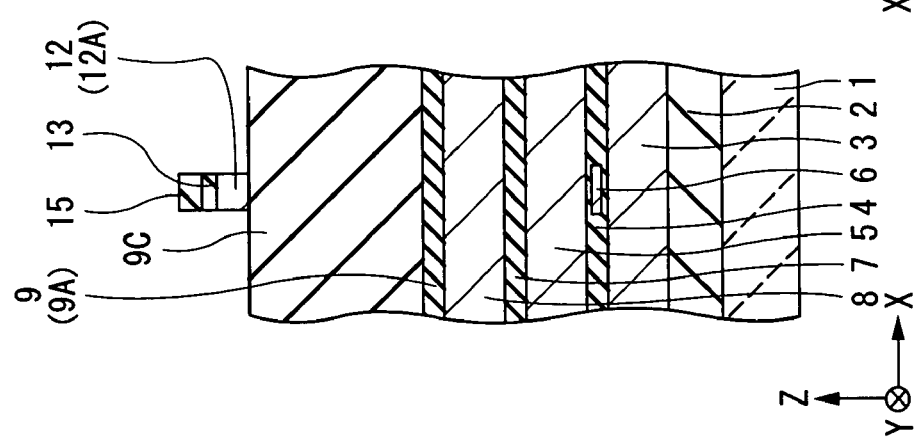
Figure 16:
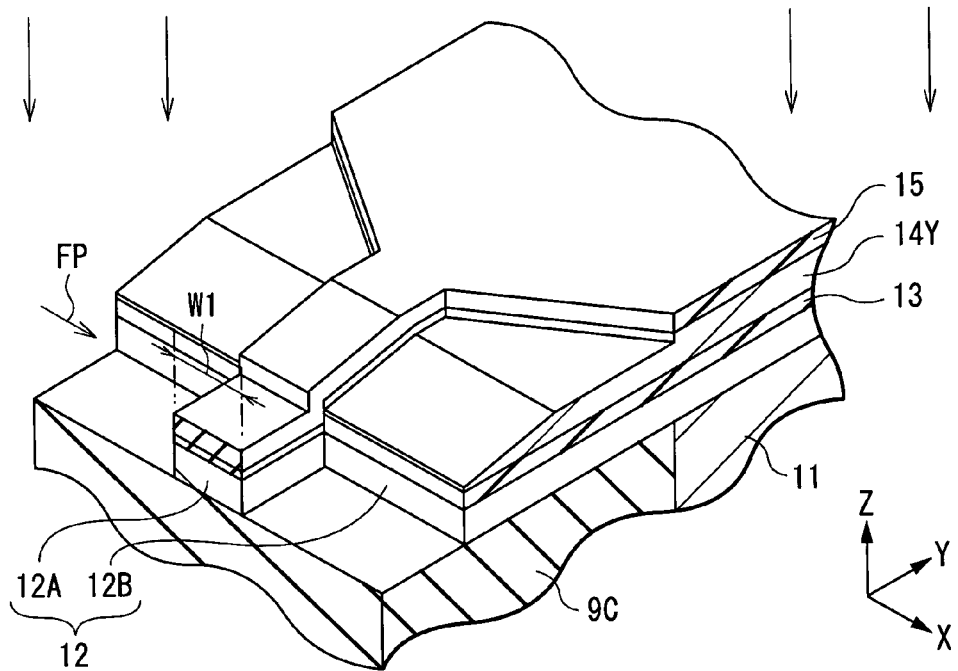
FIG. 16 is a perspective view corresponding to the sectional configuration shown in FIGS. 10A and 10B.

After that, by using the mask layer 32, buffer layer 15, precursor auxiliary magnetic pole layer pattern 14Y, and non-magnetic layer 13 as a mask and using, for example, ion milling, the precursor main magnetic pole layer 12X is patterned. By the etching process, in the area forward of the flare point FP, the area other than the portion corresponding to the front end portion 32A in the precursor main magnetic pole layer 12X is selectively etched, thereby forming the main magnetic pole layer 12 so as to include the front end portion 12A and the rear end portion 12B which are magnetically connected to each other in the flare point FP as shown in FIGS. 10A and 10B and FIG. 16. In the area backward of the flare point FP, in the precursor auxiliary magnetic pole layer pattern 14Y, the area other than the portion corresponding to the mask layer 32 is selectively etched halfway. FIGS. 10A and 10B and FIG. 16 show a state that the mask layer 32 disappears by the time the main magnetic pole layer 12 is formed and the buffer 15 is exposed.

Figures 11A, 11B:
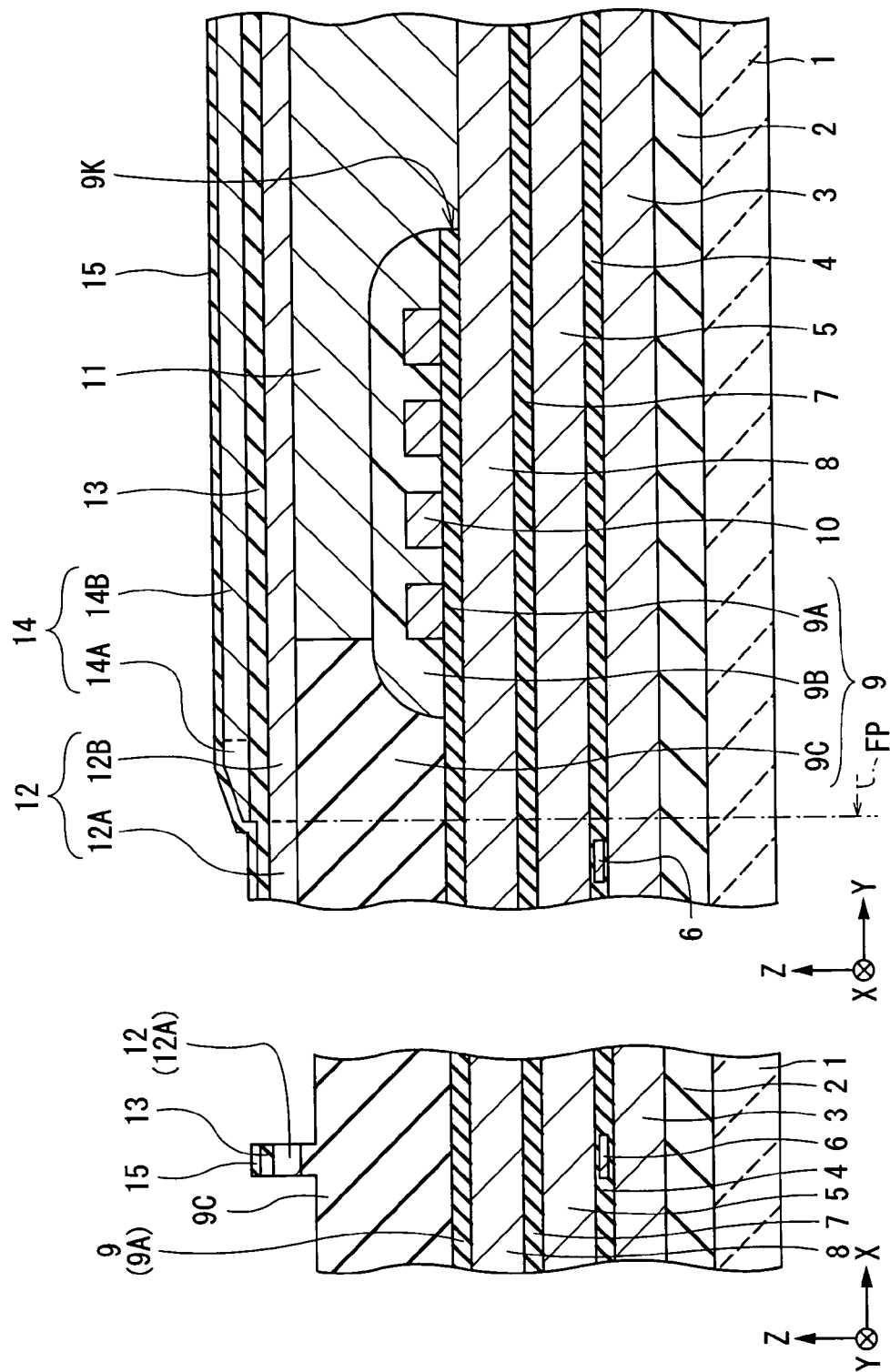
FIGS. 11A and 11B are cross sections showing a process subsequent to FIGS. 10A and 10B.

Finally, by using the buffer layer 15 as a mask and performing the etching process using ion milling, the precursor auxiliary magnetic pole layer pattern 14Y is patterned. By the etching process, in the area backward of the flare point FP, the area other than the portion corresponding to the buffer layer 15 in the precursor auxiliary magnetic pole layer pattern 14Y is selectively removed, thereby forming the front end face E as a part of the front end face G of the precursor auxiliary magnetic pole layer pattern 14Y, forming the slope S as a part of the slope L, and forming the auxiliary magnetic pole layer 14 so as to form the front end portion 14A and the rear end portion 14B in order from the flare point FP as shown in FIGS. 11A and 11B and FIG. 2. In the auxiliary magnetic pole layer 14, as shown in FIG. 2, the front end portion 14A is constructed so as to include the front side portion 14AF of which film thickness gradually decreases toward the front end face E and the rear side portion 14AR having a uniform film thickness. At the time of forming the main magnetic pole layer 12, in the area rearward of the flare point FP, the area other than the portion corresponding to the buffer layer 15 in the non-magnetic layer 13 is selectively etched halfway. In the area forward of the flare point FP, the gap layer portion 9C around the front end portion 12A is selectively etched and the thickness of the buffer layer 15 is reduced. In such a manner, the stacked structure constructed by the main magnetic pole layer 12, non-magnetic layer 13, and auxiliary magnetic pole layer 14 is completed.

In the above description, for convenience of explanation, on completion of the patterning process using etching, the main magnetic pole layer 12, non-magnetic layer 13, auxiliary magnetic pole layer 14, and buffer layer 15 are completed. In practice, however, after completion of the patterning process, the process of forming the air bearing surface 20 is performed and then the series of the components are finally completed.

In the method of manufacturing the thin film magnetic head according to the embodiment, to form the auxiliary magnetic pole layer 14 of the characteristic configuration including the front end portion 14AF of which film thickness gradually decreases toward the front end face E, only existing thin film processes including the film forming process and the patterning process are used. Therefore, the thin film magnetic head of the invention including the auxiliary magnetic pole layer 14 and capable of assuring a normal recording operation can be easily manufactured.

In the embodiment, as the etching method for forming the buffer layer 15 by patterning the precursor buffer layer 15X of which etching rate is slow, RIE using both the physical etching action and the chemical etching action is employed. Consequently, as compared with the case of employing ion milling using only the physical etching action, the buffer layer 15 can be formed in shorter time.

Figure 17:
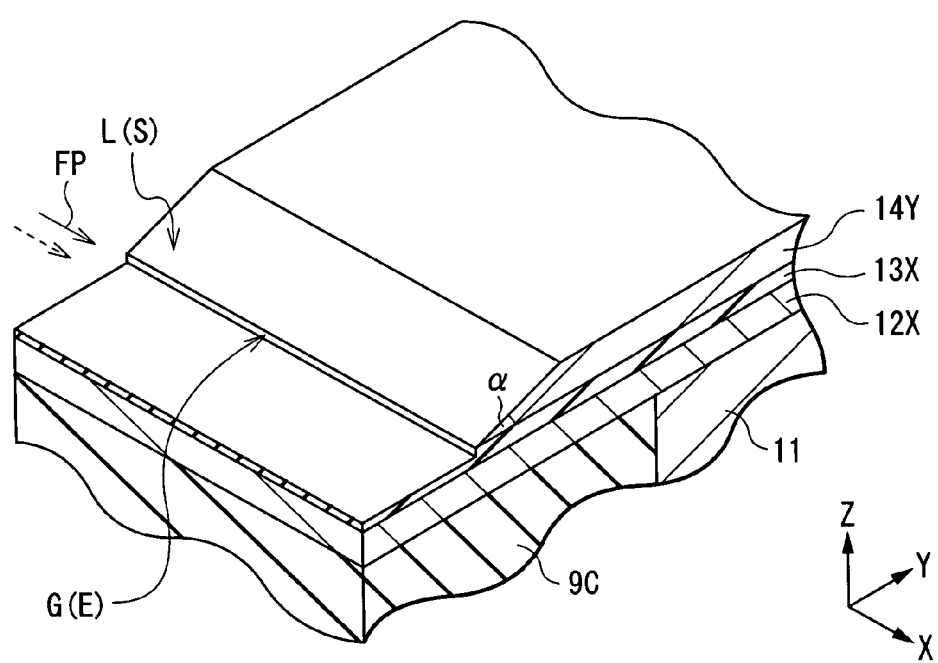
FIG. 17 is a perspective view for explaining an unexpected problem which occurs in the method of manufacturing the thin film magnetic head according to the first embodiment of the invention.

In the above, at the time of forming the precursor auxiliary magnetic pole layer pattern 14Y by patterning the precursor auxiliary magnetic pole layer pattern 14X, the film thickness ratio $T2/T1$ is set within the range of $0 \leq T2/T1 \leq 0.8$. In particular, to assure the precision of formation of the main magnetic pole layer 12, it is preferable to make the front end face G (which becomes the front end face E) have a uniform film thickness and to set the film thickness ratio $T2/T1$ within the range of $0 < T2/T1 \leq 0.8$ for the following reason. As described above, in the method of manufacturing the thin film magnetic head according to the embodiment, the flare point FP is specified on the basis of the position of the front end face G of the precursor auxiliary magnetic pole layer pattern 14Y. Consequently, in the case of setting the film thickness ratio T2/T1 to be a smaller value to make the front end shape of the precursor auxiliary magnetic pole layer pattern 14Y similar to a knife edge (the film thickness ratio T2/T1=0), if an area around the front end of the precursor auxiliary magnetic pole layer pattern 14X is etched too much due to an error in the etching, there is the possibility that, as shown in FIG. 17, the front end face G of the precursor auxiliary magnetic pole layer pattern 14Y is recessed and the flare point FP is deviated from the initial set position. Therefore, to set the flare point FP to the target position in consideration of an error in the etching or the like, it is preferable to set the film thickness ratio T2/T1 to a relatively large value (T2/T1≠0).

In the embodiment, as the etching method used at the time of performing the patterning process, ion milling and RIE are used. However, the invention is not always limited to them. For example, RIE may be used in place of ion milling. On the other hand, ion milling may be used in place of RIE. Obviously, only one of the ion milling or RIE may be used for all of the patterning processes.

EXAMPLES

Results of experiments for examining the characteristics of the thin film magnetic head of the invention will now be described. The characteristics of the thin film magnetic head manufactured by the method of manufacturing the thin film magnetic head of the invention were examined and the results as shown in FIGS. 18 to 20 were obtained.

Figure 18:
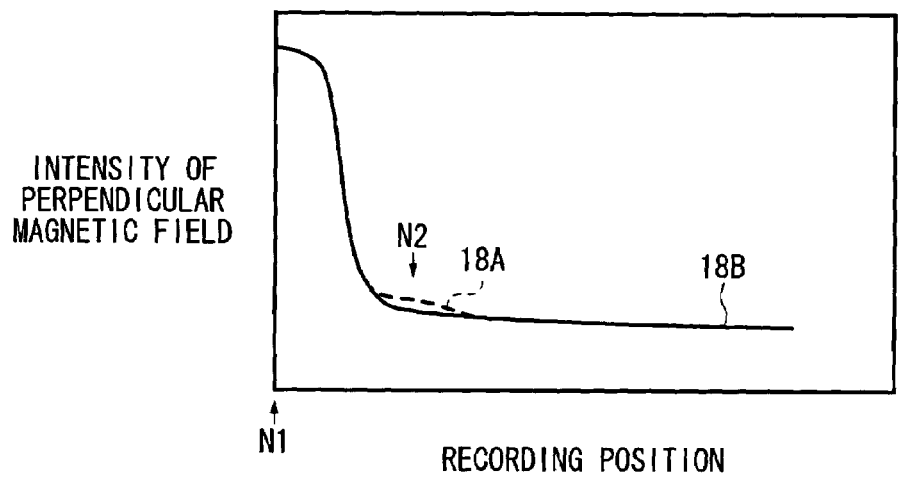
FIG. 18 is a diagram showing results of experiments regarding a perpendicular magnetic field distribution.
Figure 21:
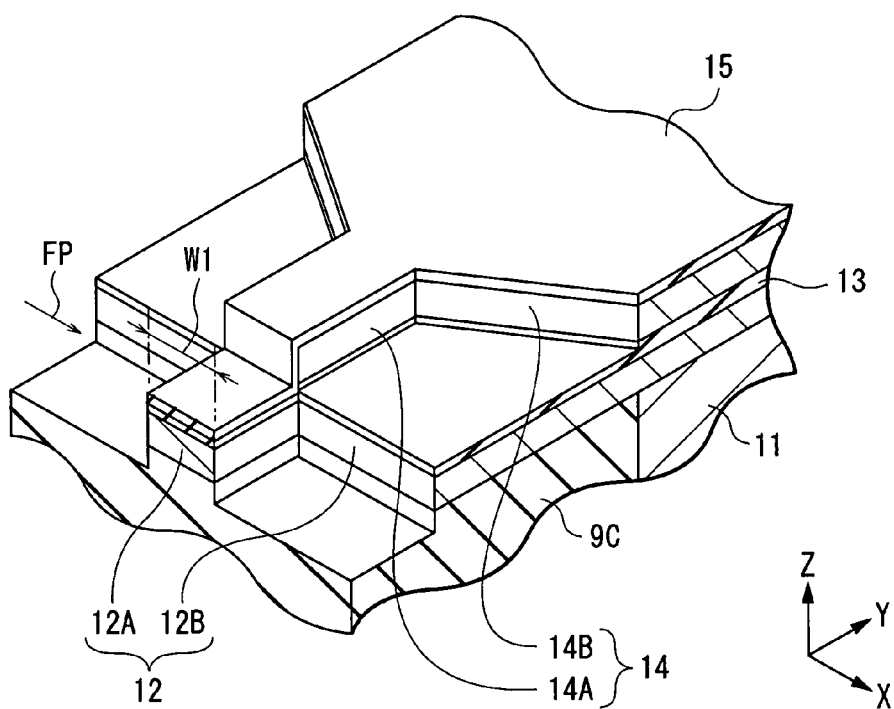
FIG. 21 is an enlarged perspective view showing the configuration of a thin film magnetic head as a comparative example of the thin film magnetic head according to the first embodiment of the invention.

FIG. 18 is a diagram illustrating the perpendicular magnetic field distribution. The "lateral axis" denotes recording position and "vertical axis" indicates intensity of perpendicular magnetic field ($10^3/(4\pi)$A/m). The recording position denotes a recording position on the same track of a recording medium. Recording positions N1 and N2 in the lateral axis indicate a position corresponding to the end position on the trailing side of the main magnetic pole layer 12 and a position corresponding to the end position on the trailing side of the auxiliary magnetic pole layer 14, respectively, shown in FIG. 1B. That is, the recording position N1 indicates the present recording position, and the recording position N2 indicates a past recording position. Broken line 18A in FIG. 18 indicates a thin film magnetic head of a comparative example (having the film thickness ratio T2/T1 of the auxiliary magnetic pole layer 14=1, refer to FIG. 21). Solid line 18B shows the thin film magnetic head of the invention (having the film thickness of T2/T1≠1, refer to FIG. 2).

The intensity of the perpendicular magnetic field distributes, generally, so as to be the maximum (peak) in/around the present recording position and gradually decreases in the past recording position. In this case, as understood from the results shown in FIG. 18, in/around the present recording position N1, the peak intensity of the perpendicular magnetic field in the comparative example (18A) and that in the invention (18B) are almost equal to each other. In the past recording position N2, however, the intensity of the perpendicular magnetic field in the invention (18B) is lower than that of the comparative example (18A). From the above, it was confirmed that the difference between the intensity of the perpendicular magnetic field in the current recording position and that in the past recording position is larger and the perpendicular magnetic field distribution is stabilized in the invention.

Figure 19:
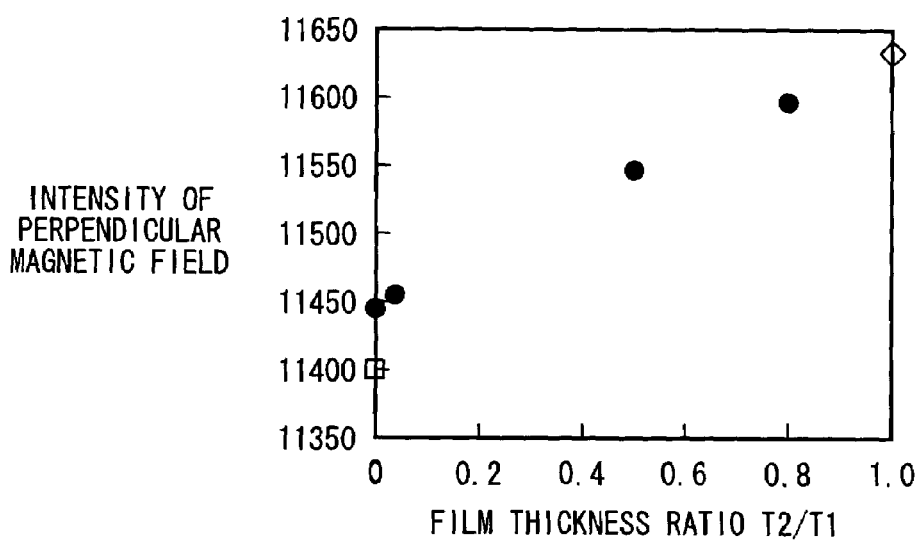
FIG. 19 is a diagram showing results of experiments regarding a change in peak intensity of a perpendicular magnetic field.
Figure 20:
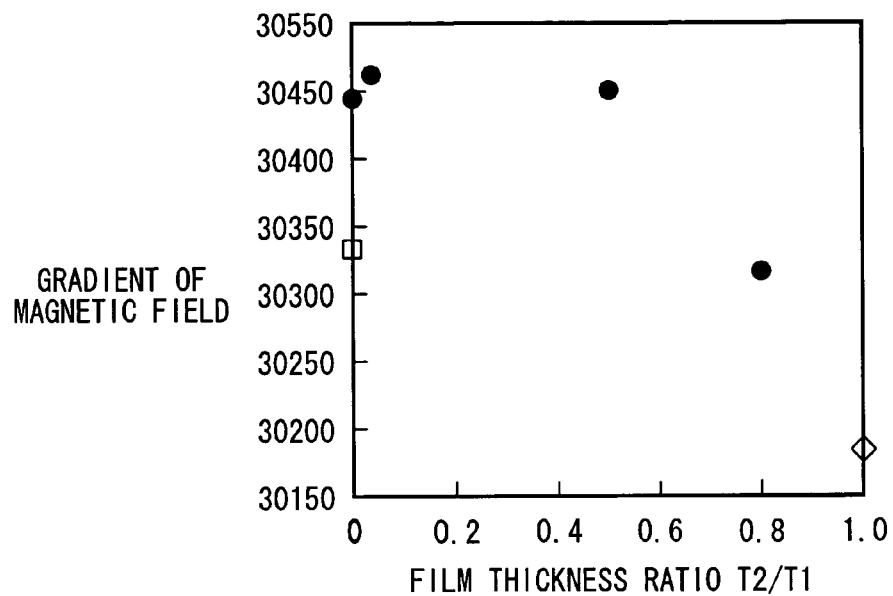
FIG. 20 is a diagram showing results of experiments regarding a change in the magnetic field gradient of the perpendicular magnetic field.

FIG. 19 is a diagram illustrating a change in the peak intensity of the perpendicular magnetic field. The "lateral axis" denotes the film thickness ratio T2/T1 and the "vertical axis" indicates peak intensity of the perpendicular magnetic field ($10^3/(4\pi)$A/m). The symbol "□" in FIG. 19 represents a thin film magnetic head of a first comparative example (having no auxiliary magnetic pole layer 14). The symbol "◇" indicates a thin film magnetic head of a second comparative example (having the auxiliary magnetic pole layer 14 and the film thickness ratio T2/T1=1, refer to FIG. 21). The symbol "●" shows the thin film magnetic head of the invention (having the auxiliary magnetic pole layer 14 and the film thickness ratio T2/T1≠1, refer to FIG. 2).

As understood from the results shown in FIG. 19, the peak intensity of the first comparative example (□) was $11,400 \times 10^3/(4\pi)$A/m. The peak intensity of the second comparative example (◇) was $11,633 \times 10^3/(4\pi)$A/m. The peak intensity of the invention (●) was $11,445 \times 10^3/(4\pi)$A/m to $11,595 \times 10^3/(4\pi)$A/m. From the results, it was confirmed that the sufficient intensity of the perpendicular magnetic field which is higher than that of the first comparative example was obtained in the second comparative example and the invention.

FIG. 20 is a diagram illustrating a change in the magnetic field gradient of the perpendicular magnetic field. The "lateral axis" denotes the film thickness ratio T2/T1 and the "vertical axis" indicates the magnetic field gradient ($[10^3/(4\pi)$A/m]/μm). The magnetic field gradient denotes a difference of the perpendicular magnetic field intensity per unit length (interval between the current recording position and a past recording position) in the same track of a recording medium. The symbols "□", "◇", and "●" In FIG. 20 are similar to those in FIG. 19.

As understood from the results shown in FIG. 20, the peak intensity of the first comparative example (□) was $30,333 \times 10^3/(4\pi)$A/m. The peak intensity of the second comparative example (◇) was $30,177 \times 10^3/(4\pi)$A/m. The peak intensity of the invention (●) was $30,317 \times 10^3/(4\pi)$A/m to $30,460 \times 10^3/(4\pi)$A/m. From the results, it was confirmed that the sufficient magnetic field gradient which is higher than that of the second comparative example was obtained in the first comparative example and the invention.

The results confirmed on the basis of FIGS. 19 and 20 will be summarized as follows. It was clarified that, in the invention, the peak intensity of the perpendicular magnetic field is assured when the film thickness ratio T2/T1 is in the range of $0 \leq T2/T1 \leq 0.8$, and the magnetic field gradient almost equal to or higher than that of the first comparative example (having no auxiliary magnetic pole layer) can be assured. In particular, in the embodiment, when the film thickness ratio T2/T1 is in the range of $0 \leq T2/T1 \leq 0.5$, the magnetic field gradient larger than that of the first comparative example can be assured. Further, when the range ($0 < T2/T1 \leq 0.8$) in which precision of forming the main magnetic pole layer 12 can be assured is also considered, the film thickness ratio T2/T1 is set preferably in the range of $0 < T2/T1 \leq 0.8$, more preferably, in the range of $0 < T2/T1 \leq 0.5$.

Second Embodiment

First, the configuration of a thin film magnetic head according to a second embodiment of the invention will be described with reference to FIGS. 22A and 22B to FIG. 24.

Figures 22A, 22B:
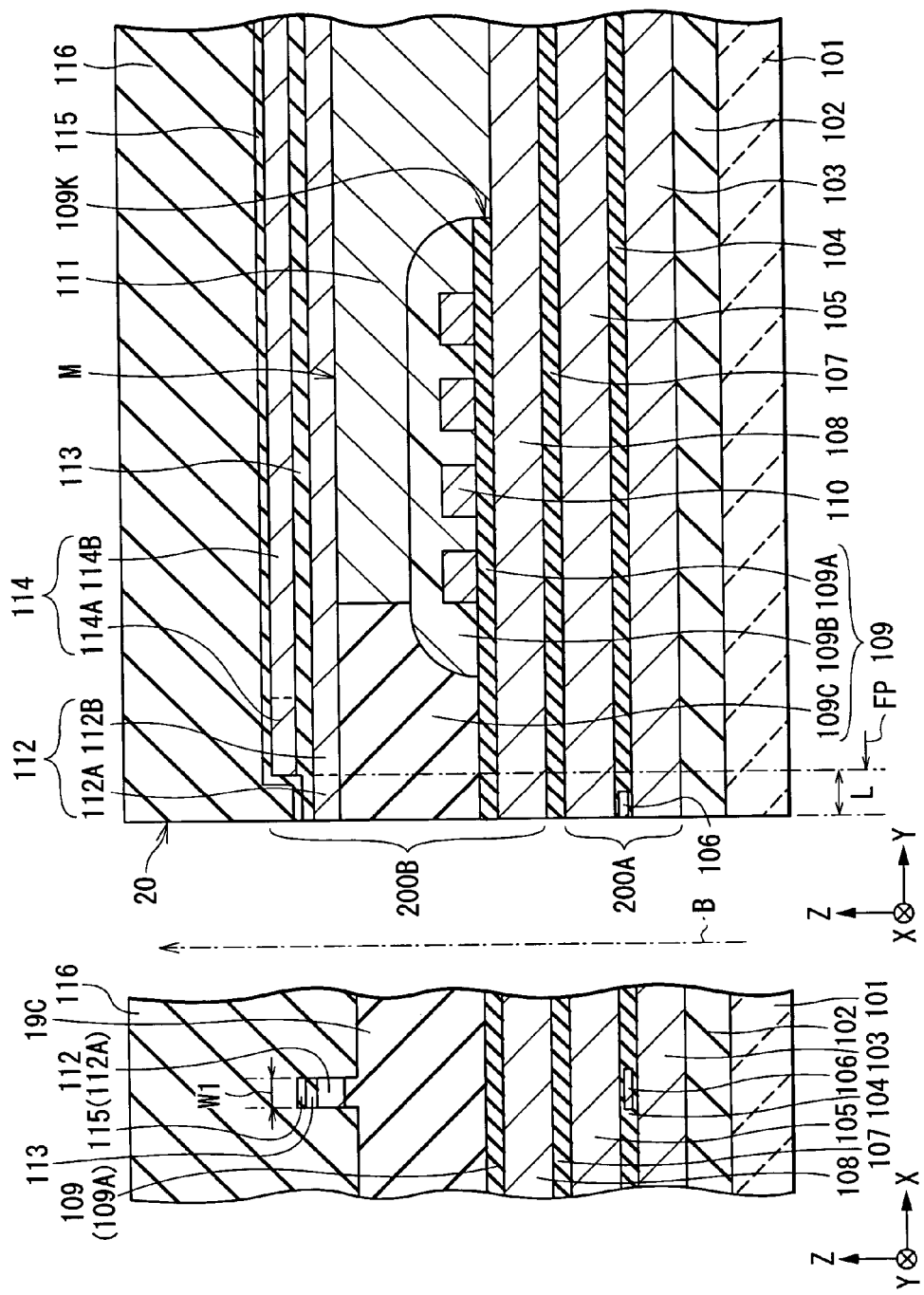
FIGS. 22A and 22B are cross sections each showing a sectional configuration of a thin film magnetic head according to a second embodiment of the invention.
Figure 23:
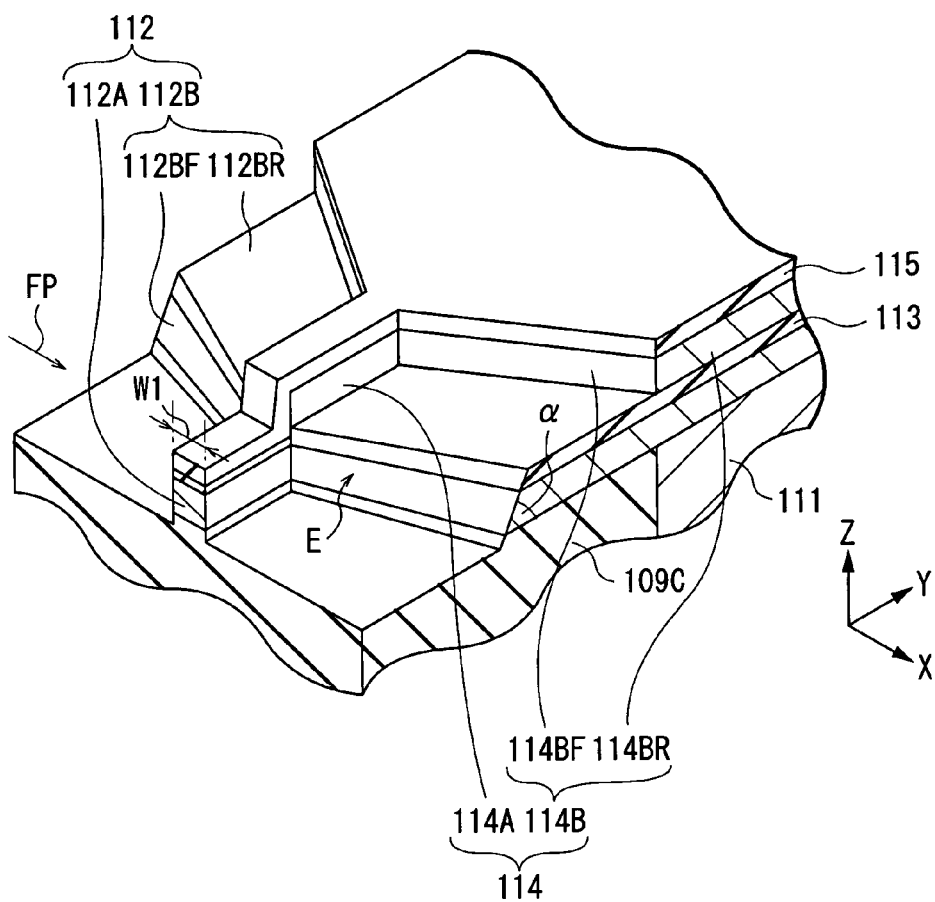
FIG. 23 is an enlarged perspective view showing the configuration of a main component of the thin film magnetic head illustrated in FIGS. 22A and 22B.
Figure 24:
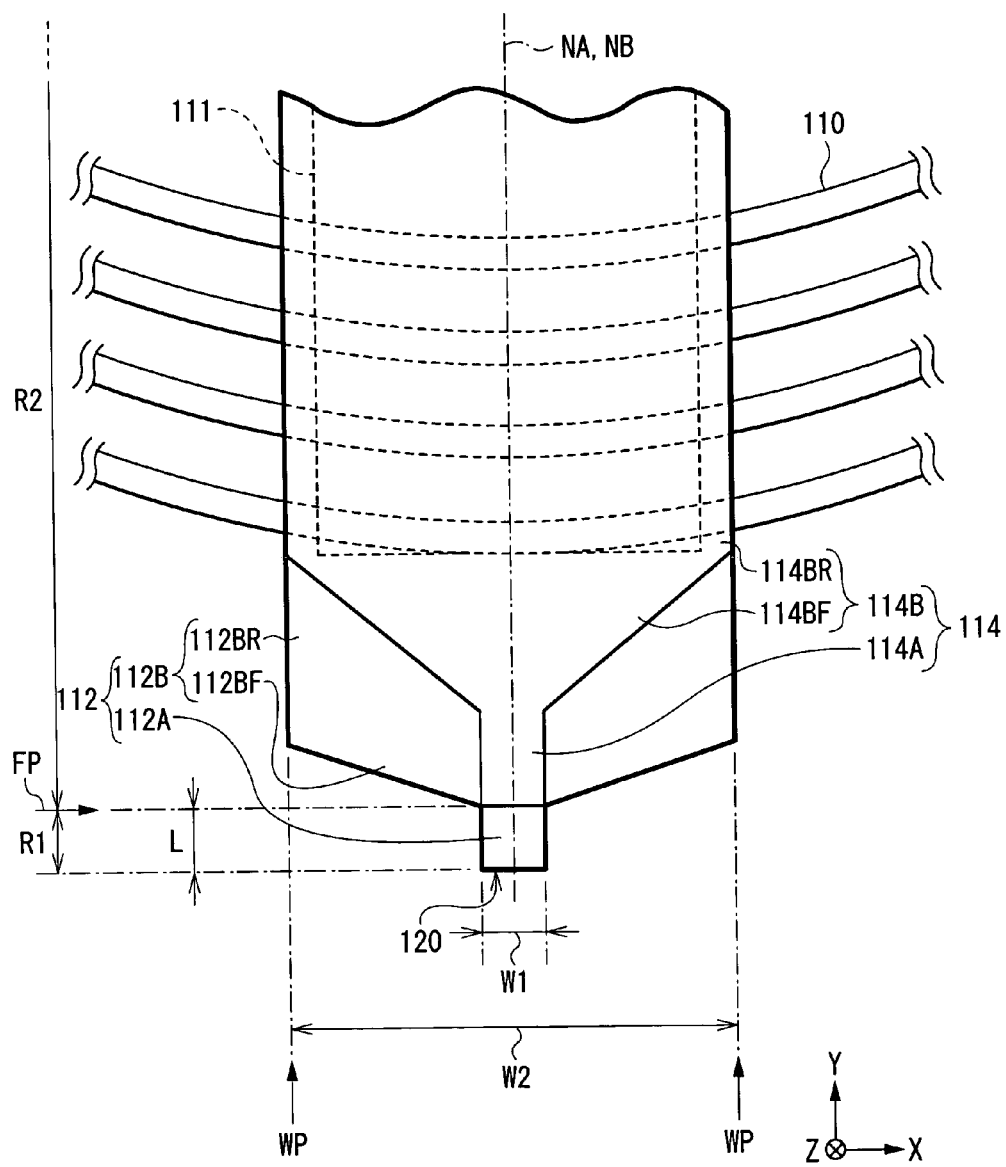
FIG. 24 is an enlarged plan view showing a main component of the thin film magnetic head illustrated in FIGS. 22A and 22B.

FIGS. 22A and 22B show sectional configurations of a thin film magnetic head. FIG. 22A shows a section parallel to an air bearing surface and FIG. 22B shows a section perpendicular to the air bearing surface. FIG. 23 is an enlarged perspective view showing the configuration of a main component of the thin film magnetic head illustrated in FIGS. 22A and 22B. FIG. 24 is an enlarged plan view showing the configuration of a main component of the thin film magnetic head. An upward arrow B shown in FIGS. 22A and 22B indicates the travel direction of a recording medium (not shown) relative to the thin film magnetic head.

In the following description, the dimension in the X-axis direction shown in FIGS. 22A and 22B to FIG. 24 will be described as "width", the dimension in the Y-axis direction will be described as "length", and the dimension in the Z-axis direction will be described as "thickness". The side closer to the air bearing surface in the Y-axis direction will be described as "front side or forward" and the side opposite to the front side will be described as "rear side or rearward". The description will be similarly used in FIGS. 25A and 25B and subsequent drawings.

The thin film magnetic head is, for example, a composite head capable of executing the functions of both recording and reproducing. As shown in FIGS. 22A and 22B, the thin film magnetic head has a configuration obtained by stacking, on a substrate 101 made of a ceramic material such as AlTiC ($Al_2O_3 \cdot TiC$), an insulating layer 102 made of a non-magnetic insulating material such as aluminum oxide ($Al_2O_3$, hereinbelow, simply called "alumina"), a reproducing head 200A for executing a reproducing process by using a magneto-resistive (MR) effect, a non-magnetic layer 107 made of a non-magnetic material such as alumina, a recording head 200B of a single magnetic pole type for executing a recording process of a perpendicular recording method, and an overcoat layer 116 made of a non-magnetic insulating material such as alumina. The layers are stacked in this order.

The reproducing head 200A has, for example, a configuration in which a lower shield layer 103, a shield gap film 104, and an upper shield layer 105 are stacked in this order. In the shield gap film 104, an MR device 106 as a reproducing device is buried so that one end face is exposed in a recording medium facing surface (air bearing surface) 120 which faces a recording medium.

The lower and upper shield layers 103 and 105 are made of, for example, a magnetic material such as a nickel iron alloy (NiFe (for example, Ni: 80% by weight and Fe: 20% by weight) which will be simply called "permalloy (trademark)" hereinbelow). Each of the layers has a thickness of about 1.0 to 2.0 µm. The shield gap film 104 is used to electrically isolate the MR device 106 from the periphery and is made of, for example, a non-magnetic insulating material such as alumina. The MR device 106 is provided to execute a reproducing process by using GMR (Giant Magneto-resistive) effect or TMR (Tunneling Magneto-resistive) effect.

The recording head 200B has a configuration obtained by, for example, sequentially stacking a return yoke layer 108, a thin film coil 110 for generating a magnetic flux, which is buried by a gap layer 109 having an opening 109K, a yoke layer 111 magnetically connected to the return yoke layer 108 through the opening 109K, a main magnetic pole layer 112 magnetically connected to the return yoke layer 108 via the yoke layer 111, an auxiliary magnetic pole layer 114 sandwiching a non-magnetic 113 with the main magnetic pole layer 112, and a buffer layer 115. In FIG. 24, the non-magnetic layer 113 and the buffer layer 115 are not shown. A stacked structure obtained by stacking the main magnetic pole layer 112, non-magnetic layer 113, and auxiliary magnetic pole layer 114 in this order corresponds to a concrete example of a "magnetic pole layer" in the invention.

The return yoke layer 108 is provided to return a magnetic flux emitted from the main magnetic pole layer 112 to the outside into the recording head 200B. The return yoke layer 108 is made of a magnetic material such as permalloy (for example, Ni of 80% by weight and Fe of 20% by weight) and has a thickness of about 1.0 µm to 5.0 µm.

The gap layer 109 includes a gap layer portion 109A with the opening 109K provided on the return yoke layer 108, a gap layer portion 109B provided on the gap layer portion 109A and covering spacings between turns of the thin film coil 110 and the peripheral area of the thin film coil 110, and a gap layer portion 109C which partially covers the gap layer portions 109A and 109B. The gap layer portion 109A is made of a non-magnetic insulating material such as alumina and has a thickness of about 0.1 µm to 1.0 µm. The gap layer portion 109B is made of, for example, a photoresist (photosensitive resin) which exhibits fluidity when heated, spin on glass (SOG), or the like. The gap layer portion 109C is made of, for example, a non-magnetic insulating material such as alumina or silicon oxide ($SiO_2$) and has a thickness larger than that of the gap layer portion 109B.

The yoke layer 111 is provided to magnetically connect the return yoke layer 108 and the magnetic pole layer 112 and is made of, for example, a magnetic material such as permalloy (for example, Ni: 80% by weight and Fe: 20% by weight). The surface level in the thickness direction of the yoke layer 111 is flush with the surface level in the thickness direction of the gap layer portion 109C, that is, the yoke layer 111 and the gap layer portion 109C form a flat surface M.

The thin film coil 110 is made of a high-conductive material such as copper (Cu) and has a winding structure that a wire is wound in a spiral shape around a connection portion between the return yoke layer 108 and the yoke layer 111. In each of FIG. 22A and FIG. 24, only a part of a plurality of turns constructing the thin film coil 110 is shown.

The stacked structure obtained by stacking the main magnetic pole layer 112, non-magnetic layer 113, and auxiliary magnetic pole layer 114 in this order (hereinbelow, also simply called "stacked structure") holds a magnetic flux generated from the thin film coil 110 and emits the magnetic flux toward a recording medium (not shown). The stacked structure as a whole has, for example, as shown in FIG. 24, a plane shape including a uniform width area R1 having a uniform width W1 specifying the recording track width of the recording medium and a wide area R2 having a width W2 (W2>W1) wider than the uniform width area R1. The "plane shape" in this case denotes a silhouette shape of the plane configuration of the stacked structure constructed by the main magnetic pole layer 112, non-magnetic layer 113, and auxiliary magnetic pole layer 114 and is, concretely, the shape of the area indicated by a thick line in FIG. 24. The position from which the width of the stacked structure from the uniform width area R1 to the wide area R2 corresponds to a "flare point (width increase point) FP" as one of important factors which determine the recording performance of the thin film magnetic head. The main magnetic pole layer 112 and the auxiliary magnetic pole layer 114 have, for example, plane shapes different from each other.

The main magnetic pole layer 112 is a portion as a main path of a magnetic flux. The main magnetic pole layer 112 is made of a magnetic material having a saturated magnetic flux density higher than that of the auxiliary magnetic pole layer 114, for example, permalloy (for example, Ni of 80% by weight and Fe of 20% by weight or Ni of 45% by weight and Fe of 55% by weight), iron nitride (FeN), iron-cobalt-based alloys or the like. The thickness of the main magnetic pole layer 112 is about 0.1 µm to 0.5 µm. Examples of the iron-cobalt-based alloys are iron cobalt alloy (FeCo), iron cobalt alloy nitride (FeCoN), iron cobalt alloy oxide (FeCoO), and cobalt iron nickel alloy (CoFeNi).

The main magnetic pole layer 112 has one end face exposed in the air bearing surface 120 and extends rearward from the air bearing surface 120. The main magnetic pole layer 112 includes, for example, in order from the side close to the air bearing surface 120, a front end portion 112A and a rear end portion 112B connected to the rear end of the front end portion 112A. The front end portion 112A mainly functions as a main magnetic flux emitting portion for emitting a magnetic flux to the outside in order to generate a perpendicular magnetic field for recording. The front end portion 112A has the uniform width W1 specifying the recording track width of the recording medium, and the uniform width area R1 is specified by the plane shape. The rear end portion 112B mainly functions as a main magnetic flux holding portion for holding the magnetic flux generated by the thin film coil 110. The rear end portion 112B has a width W2 larger than the width W1 of the front end portion W1 (W2>W1). The flare point FP is specified by the connection portion between the front end portion 112A and the rear end portion 112B. The peripheral area of the front end portion 112A in the gap layer portion 109C is partially etched deep.

In particular, the rear end portion 112B includes, as shown in FIGS. 23 and 24, a forward portion 112BF of which width gradually increases rearward from the flare point FP and a rearward portion 112BR connected to the forward portion 112BF and having the uniform width W2. As shown in FIG. 23, the front end face E of the forward portion 112BF (end face close to the air bearing surface 120) is gradually inclined with distance from the front end portion 112A with respect to the plane (plane including the X-axis and Y-axis) extended from the main magnetic pole layer 112. When it is assumed that the angle formed by the front end face E and the plane extended from the main magnetic pole layer 112 is α, the inclination angle α in one of both wing tip positions WP (refer to FIG. 24) of the rear end portion 112b is, for example, about 10 to 60 degrees, concretely, about 30 degrees. The front end portion 112A corresponds to "first main magnetic pole layer portion" in the invention, and the rear end portion 112B corresponds to "second main magnetic pole layer portion" in the invention. The forward portion 112BF in the rear end portion 112B corresponds to a concrete example of "main magnetic pole wide portion" in the invention.

The non-magnetic layer 113 mainly functions as a stopper layer for suppressing progress of an etching process at the time of forming the main magnetic pole layer 112 and is provided so as to be sandwiched between the main magnetic pole layer 112 and the auxiliary magnetic pole layer 114. The details of the function of the non-magnetic layer 113 as the stopper layer will be described later in "Method of Manufacturing Thin Film Magnetic Head". The non-magnetic layer 113 is made of, for example, a non-magnetic material having an etch rate lower than that of the auxiliary magnetic pole layer 114, which is concretely alumina. The thickness of the non-magnetic layer 113 is about 0.015 µm to 0.65 µm. The non-magnetic layer 113 has a plane shape corresponding to the main magnetic pole layer 112. In other words, the non-magnetic layer 113 has a plane shape similar to that of the main magnetic pole layer 112.

The auxiliary magnetic pole layer 114 is a portion serving as an auxiliary magnetic flux path for supplying the magnetic flux to the front end portion 112A of the main magnetic pole layer 112 and is completely isolated from the main magnetic pole layer 112 sandwiching the non-magnetic layer 113. The auxiliary magnetic pole layer 114 is made of a magnetic material such as permalloy (made of, for example, 80% by weight of Ni and 20% by weight of Fe or 45% by weight of Ni and 55% by weight of Fe), a cobalt iron nickel alloy or the like and has a thickness of about 0.1 µm to 0.6 µm.

One end face of the auxiliary magnetic pole layer 114 is recessed from the air bearing surface 120. The auxiliary magnetic pole layer 114 is disposed in the wide area R2 so as to be apart from the air bearing surface 120 only by a predetermined distance (recess distance L=about 0.1 µm to 1.0 µm). The auxiliary magnetic pole layer 114 extends rearward from the flare point FP and includes, for example, in order from the flare point FP, a front end portion 114A having the uniform width W1 same as that of the front end portion 112A and a rear end portion 114B connected to the rear end of the front end portion 114A and having a width larger than that of the front end portion 114A. The front end portion 114A does not always have to have the same uniform width as that of the front end portion 112A but may have a uniform width different from the width of the front end portion 112A. Specifically, as shown in FIGS. 23 and 24, the rear end portion 114B includes: a front side portion 114BF which is gradually widened rearward from the connection position of the front end portion 114A and the rear end portion 114B; and a rear side portion 114BR connected to the front side portion 114BF and having a uniform width W2. The front end portion 114A corresponds to a concrete example of "first auxiliary magnetic pole layer portion" in the invention, and the rear end portion 114B corresponds to a concrete example of "second auxiliary magnetic pole layer portion" in the invention. The front side portion 114BF of the rear end portion 114B corresponds to a concrete example of "auxiliary magnetic pole wide portion" in the invention.

The buffer layer 115 mainly functions as a stopper layer for suppressing progress of an etching process at the time of forming the main magnetic pole layer 112 and the auxiliary magnetic pole layer 114 and for preventing positional deviation of the predetermined flare point FP during formation of the main magnetic pole layer 112. The buffer layer 115 is disposed adjacent to the stacked structure constructed by the main magnetic pole layer 112, non-magnetic layer 113, and auxiliary magnetic pole layer 114. The details of the function of the buffer layer 115 as the stopper layer will be described later. The buffer layer 115 is made of, for example, a non-magnetic material of which etching rate is lower than that of the main magnetic pole layer 112 and the auxiliary magnetic pole layer 114 and is easily patterned by using reactive ion etching (RIE), concretely, alumina, tantalum (Ta), titanium (Ti), or the like. The buffer layer 115 has a plane shape corresponding to a body obtained by combining the front end portion 112A of the main magnetic pole layer 112 and the front end portion 114A and the rear end portion 114B of the auxiliary magnetic pole layer 114. The buffer layer 115 corresponds to a concrete example of "non-magnetic mask layer" in the invention.

The operation of the thin film magnetic head will now be described with reference to FIGS. 22A and 22B to FIG. 24.

In the thin film magnetic head, at the time of recording information, when a current flows into the thin film coil 110 of the recording head 200B via a not-shown external circuit, a magnetic flux is generated by the thin film coil 110. The magnetic flux generated at this time is held mainly by the main magnetic pole layer 112 via the yoke layer 111 and is also held by the auxiliary magnetic pole layer 114 via the non-magnetic layer 113. The magnetic flux held in the main magnetic pole layer 112 flows from the rear end portion 112B to the front end portion 112A. On the other hand, the magnetic flux held in the auxiliary magnetic pole layer 114 similarly flows from the rear end portion 114B to the front end portion 114A. At this time, the magnetic flux flowing from the rear end portion 112B to the front end portion 112A in the main magnetic pole layer 112 is converged at the flare point FP as the width of the main magnetic pole layer 112 decreases (from W2 to W1). The magnetic flux flowing from the rear end portion 114B to the front end portion 114A in the auxiliary magnetic pole layer 114 is concentrated on a portion near the tip of the front end portion 114A. After that, the magnetic flux flows again into the front end portion 112A in the main magnetic pole layer 112 via the non-magnetic layer 113. By the operation, the magnetic flux is concentrated mainly on a trailing side portion in the front end portion 112A. When the magnetic flux is emitted from the front end portion 112A to the outside, a magnetic field (perpendicular magnetic field) is generated in the direction orthogonal to the surface of a recording medium and the recording medium is magnetized in the vertical direction by the perpendicular magnetic field, thereby magnetically recording information onto the recording medium.

The "trailing side" is, when a movement state of the recording medium in the travel direction B of the recording medium (refer to FIGS. 22A and 22B) is regarded as a flow, the outflow side of the recording medium (medium outflow side). Concretely, the trailing side is the side (upper side) far from the gap layer 109 in the thickness direction (Z-axis direction). On the other hand, the inflow side (medium inflow side), that is, the side close to the gap layer 109 is called a "leading side".

At the time of reproduction, when a sense current flows into the MR device 106 in the reproducing head 200A, the resistance value of the MR device 106 changes according to a signal magnetic field for reproduction from the recording medium. By detecting the resistance change as a change in the sense current, the information recorded on the recording medium is magnetically read.

In the thin film magnetic head according to the embodiment, since the rear end portion 112B of the main magnetic pole layer 112 includes the front side portion 112BF which is gradually widened from the flare point FP to the rear, when the magnetic flux flows from the rear end portion 112B into the front end portion 112A in the main magnetic pole layer 112, the magnetic flux flows along the front end face E of the front side portion 112BF. Specifically, the magnetic flux flows into the front end portion 112 while being gradually narrowed as the width of the front side portion 112BF decreases. In this case, different from the case where the rear end portion 112B generally has a uniform width and the width of the main magnetic pole layer 112 is sharply narrowed at the flare point FP, the magnetic flux flowing from the rear end portion 112B into the front end portion 112A is not sharply narrowed. It suppresses magnetic flux saturation in the flare point FP and the magnetic flux smoothly flows from the rear end portion 112B to the front end portion 112A, so that a sufficient magnetic flux is supplied to the trailing side portion of the front end portion 112A. Therefore, in the embodiment, the emission amount of the magnetic flux increases and, accordingly, intensity of the perpendicular magnetic field and the magnetic field gradient are assured. Thus, recording performance can be improved.

In the embodiment, the front end face E of the rear end portion 112B is gradually inclined with distance from the front end portion 112A. Consequently, occurrence of side erase can be suppressed while setting the flare point FP more to the front side for the following reason. As described in "Description of the Related Art", when the rear end portion 112B as a magnetic flux supply portion is set close to the air bearing surface 120, a sufficient magnetic flux can be supplied to the front end portion 112A as a track width specifying portion. However, when the rear end portion 112B is set too close to the air bearing surface 120, the magnetic flux is directly emitted not only from the front end portion 112A but also from the rear end portion 112B, and it is feared that side erase occurs due to the excessive magnetic flux emission. The "side erase" is a phenomenon such that unnecessary writing is performed on an adjacent track area other than an inherent track area to be recorded by the magnetic flux excessively emitted and information recorded in the adjacent track area is unintentionally overwritten. With respect to this point, in the embodiment, the front end face E of the rear end portion 112B is gradually inclined with distance from the front end portion 112A. In the front end face E, the upper end portion is recessed more than the lower end portion toward the both wing tip positions WP. Consequently, the flare point FP is specified by the final limit forward position of the lower end portion. In the upper end portions of both wings, effects similar to those of the case where the rear end portion 112B is set far from the air bearing surface 120 are obtained. Thus, while setting the flare point FP to the front side, occurrence of the side erase can be suppressed.

In the embodiment, the rear end portion 114B of the auxiliary magnetic pole layer 114 includes the front side portion 114BF which is gradually widened rearward from the connection position of the front end portion 114A and the rear end portion 114B. Consequently, by an action similar to that of the front side portion 112BF of the main magnetic pole layer 112, when the magnetic flux flows from the rear end portion 114B to the front end portion 114A in the auxiliary magnetic pole layer 114, magnetic flux saturation in the connection position between the front end portion 114A and the rear end portion 114B is suppressed and the magnetic flux smoothly flows from the rear end portion 114B into the front end portion 114A. Therefore, also from this viewpoint, the invention can contribute to improve the recording performance.

In the embodiment, the saturation magnetic flux density of the main magnetic pole layer 112 is set to be equal to or higher than that of the auxiliary magnetic pole layer 114, so that the magnetic flux holding amount in the main magnetic pole layer 112 including the front end portion 112A as the main magnetic flux emitting portion increases more than in the auxiliary magnetic pole layer 114. From this viewpoint as well, the invention can therefore contribute to assurance of the intensity of the perpendicular magnetic field.

In the embodiment, the upper shield layer 105 and the return yoke layer 108 are isolated from each other with the non-magnetic layer 107 in between so that the upper shield layer 105 and the return yoke layer 108 are layers different from each other. However, the invention is not always limited to the embodiment. For example, the non-magnetic layer 107 may not be provided and the upper shield layer 105 and the return yoke layer 108 may be integrally formed. In this case, the thickness of an integral layer of the upper shield layer 105 and the return yoke layer 108 (an upper shield layer-cum-return yoke) can be set properly.

A method of manufacturing the thin film magnetic head according to the embodiment will be described with reference to FIGS. 22A and 22B to FIG. 34. FIGS. 25A and 25B to FIGS. 29A and 29B show sectional configurations of a series of processes in the process of manufacturing the thin film magnetic head. FIG. 30 to FIG. 34 are perspective views corresponding to the processes shown in FIGS. 25A and 25B to FIGS. 29A and 29B, respectively.

In the following, first, an outline of the method of manufacturing a thin film magnetic head as a whole will be described. After that, a method of forming main components, that is, a stacked structure constructed by the main magnetic pole layer 112, non-magnetic layer 113, and auxiliary magnetic pole layer 114 to which the method of manufacturing the thin film magnetic head of the invention is applied will be described in detail. At the time of describing the method of manufacturing the thin film magnetic head and the method of forming the main components, since the materials, positions, structural features, and the like of the components have been already described in detail, their description will not be repeated.

The thin film magnetic head is manufactured by sequentially forming components and stacking the components by using, mainly, a thin film process including a film forming technique such as plating and sputtering, a patterning technique such as photolithography technique, and an etching technique such as dry etching. Specifically, first, the insulating layer 102 is formed on the substrate 101 and, after that, the lower shield layer 103, the shield gap film 104 in which the MR device 106 is buried, and the upper shield layer 105 are stacked on the insulating layer 102 in accordance with this order, thereby forming the reproducing head 200A.

Subsequently, the non-magnetic layer 107 is formed on the reproducing head 200A. On the non-magnetic layer 107, the return yoke layer 108, the gap layer 109 (109A, 109B, and 109C) having the opening 109K and burying the thin film coil 110, the yoke layer 111 magnetically connected to the return yoke layer 108 through the opening 109K, the main magnetic pole layer 112 magnetically connected to the return yoke layer 108 via the yoke layer 111, the non-magnetic layer 113, the auxiliary magnetic pole layer 114, and the buffer layer 115 are stacked in this order, thereby forming the recording head 200B.

Finally, the overcoat layer 116 is formed on the recording head 200B and, after that, the air bearing surface 120 is formed by using mechanical process and polishing process, thereby completing the thin film magnetic head.

Figures 25A, 25B:
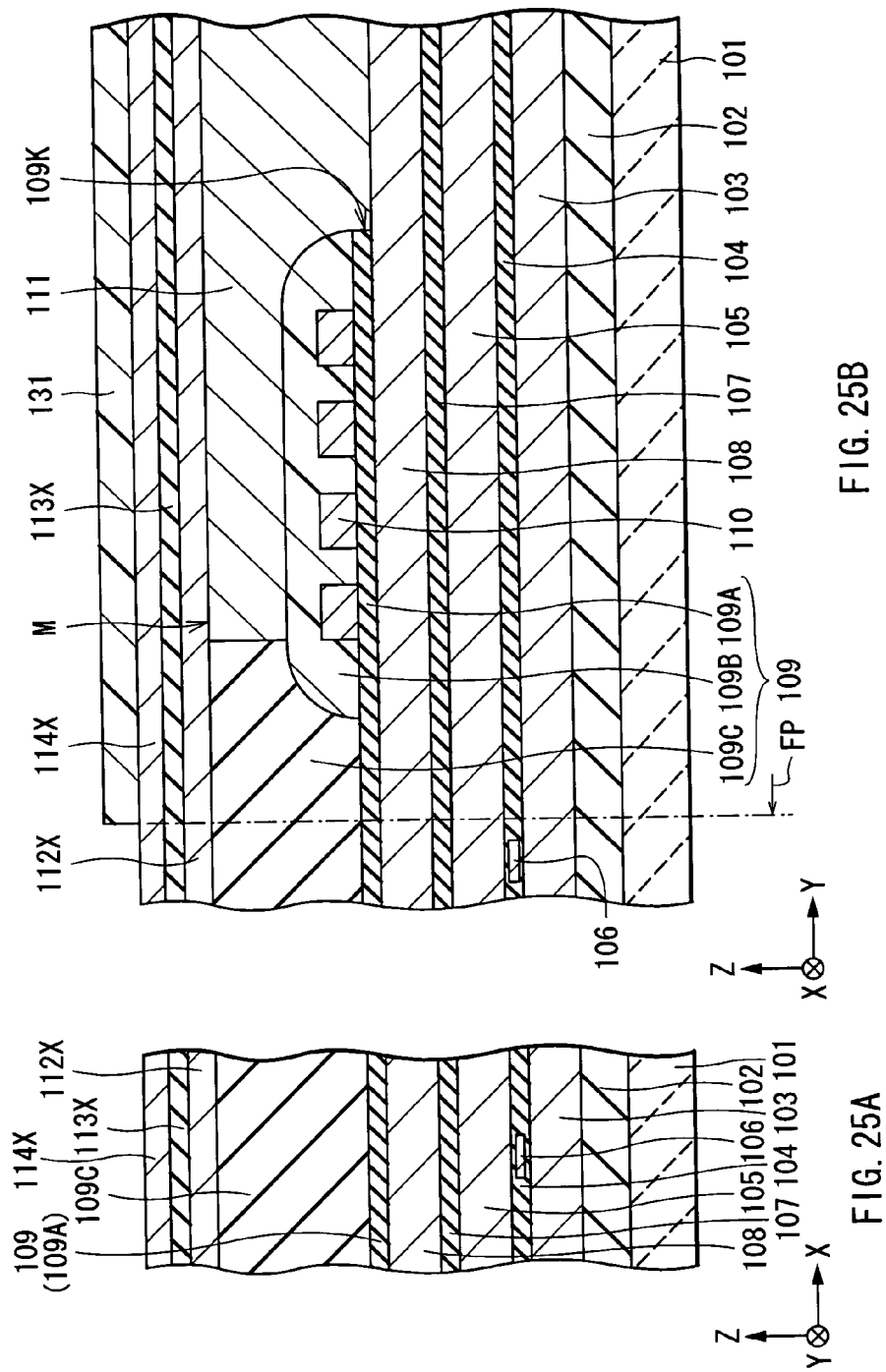
FIGS. 25A and 25B are cross sections for explaining a process in a method of manufacturing the thin film magnetic head according to the second embodiment of the invention.
Figure 30:
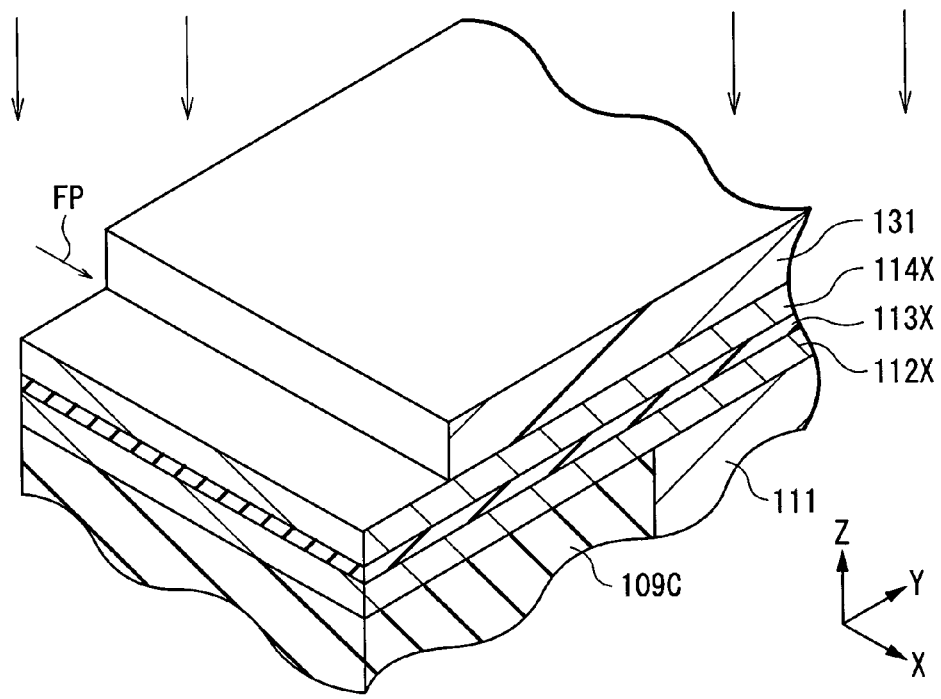
FIG. 30 is a perspective view corresponding to the sectional configuration shown in FIGS. 25A and 25B.

At the time of forming the main components of the thin film magnetic head, the yoke layer 111 is formed. By the yoke layer 111 and the gap layer portion 109C, the flat surface M is formed. After that, as shown in FIGS. 25A and 25B and FIG. 30, a precursor main magnetic pole layer 112X made of a material having high saturation magnetic flux density, a precursor non-magnetic layer 113X made of a non-magnetic material, and a precursor auxiliary magnetic pole layer 114X made of a material having high saturation magnetic flux density are formed and stacked in this order on the flat surface M by using sputtering or the like. The precursor main magnetic pole layer 112X is a preparation layer which becomes the main magnetic pole layer 112 by being patterned in a post process. Similarly, the precursor non-magnetic layer 113X is a preparation layer which becomes the non-magnetic layer 113 in a post process. The precursor auxiliary magnetic pole layer 114X is a preparation layer which becomes the auxiliary magnetic pole layer 114. As a material of the precursor main magnetic pole layer 112X, for example, a material having a saturated magnetic flux density equal to or higher than that of the precursor auxiliary magnetic pole layer 114X is used. Concretely, for example, an iron-cobalt-based alloy (such as FeCo, FeCoN or FeCoO) is used as the material of the precursor main magnetic pole layer 112X. As the material of the precursor auxiliary magnetic pole layer 114X, permalloy (for example, Ni of 80% by weight and Fe of 20% by weight or Ni of 45% by weight and Fe of 55% by weight) is used. As the material of the precursor non-magnetic layer 113X, for example, a material of which etching rate is lower than that of the precursor auxiliary magnetic pole layer 114X, which is concretely alumina is used.

Subsequently, a photoresist film (not shown) is formed on the precursor auxiliary magnetic pole layer 114X. After that, by using a photolithography process, the photoresist film is patterned, thereby forming a mask layer 131 for etching as shown in FIGS. 25A and 30. At the time of forming the mask layer 131, by adjusting the exposure range in the photoresist film at the time of the photolithography process, the area rearward of the flare point FP in the main magnetic pole layer 112 to be finally formed in the precursor auxiliary magnetic pole layer 114X, that is, the area corresponding to the wide area R2 (refer to FIG. 24) is covered. Concretely, for example, the front edge of the mask layer 131 is positioned so as to be recessed from the air bearing surface 120 only by the recess distance L (=about 0.2 μm to 1.0 μm) when the air bearing surface 120 is formed finally.

Figures 26A, 26B:
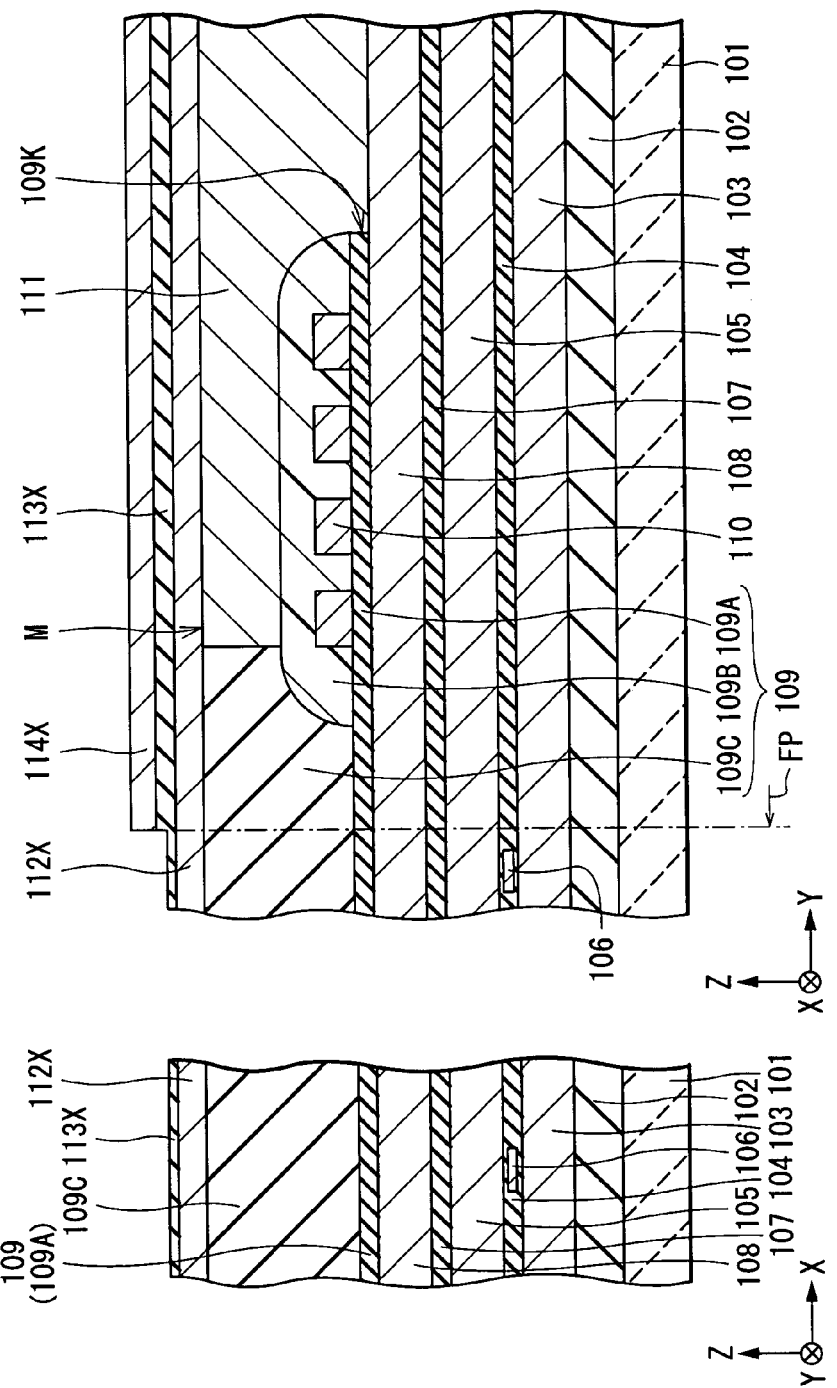
FIGS. 26A and 26B are cross sections showing a process subsequent to FIGS. 25A and 25B.
Figure 31:
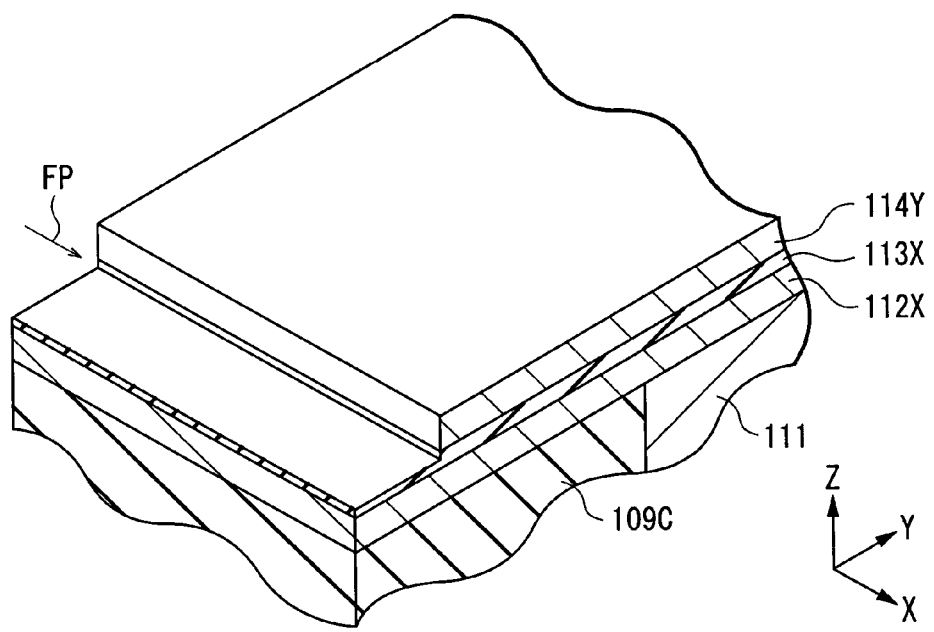
FIG. 31 is a perspective view corresponding to the sectional configuration shown in FIGS. 26A and 26B.

Subsequently, as shown in FIG. 30, by using the mask layer 131 and, for example, ion milling, the etching process is performed on the whole to pattern the precursor auxiliary magnetic pole layer 114X. By the etching process, the area on the front side of the flare point FP in the precursor auxiliary magnetic pole layer 114X is selectively removed and, as shown in FIGS. 26A and 26B and FIG. 31, a precursor auxiliary magnetic pole layer pattern 114Y defining the wide area R2 is formed. In the area which is not covered with the mask layer 131, that is, the area on the front side of the flare point FP, the precursor non-magnetic layer 113X made of alumina of which etching rate is low functions as a stopper layer. Consequently, after the precursor auxiliary magnetic pole layer 114X is removed, the precursor non-magnetic layer 113X is just slightly etched. It can suppress excessive progress of the etching process, so that the precursor main magnetic pole layer 112X which is not an object to be etched can be prevented from being etched.

Figure 32:
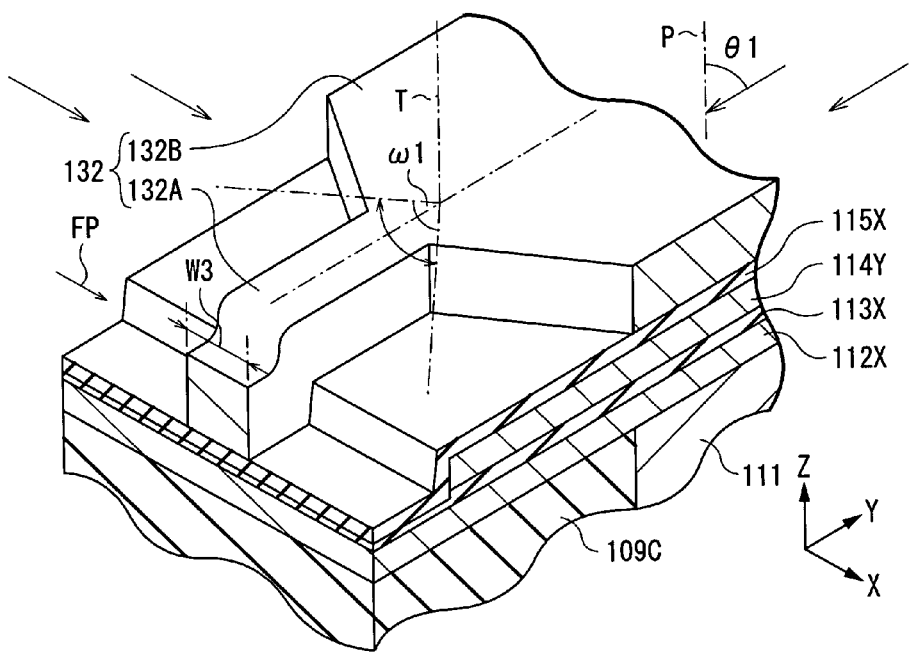
FIG. 32 is a perspective view corresponding to the sectional configuration shown in FIGS. 27A and 27B.

Subsequently, as shown in FIGS. 27A and 27B and FIG. 32, a precursor buffer layer 115X made of a non-magnetic material is formed by using, for example, sputtering so as to cover the exposure face of the precursor non-magnetic layer 113X and the surface of the precursor auxiliary magnetic pole layer pattern 114Y. The precursor buffer layer 115X is a preparation layer which becomes the buffer layer 115 in a post process and is formed so as to include a step D in correspondence with an under structure constructed by the precursor non-magnetic layer 113X and the precursor auxiliary magnetic pole layer pattern 114Y. As the material of the precursor buffer layer 115X, for example, a material of which etching rate is lower than that of each of the precursor main magnetic pole layer 112 and the precursor auxiliary magnetic pole layer 114X is used. Concretely, alumina is used. The precursor buffer layer 115X corresponds to a concrete example of "precursor non-magnetic mask layer" in the invention.

As shown in FIGS. 27A and 27B and FIG. 32, a mask layer 132 for etching made of, for example, permalloy is formed by growing a plating film in an area corresponding both of the uniform width area R1 and the wide area R2 (refer to FIG. 24) on the precursor buffer layer 115X by using, for example, a plating process. The mask layer 132 is formed so as to have a pattern shape including a front end portion 132A having a width W3 larger than the width W1 of the front end portion 114A (W3>W1) and a rear end portion 132B having a width larger than that of the front end portion 132A in almost correspondence with the plane shape of the auxiliary magnetic pole layer 114 to be formed finally. In particular, the front end portion 132A is allowed to extend rearward from the position of the air bearing surface 120 over the step D in a post process and the extending direction of the front end portion 132A is orthogonal to the step D. The mask layer 132 corresponds to a concrete example of "mask layer" in the invention.

Figures 28A, 28B:
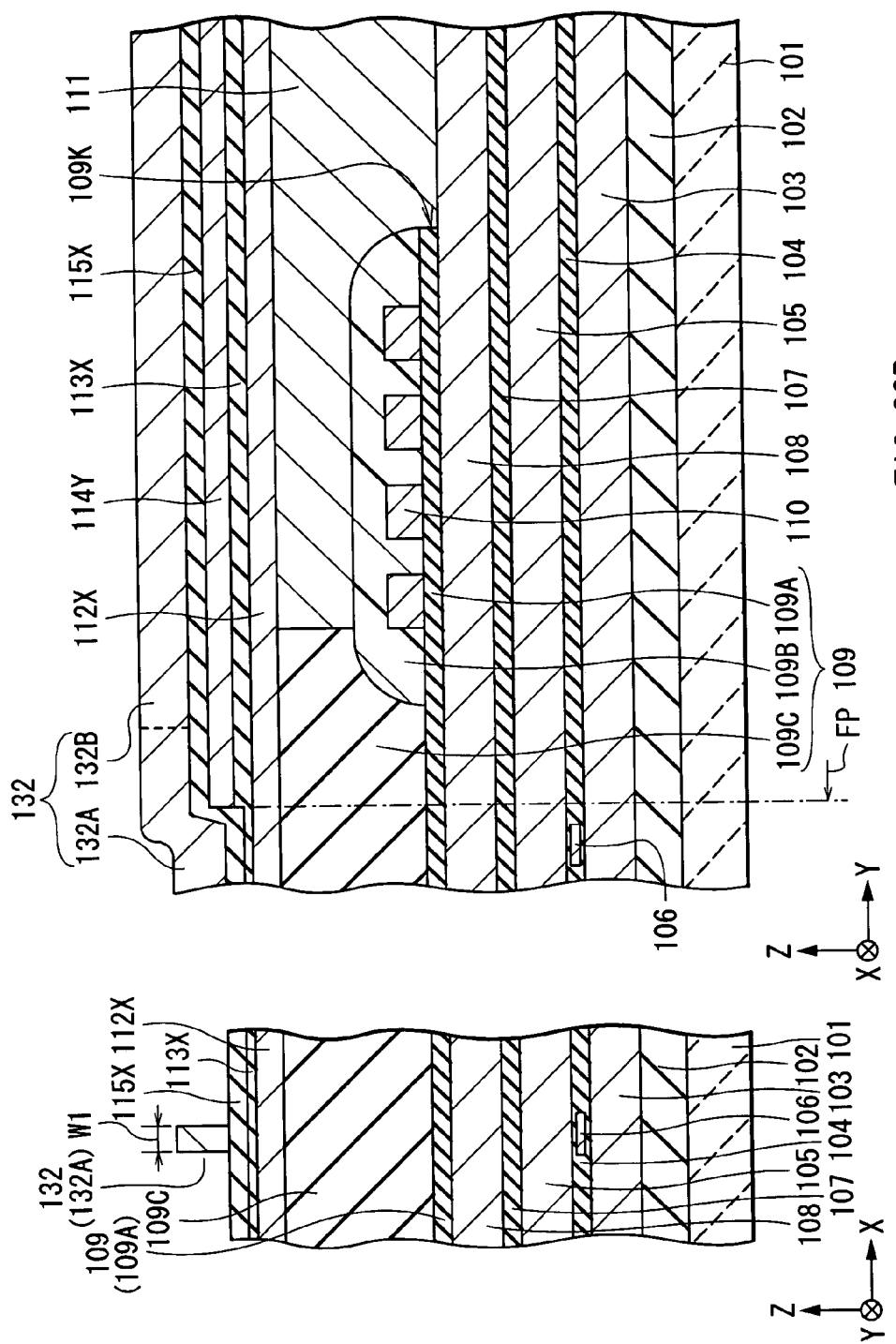
FIGS. 28A and 28B are cross sections showing a process subsequent to FIGS. 27A and 27B.

As shown in FIG. 32, the mask layer 132 is etched by using ion milling to narrow the width of a portion corresponding to the uniform width area R1 in the mask layer 132, that is, the front end portion 132A. Concretely, for example, while emitting an ion beam from a direction at a relatively large angle (irradiation angle) θ1 of about 70±5 degrees from a perpendicular P to the plane extending from the mask layer 132 (plane including the X-axis and Y-axis), the front end portion 132A of the mask layer 132 is selectively subjected to the etching process. In this case, for example, the whole is swung in the width direction only by an angle (swing angle) ω1 of about 225±45 degrees by using, as an axis, the center line T of the mask layer 132 parallel to the perpendicular P. It is not always necessary to swing the whole. For example, the whole may be rotated. By the etching process, mainly, the etching action in the width direction is preferentially performed more than the etching action in the thickness direction. By the etching action in the width direction, the front end portion 132A is etched from both sides. As a result, as shown in FIGS. 28A and 28B and FIG. 33, the width of the front end portion 132A becomes W1 smaller than W3 (W1<W3).

In the following, the etching process in the width direction to reduce the width of the front end portion 132Aa will be particularly called "control trim". Since the peripheral area of the mask layer 132 is covered with the precursor buffer layer 115X functioning as a stopper layer in a manner similar to the precursor non-magnetic layer 113X, the influence of the control trim is not exerted on a precursor auxiliary magnetic pole layer pattern 114Y.

Figure 29B:
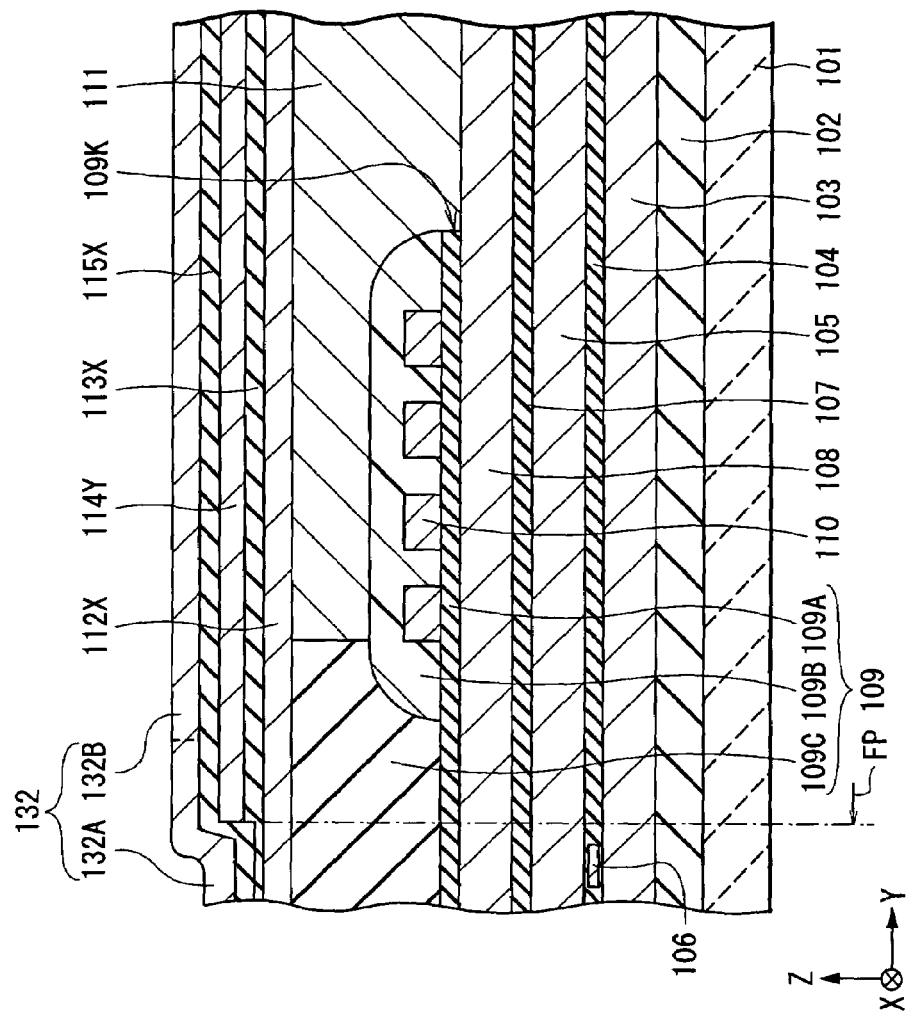
FIGS. 29A and 29B are cross sections showing a process subsequent to FIGS. 28A and 28B.
Figure 29A:
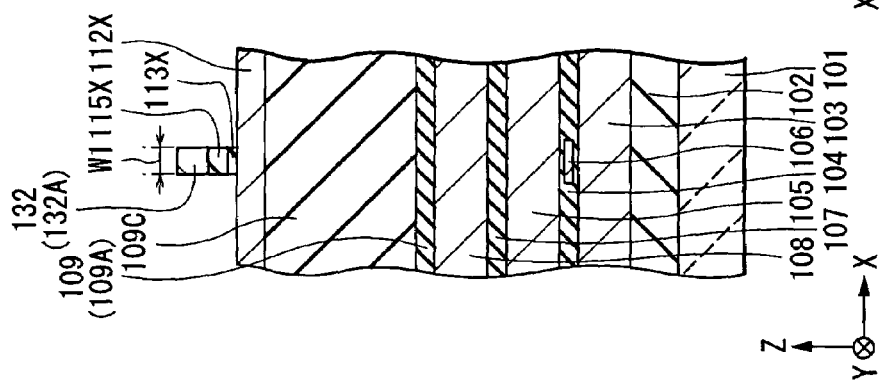
Figure 33:
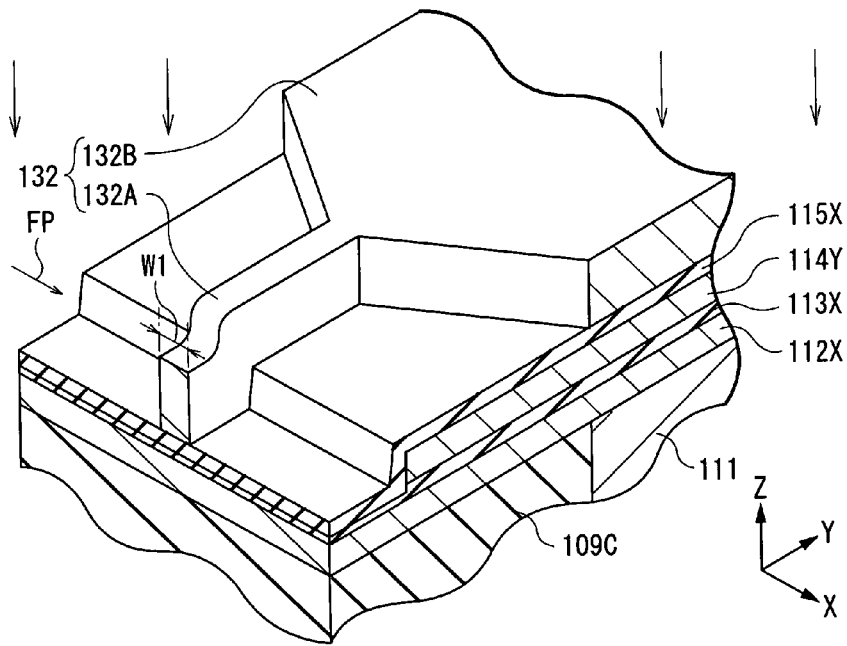
FIG. 33 is a perspective view corresponding to the sectional configuration shown in FIGS. 28A and 28B.

As shown in FIG. 33, by performing the etching process on the whole with the mask layer 132 by using RIE or the like, the precursor buffer layer 115X is patterned. By the etching process, the area other than the portion corresponding to the mask layer 132 in the precursor buffer layer 115X is selectively removed, thereby forming the buffer layer 115 defining the uniform width area R1 so as to have the same plane shape as that of the mask layer 132 as shown in FIGS. 29A and 29B and FIG. 34.

At the time of forming the buffer layer 115, subsequently, by using the buffer layer 115 together with both of the mask layer 132 and precursor auxiliary magnetic pole layer pattern 114Y as a mask, the precursor non-magnetic layer 113X is continuously patterned. By the etching process, as shown in FIGS. 29A and 29B and FIG. 34, the precursor non-magnetic layer pattern 113Y is formed so as to have a plane shape corresponding to a body obtained by combining the buffer layer 115 and the precursor auxiliary magnetic pole layer pattern 114Y. Since the mask layer 132 itself is etched by the etching process for forming the buffer layer 115 and the precursor non-magnetic layer pattern 113Y, the thickness of the mask layer 132 is reduced. At the time point when the precursor non-magnetic layer pattern 113Y is formed, the mask layer 132 may remain (FIGS. 29A and 29B and FIG. 34) or may not remain. The process of forming the buffer layer 115 and the process of forming the precursor non-magnetic layer pattern 113Y do not always have to be continuously performed in the same process. The processes can be performed separately. However, in consideration of simplification of the manufacturing process, it is preferable to perform the processes continuously in the same process.

Figure 34:
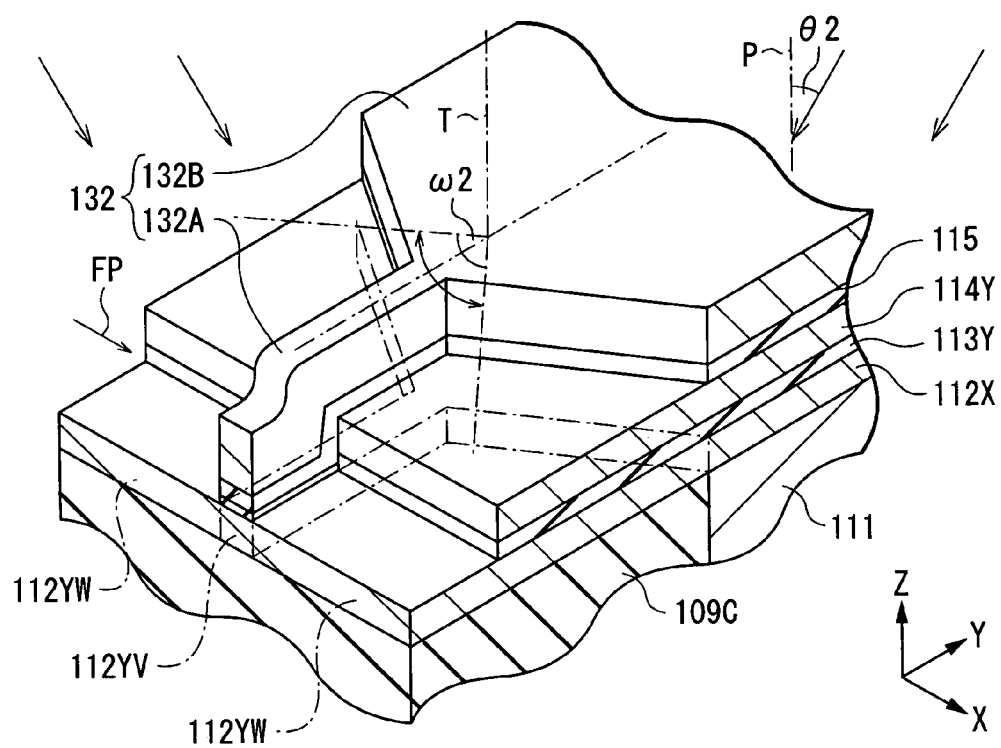
FIG. 34 is a perspective view corresponding to the sectional configuration shown in FIGS. 29A and 29B.

After that, as shown in FIG. 34, by performing the etching process on the whole by using the buffer layer 115 as a mask and using, for example, ion milling, the precursor auxiliary magnetic pole layer pattern 114Y is patterned. Concretely, for example, while emitting an ion beam from a direction at a relatively small irradiation angle θ2 of about 35±10 degrees from a perpendicular P to the plane extending from the precursor auxiliary magnetic pole layer pattern 114Y (plane including the X-axis and Y-axis), the precursor auxiliary magnetic pole layer pattern 114Y is subjected to the etching process. For example, as shown in FIG. 34, the whole is swung in the width direction only by an angle ω2 of about 225±45 degrees by using, as an axis, the center line T. By the etching process, mainly, priority is given to the etching action in the thickness direction over the etching action in the width direction. By the etching action in the thickness direction, the precursor auxiliary magnetic pole layer pattern 114Y is etched in the depth direction. As a result, as shown in FIGS. 22A and 22B and FIG. 23, the auxiliary magnetic pole layer 114 is formed so as to have the plane shape similar to that of the buffer layer 115 and so as to include, in order from the front, the front end portion 114A and the rear end portion 114B. In the auxiliary magnetic pole layer 114, the rear end portion 114B is formed so as to include a front side portion 114BF which is gradually widened toward the rear and a rear side portion 114BR having the uniform width W2. At the time of forming the auxiliary magnetic pole layer 114, in a manner similar to the control trim, instead of swinging, the whole may be rotated.

At the time of forming the auxiliary magnetic pole layer 114, subsequently, by using the buffer layer 115, the precursor auxiliary magnetic pole layer pattern 114Y, and the precursor non-magnetic layer pattern 113Y as a mask, the precursor non-magnetic layer pattern 114Y is etched together with the precursor main magnetic pole layer 112X. By the etching process, in the precursor non-magnetic layer pattern 113Y used as a mask, the portion covered with the buffer layer 115 is not etched but the portion which is not covered with the buffer layer 115 is selectively etched and recessed in a taper shape so that the width gradually increases. Consequently, according to the shape change in the precursor non-magnetic layer pattern 113Y, in the precursor main magnetic pole layer 112X as well, a portion (covered portion) 112YV which is covered with the buffer layer 115 is not etched but portions (both wing portions) 112YW which are not covered with the buffer layer 115 are selectively etched and patterned so as to be recessed. By the above operation, as shown in FIGS. 22A and 22B and FIG. 23, the main magnetic pole layer 112 is formed so as to include, in order from the front side, the front end portion 112A having the uniform width W1 and the rear end portion 112B having the width W2 larger than the width W1 of the front end portion 112A, and the non-magnetic layer 113 is formed so as to have a plane shape similar to that of the main magnetic pole layer 112. In the main magnetic pole layer 112, the rear end portion 112B is constructed so as to include the front side portion 112BF which is gradually widened from the flare point FP to the rear and the rear side portion 112BR having the uniform width W2, and the front end face E of the rear end portion 112B is gradually inclined with distance from the front end portion 112A.

In the following, an etching process for forming the auxiliary magnetic pole layer 114, non-magnetic layer 113, and main magnetic pole layer 112 will be called "etching trim". By the etching trim, in the peripheral area of the front end portion 112A, the gap layer portion 109C is selectively etched. By the above operation, the stacked structure constructed by the main magnetic pole layer 112, non-magnetic layer 113, and auxiliary magnetic pole layer 114 is completed.

After the main magnetic pole layer 112 is formed, for example, as necessary, to shape the portion corresponding to the uniform width area R1 in the main magnetic pole layer 112, that is, the front end portion 112A, the etching process may be further performed on the front end portion 112A while emitting an ion beam from a direction at an irradiation angle of about 60±10 degrees to the plane extended from the main magnetic pole layer 112 by using ion milling. By the etching process, the shape of the front end portion 112A can be adjusted so that a side face becomes perpendicular to the plane extended from the main magnetic pole layer 112.

In the above, for convenience of explanation, on completion of the series of patterning processes using etching, the main magnetic pole layer 112, non-magnetic layer 113, and auxiliary magnetic pole layer 114 are completed. In practice, however, after completion of the series of patterning processes, the process of forming the air bearing surface 120 is performed and then the main magnetic pole layer 112, non-magnetic layer 113, and auxiliary magnetic pole layer 114 are finally completed.

In the method of manufacturing the thin film magnetic head according to the embodiment, the main magnetic pole layer 112 is formed by the series of patterning processes using the buffer layer 115 and the non-magnetic layer 113 (precursor non-magnetic layer pattern 113Y) having a low etching rate as a stopper layer. Consequently, the thin film magnetic head realizing both high precision in formation of the main magnetic pole layer 112 and proper position of the flare point FP and capable of contributing to improvement in recording performance can be manufactured for the following reason.

In the embodiment, in the process of forming the main magnetic pole layer 112, at the time of forming the main magnetic pole layer 112 by patterning the precursor main magnetic pole layer 112X, the front end portion 112A is formed by using the buffer layer 115 as a mask, and the rear end portion 112B is formed by using the buffer layer 115, precursor auxiliary magnetic pole layer pattern 114Y, and precursor non-magnetic layer pattern 113Y as a mask. Mainly, in formation of the main magnetic pole layer 112, the following two advantages are obtained.

First, at the time of forming the front end portion 112A, under the etching condition that the buffer layer 115 is not easily deformed by the influence of etching, the precursor main magnetic pole layer 112X is patterned by using the buffer layer 115 as a mask. Consequently, the front end portion 112A can be formed with high precision so as to have the small width W1 as an object.

Second, at the time of forming the rear end portion 112B, the covered portion 112YV of the precursor main magnetic pole layer 112X is covered with the precursor non-magnetic layer pattern 113Y of which etching rate is low and, further, covered with the buffer layer 115 of which etching rate is also low. Since the covered portion 112YV is protected by both of he precursor non-magnetic layer pattern 113Y and the buffer layer 115 so as not to be influenced by etching, when the etching process is performed on the precursor main magnetic pole layer 112X, the predetermined position of the front end of the covered portion 112YV (the position in which the front end portion 112A and the rear end portion 112B are connected finally), that is, the position of the flare point FP is prevented from being shifted. On the other hand, the both wing portions 112YW are covered only with the precursor non-magnetic layer pattern 113Y and are not covered with the buffer layer 115. Consequently, when both wings of the precursor non-magnetic layer pattern 113Y are etched and recessed by intentional excessive progress of etching, the both wing portions 112YW are similarly etched in accordance with a change in the shape of the precursor non-magnetic layer pattern 113Y and are therefore recessed so as to be tapered symmetrically with respect to the covered portion 112YV as a center. In such a manner the rear end portion 112B can be formed so as to include the front side portion 112BF of which width increases rearward from the flare point FP.

Therefore, in the embodiment, different from the above-described conventional techniques, by controlling the formation width W1 of the front end portion 112A with high precision and controlling the flare point FP, both of the above-described two points can be realized. Thus, the invention can contribute to improvement in the recording performance from the viewpoint of manufacture of the thin film magnetic head.

In particular, in the embodiment, the precursor buffer layer 115X and the precursor non-magnetic layer pattern 113Y of which etching rate is low function as the stopper layer which suppresses progress of the etching process. Consequently, different from the case where the series of stopper layers are not used, the positional shift of the flare point FP can be prevented from the following two viewpoints.

Figure 35:
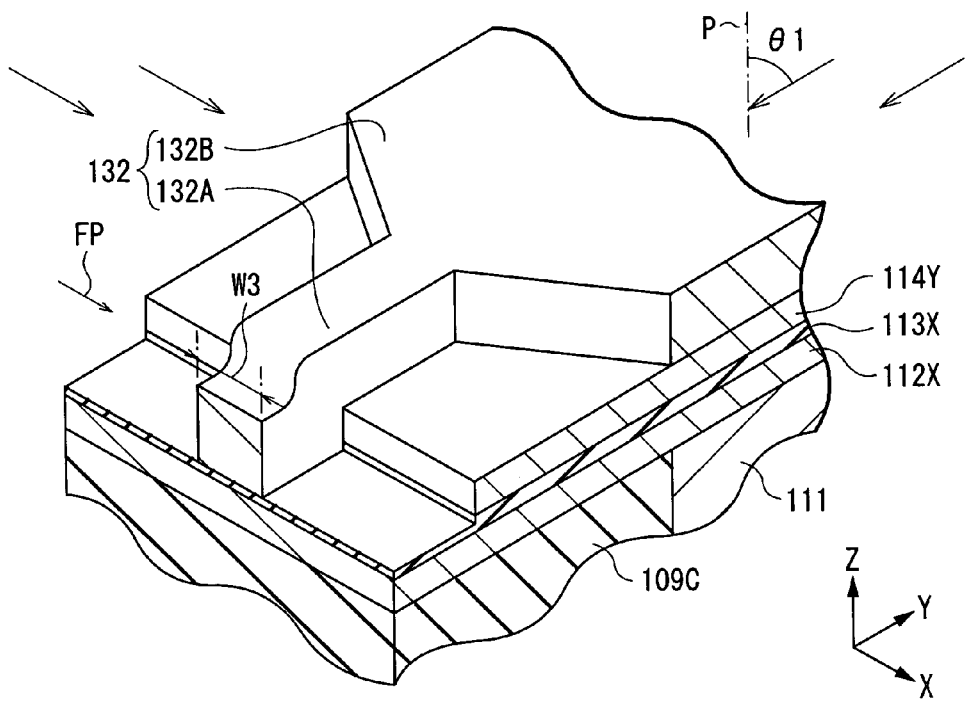
FIG. 35 is a perspective view for explaining a process in a method of manufacturing a thin film magnetic head as a comparative example of the method of manufacturing the thin film magnetic head according to the second embodiment of the invention.
Figure 36:
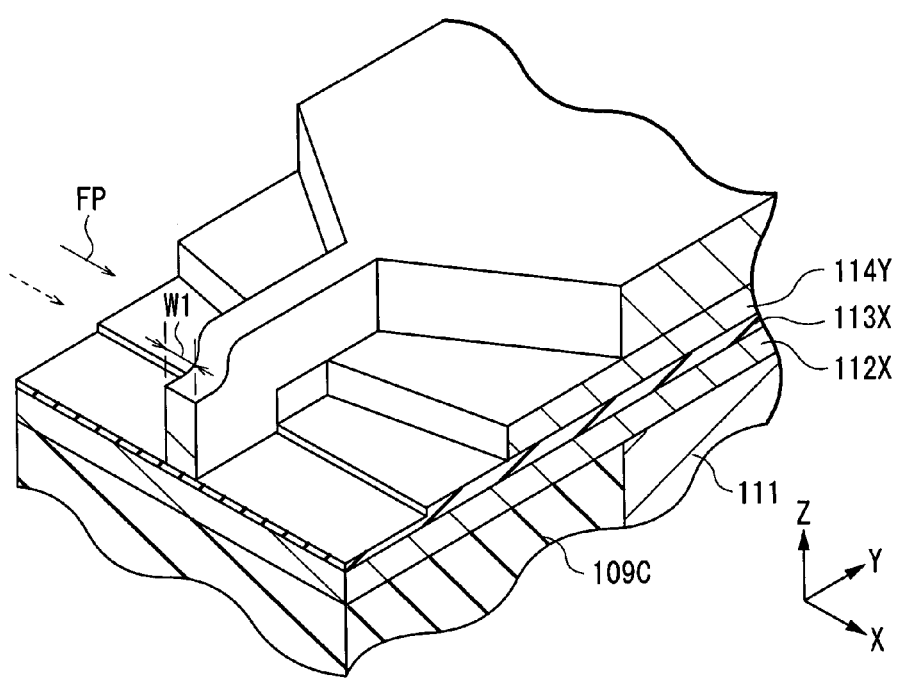
FIG. 36 is a perspective view showing a process subsequent to FIG. 35 and for explaining a problem in the method of manufacturing the thin film magnetic head as a comparative example.

First, when the stopper layer is not used, there is the possibility that the flare point FP is deviated at the time of control trim. Specifically, for example, in the case where the mask layer 132 is directly formed on the precursor auxiliary magnetic pole layer pattern 114Y without forming the precursor buffer layer 115X on the precursor auxiliary magnetic pole layer pattern 114Y as shown in FIG. 35, when the "control trim" is performed on the mask layer 132 under conditions (ion milling and irradiation angle θ1) similar to those in the case shown in FIG. 32, since the precursor buffer layer 115X functioning as a stopper layer does not exist, as shown in FIG. 36, the front end portion 132A is narrowed and, further, the area near the front end of the precursor auxiliary magnetic pole layer pattern 114Y is unintentionally etched along the shape of the mask layer 132. It is therefore feared that the position of the flare point FP is recessed finally. With respect to this point, in the embodiment, the precursor buffer layer 115X functioning as the stopper layer is provided between the precursor auxiliary magnetic pole layer pattern 114Y and the mask layer 132, and the precursor auxiliary magnetic pole layer pattern 114Y is protected by the precursor buffer layer 115X, so that the precursor auxiliary magnetic pole layer pattern 114Y is not easily influenced by the etching at the time of control trim. Therefore, the flare point FP is prevented from being deviated.

Figure 37:
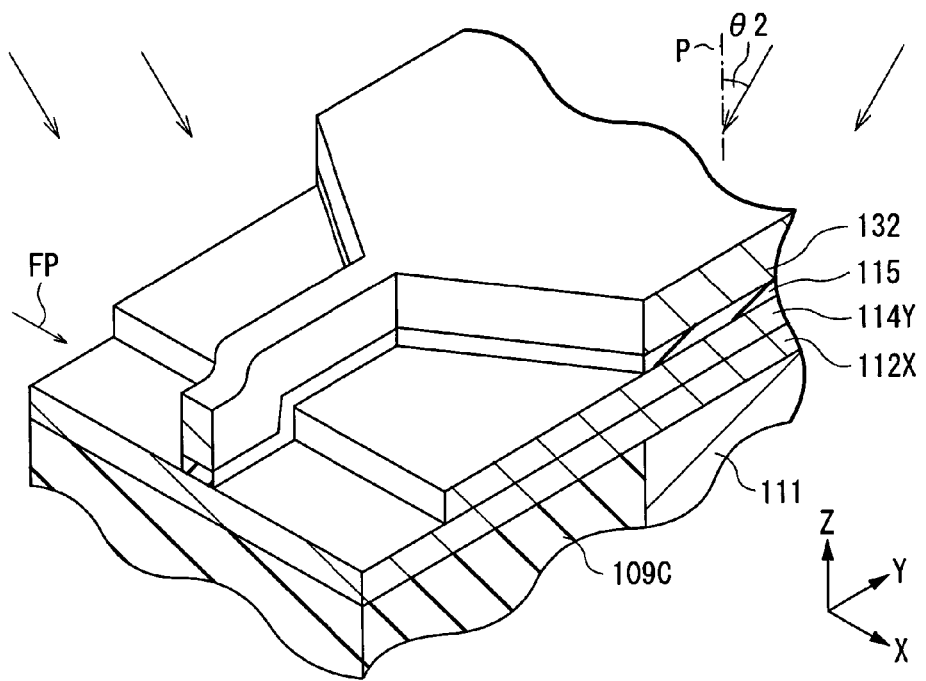
FIG. 37 is a perspective view for explaining a process in a method of manufacturing a thin film magnetic head as another comparative example of the method of manufacturing the thin film magnetic head according to the second embodiment of the invention.
Figure 38:
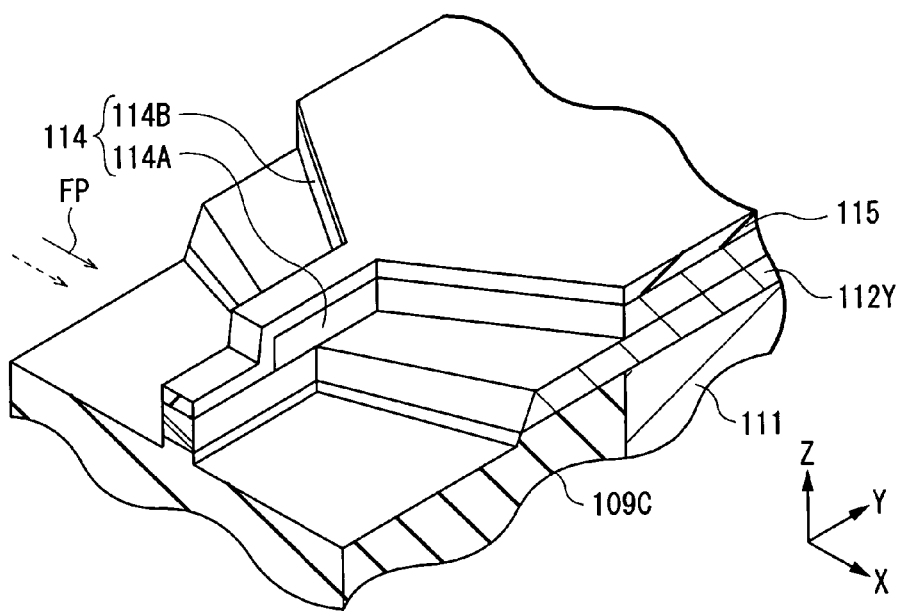
FIG. 38 is a perspective view showing a process subsequent to FIG. 37 and for explaining a problem in a method of manufacturing a thin film magnetic head as another comparative example.

Second, when the stopper layer is not used, there is a fear that the flare point FP is deviated at the time of etching trim. Specifically, for example, when the precursor main magnetic pole layer 112X is patterned by using only the buffer layer 115 as a mask without providing the precursor non-magnetic layer 113X between the precursor main magnetic pole layer 112X and the precursor auxiliary magnetic pole layer pattern 114Y as shown in FIG. 37, if the etching trim is performed on the precursor main magnetic pole layer 112X under conditions (ion milling and irradiation angle θ2) similar to those of the case shown in FIG. 34, since the precursor non-magnetic layer 113X functioning as a stopper layer does not exist, as shown in FIG. 38, there is the possibility that the area near the front end of the precursor main magnetic pole layer 112X is excessively etched along the shape of the buffer layer 115 and the flare point FP is recessed. In contrast, in the embodiment, the precursor non-magnetic layer 113X functioning as a stopper layer is provided between the precursor main magnetic pole layer 112X and the precursor auxiliary magnetic pole layer pattern 114Y, and the precursor main magnetic pole layer 112X is protected by the precursor non-magnetic layer 113X. Consequently, the flare point FP is not easily recessed due to the influence of the etching at the time of etching trim. Thus, the positional deviation of the flare point FP is prevented.

The positional deviation amount of the flare point FP at the time of etching trim in the case of the embodiment in which the precursor non-magnetic layer 113X is provided between the precursor main magnetic pole layer 112X and the precursor auxiliary magnetic pole layer pattern 114Y and that in the case of a comparative example in which the precursor non-magnetic layer 113X is not provided were compared with each other. A standard deviation σ (µm) of the positional deviation amount of the embodiment was 0.024 and that of the comparative example was 0.063. From the above, it was confirmed that the positional deviation amount of the flare point FP in the embodiment is smaller.

In the embodiment, as described above, the main magnetic pole layer 112 is formed so that the rear end portions 112B become symmetrical by the characteristic process using both of the buffer layer 115 and the precursor non-magnetic layer pattern 113Y as a mask. Consequently, for the following reason, an adverse influence on a track area adjacent to a track area to be recorded can be suppressed.

Figure 39:
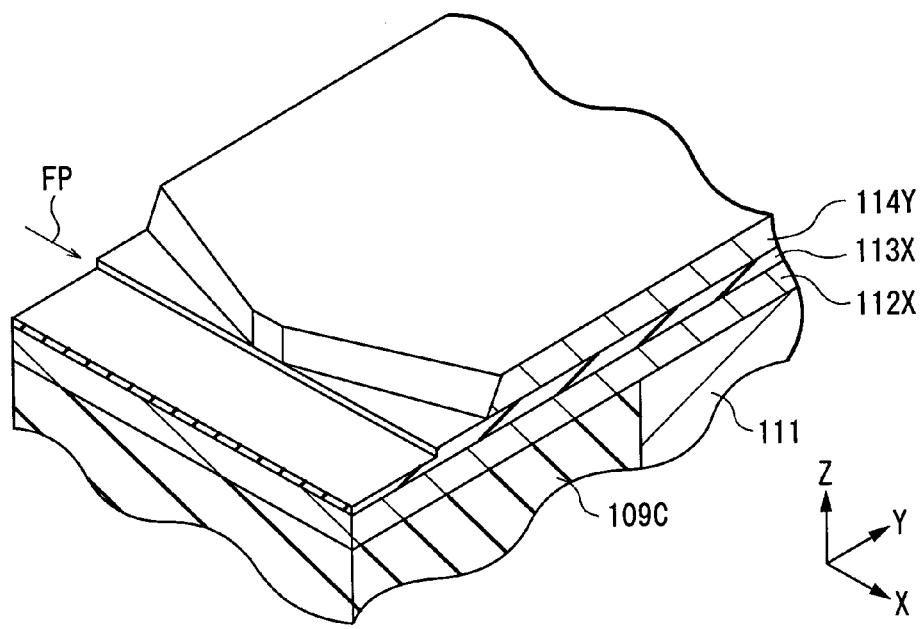
FIG. 39 is a perspective view showing a process in a method of manufacturing a thin film magnetic head as further another comparative example of the method of manufacturing the thin film magnetic head according to the second embodiment of the invention.
Figure 40:
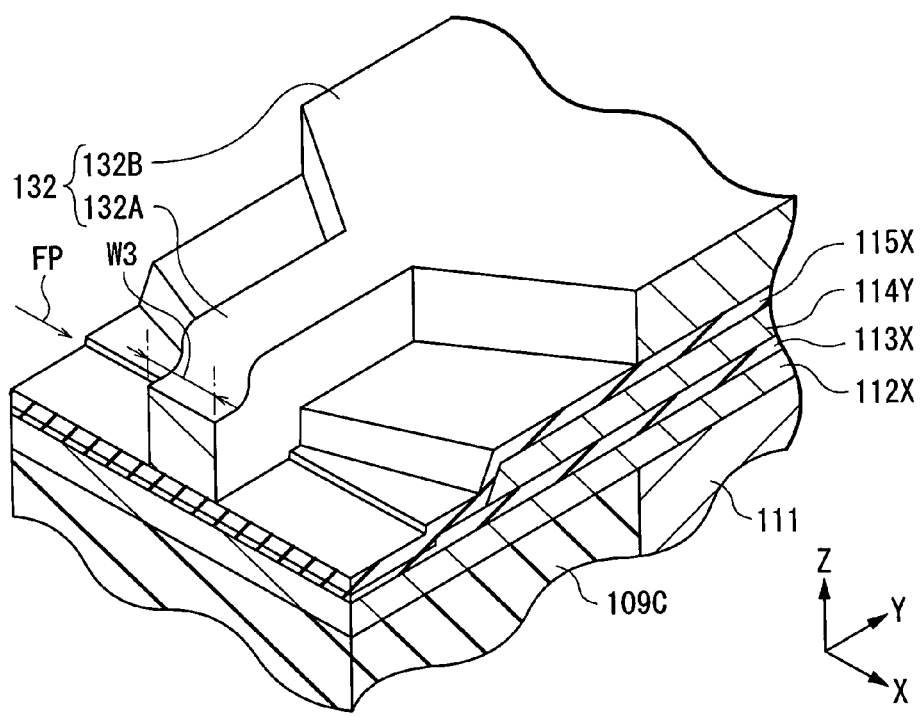
FIG. 40 is a perspective view for explaining a process subsequent to FIG. 39.
Figure 41:
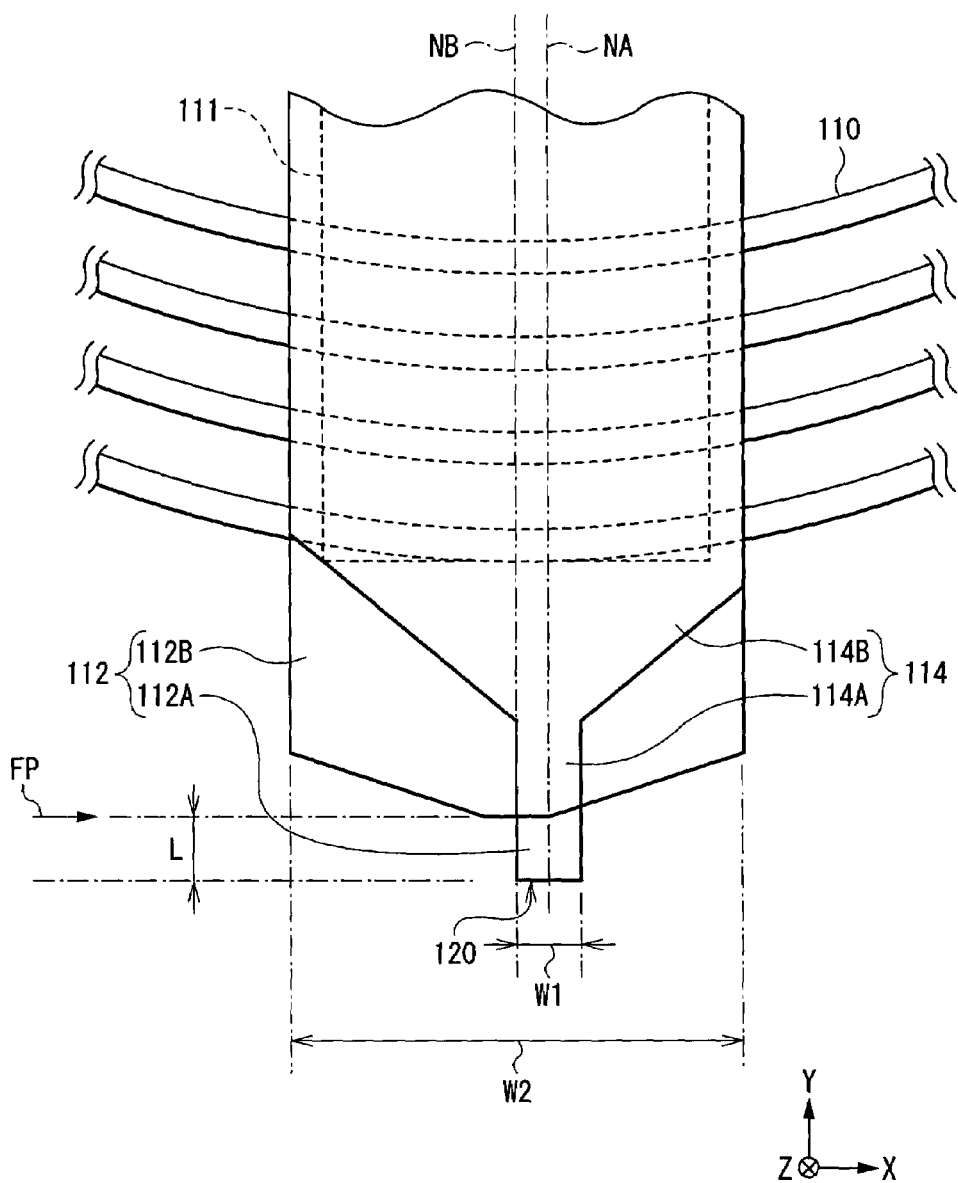
FIG. 41 is a plan view for explaining a problem in a method of manufacturing a thin film magnetic head as further another comparative example.

In the case of forming the main magnetic pole layer 112, to uniform the flow of the magnetic flux in the width direction in the rear end portion 112B when a magnetic flux flows from the wide rear end portion 112B into the narrow front end portion 112A, as shown in FIG. 24, it is necessary to form the rear end portion 112B symmetrical in the width direction and to make the center position NA of the front end portion 112A and the center position NB of the rear end portion 112B coincide with each other. However, in the case of forming the auxiliary magnetic pole layer pattern 114Y so as to have the plane shape corresponding to the rear end portion 112B of the main magnetic pole layer 112 to be formed finally as shown in FIG. 39, after that, sequentially forming the precursor buffer layer 115X and the mask layer 132 on the auxiliary magnetic pole layer pattern 114Y as shown in FIG. 40, and performing the control trim and the subsequent process in order to form the structure similar to the stacked structure (of the main magnetic pole layer 112, non-magnetic layer 113, and auxiliary magnetic pole layer 114) shown in FIG. 23, if the positioning of the mask layer 132 to the auxiliary magnetic pole layer pattern 114Y is not sufficient, as shown in FIG. 41, the center position NA of the front end portion 112A may be deviated from the center position NB of the rear end portion 112B. If a deviation occurs between the center positions NA and NB and the right and left portions of the rear end portion 112B become asymmetrical, the flow of the magnetic flux in the width direction in the rear end portion 112B becomes non-uniform and a leak magnetic field becomes relatively large on one of the sides in the width direction. Consequently, an adverse influence may be exerted on the adjacent track area due to the excessive leak magnetic field.

In contrast, in the embodiment, as shown in FIGS. 34 and 23, the front end portion 112A is formed by the etching trim and the rear end portion 112B is formed by etching the both wing portions 112VW so as to be recessed on the basis of the formation position of the front end portion 112A. Thus, the front end portion 112A is naturally positioned to the rear end portion 112B in the process of forming the main magnetic pole layer 112, and the center position NA of the front end portion 112A and the center position NB of the rear end portion 112B coincide with each other. Thus, the symmetry of the right and left portions of the rear end portion 112B is assured and the flow of the magnetic flux in the width direction of the rear end portion 112B is made uniform. Consequently, as compared with the case where the right and left portions of the rear end portion 112B are asymmetrical, an adverse influence exerted on an adjacent track area is suppressed.

In the embodiment, the mask layer 132 is formed by using the photolithography process. After that, by performing the control trim on the mask layer 132, the front end portion 132A is narrowed. Therefore, the front end portion 132A can be formed so as to have the width W1 smaller than the width W3 which can be realized by using the photolithography process.

In the embodiment, as an etching method for patterning the precursor buffer layer 115X, RIE exhibiting a high etching rate on a hard non-magnetic material such as alumina as the material of the precursor buffer layer 115X is used. Consequently, as compared with the case of using ion milling of a low etching rate, the precursor buffer layer 115X can be patterned in shorter time.

In the embodiment, the precursor main magnetic pole layer 112X and the precursor auxiliary magnetic pole layer 114X are formed by using sputtering. However, the invention is not always limited to the method. For example, a film forming method such as a plating process may be also used in place of sputtering.

Although the invention has been described by the foregoing embodiments, the invention is not limited to the embodiments but can be variously modified. Concretely, although the case of applying the invention to a "single magnetic pole type head" has been described in each of the foregoing embodiments, the invention is not always limited to the case but may be applied to a "ring-type head".

Although the case of applying the invention to the composite thin film magnetic head has been described in each of the foregoing embodiments, the invention is not always limited to the case. The invention can be also applied to, for example, a recording-only thin film magnetic head having an inductive magnetic transducer for recording and a thin film magnetic head having an inductive magnetic transducer for both recording and reproducing. The invention can be also applied to a thin film magnetic head of a structure in which the order of stacking a device for writing and a device for reading is reversed. Further, the invention is not limited to the thin film magnetic head of the perpendicular recording method but can be also applied to a thin film magnetic head of a longitudinal recording method.

As described above, in the thin film magnetic head according to the invention, the auxiliary magnetic pole layer is constructed so as to include the film-thickness-changing portion of which film thickness gradually decreases from a position backward of a one end face recessed from the recording medium facing surface toward the one end face. Consequently, the area of the one end face is smaller as compared with the case where the whole auxiliary magnetic pole layer has a constant film thickness. In the case where the auxiliary magnetic pole layer is set close to the recording medium facing surface, the influence of the magnetic flux concentrated on and around the front end of the auxiliary magnetic pole layer is reduced. Thus, an adverse influence on the perpendicular magnetic field distribution, caused by the magnetic flux flowing in the auxiliary magnetic pole layer is suppressed. Therefore, since the perpendicular magnetic field distribution on the trailing side of the main magnetic pole layer is stabilized, normal recording operation can be assured.

In the method of manufacturing the thin film magnetic head according to the invention, to form the auxiliary magnetic pole layer of the characteristic configuration including the film-thickness-changing portion of which film thickness gradually decreases toward the front end face, only existing thin film processes including the film forming process and the patterning process are used. Therefore, the thin film magnetic head of the invention including the auxiliary magnetic pole layer and capable of assuring a normal recording operation can be easily manufactured.

In the thin film magnetic head of one aspect of the invention, a ratio of the film thickness of the one end face in the film-thickness-changing portion to the film thickness of the film thickness uniform portion lies within a range from 0 to 0.8. By properly setting the film thickness ratio, the intensity of the peak magnetic field in the perpendicular magnetic field distribution increases and the magnetic field gradient is assured. Therefore, also from the viewpoint, the invention can contribute to stabilization of the perpendicular magnetic field distribution.

In the thin film magnetic head according to another aspect of the invention, the ratio of the film thickness lies within the range from 0 to 0.5.

In the thin film magnetic head according to still another aspect of the invention, an angle formed by the slope and an plane extended from the auxiliary magnetic pole layer lies within the range from 15 degrees to 75 degrees. By properly setting the angle, by using the action of narrowing the magnetic flux in the auxiliary magnetic pole layer, the tendency of concentration of the magnetic flux in the auxiliary magnetic pole layer which induces disturbance of the perpendicular magnetic field distribution is suppressed. Therefore, from the viewpoint as well, the invention can contribute to stabilization of the perpendicular magnetic field distribution.

In the method of forming the thin film magnetic head according to one aspect of the invention, a ratio of the film thickness of the one end face in the film-thickness-changing portion to the film thickness of the film thickness uniform portion is set within a range from 0 to 0.8. Thus, at the time of forming the first precursor auxiliary magnetic pole layer pattern by etching the second precursor auxiliary magnetic pole layer pattern, the flare point can be prevented from being deviated from the initial set position due to excessive etching.

In the thin film magnetic head according to the invention, the second main magnetic pole layer portion in the main magnetic pole layer has a main magnetic pole wide portion of which width gradually increases from the width increase position in a direction apart from the width increase position. Consequently, when the magnetic flux flows from the second main magnetic pole layer portion to the first main magnetic pole layer portion in the main magnetic pole layer, the magnetic flux flows into the first main magnetic pole layer portion while being gradually narrowed as the main magnetic pole wide portion is narrowed. By the operation, the magnetic flux saturation in the width increase position is suppressed and the magnetic flux smoothly flows from the second main magnetic pole layer portion to the first main magnetic pole layer portion, so that a sufficient amount of the magnetic flux is supplied to the trailing side portion of the first main magnetic pole layer portion. Therefore, the amount of emission of the magnetic flux increases, thereby assuring the intensity of the perpendicular magnetic field and the magnetic field gradient. Thus, the recording performance can be improved.

In the method of manufacturing the thin film magnetic head of the invention, the main magnetic pole layer is formed by the series of patterning processes using the non-magnetic mask layer and the precursor non-magnetic layer pattern. Therefore, for example, when the non-magnetic mask layer and the precursor non-magnetic layer pattern are formed by using a material of which etching rate is low and used as a stopper layer for suppressing progress of the etching process, both of high precision in formation of the main magnetic pole layer and control of the flare point can be realized. Thus, the invention can contribute to improvement in the recording performance from the viewpoint of manufacture of the thin film magnetic head.

In the thin film magnetic head of one aspect of the invention, an end face on the side close to the recording medium facing surface in the main magnetic pole wide portion is gradually inclined with distance from the first main magnetic pole layer portion. Consequently, an end portion (upper end portion) in the thickness direction of the end face is recessed from the other end portion (lower end portion) toward both wing ends of the end face. With the configuration, the flare point is specified in the most front end position of the other end portion (position closest to the recording medium facing surface). On the other hand, effects similar to those of the case where the second main magnetic pole layer portion is set far from the recording medium facing surface are obtained in one end of the both wings. Thus, while setting the flare point on the side close to the recording medium facing surface, occurrence of the side erase can be suppressed.

In the thin film magnetic head of another aspect of the invention, the second auxiliary magnetic pole layer portion in the auxiliary magnetic pole layer is constructed to have an auxiliary magnetic pole wide portion which is gradually widened from the connection position of the first and second auxiliary magnetic pole layer portions with distance from the position. By an action similar to that of the main magnetic pole wide portion of the main magnetic pole layer, saturation of the magnetic flux flowing from the second auxiliary magnetic pole layer portion to the first auxiliary magnetic pole layer portion in the auxiliary magnetic pole layer is suppressed, so that the magnetic flux smoothly flows from the second auxiliary magnetic pole layer portion into the first auxiliary magnetic pole layer portion. Therefore, from the viewpoint as well, the invention can contribute to improvement in the recording performance.

In the thin film magnetic head of still another aspect of the invention, the main magnetic pole layer is made of a material having a saturated magnetic flux density equal to or higher than a saturated magnetic flux density of the auxiliary magnetic pole layer. Therefore, the amount of holding the magnetic flux in the main magnetic pole layer is increased more than that in the auxiliary magnetic pole layer. Thus, also from the viewpoint of increase in the magnetic flux holding amount, the invention can contribute to assure intensity of the magnetic field for recording.

Obviously many modifications and variations of the present invention are possible in the light of the above teachings. It is therefore to be understood that within the scope of the appended claims, the invention may be practiced otherwise than as specifically described.

What is claimed is:

1. A thin film magnetic head comprising:
a thin film coil for generating a magnetic flux; and
a magnetic pole layer for emitting the magnetic flux generated by the thin film coil toward a recording medium,
the magnetic pole layer having a stacked structure including a main magnetic pole layer disposed so as to be exposed in a recording medium facing surface which faces the recording medium, an auxiliary magnetic pole layer of which one end face is recessed from the recording medium facing surface and which is disposed so as to face a part of the main magnetic pole layer, and a non-magnetic layer disposed so as to be sandwiched between the main magnetic pole layer and the auxiliary magnetic pole layer,
wherein the auxiliary magnetic pole layer includes a film-thickness-changing portion of which film thickness gradually degreases from a position backward of the one end face recessed from the recording medium facing surface toward the one end face.

2. A thin film magnetic head according to claim 1, wherein the auxiliary magnetic pole layer further includes a film thickness uniform portion connected to the rear end of the film thickness changing portion and having a uniform film thickness, and
a ratio of the film thickness of the one end face in the film-thickness-changing portion to the film thickness of the film thickness uniform portion lies within a range from 0 to 0.8.

3. A thin film magnetic head according to claim 2, wherein the one end face of the auxiliary magnetic pole layer has a uniform film thickness and
the ratio of the film thickness lies within the range from 0 to 0.5.

4. A thin film magnetic head according to claim 1, wherein the film-thickness-changing portion has a slope which is positioned in correspondence with an area of which film thickness decreases, and
an angle formed by the slope and an plane extended from the auxiliary magnetic pole layer lies within the range from 15 degrees to 75 degrees.

5. A thin film magnetic head according to claim 1, wherein the magnetic pole layer emits a magnetic flux for magnetizing the recording medium in a direction orthogonal to the surface of the recording medium.

6. A thin film magnetic head comprising:
a thin film coil for generating a magnetic flux;
a magnetic pole layer for emitting the magnetic flux generated by the thin film coil toward a recording medium,
the magnetic pole layer having a plane shape including a uniform width area having a uniform width which specifies a recording track width of a recording medium and a wide area which is wider than the uniform width area and having a stacked structure including: a main magnetic pole layer disposed so that one end face is exposed in a recording medium facing surface which faces the recording medium; an auxiliary magnetic pole layer of which one end face is recessed from the recording medium facing surface and which is disposed so as to face a part of the main magnetic pole layer; and a non-magnetic layer disposed so as to be sandwiched between the main magnetic pole layer and the auxiliary magnetic pole layer and, a return yoke layer for returning a magnetic flux emitted from the magnetic pole layer to the recording medium,
wherein the main magnetic pole layer in the magnetic pole layer includes a first main magnetic pole layer portion extended with a uniform width from the recording medium facing surface in a direction apart from the surface and a second main magnetic pole layer portion connected to the rear end of the first main magnetic pole layer portion and having a width larger than that of the first main magnetic pole layer portion,
a width increase position from which the width of the magnetic pole layer increases from the uniform width area to the wide area is specified by a connection position of the first and second main magnetic pole layer portions, and
the second main magnetic pole layer portion in the main magnetic pole layer has a main magnetic pole wide portion of which width gradually increases from the width increase position in a direction apart from the width increase position.

7. A thin film magnetic head according to claim 6, wherein the main magnetic pole layer is made of a material having a saturated magnetic flux density equal to or higher than a saturated magnetic flux density of the auxiliary magnetic pole layer.

8. A thin film magnetic head according to claim 6, wherein the magnetic pole layer emits a magnetic flux for magnetizing the recording medium in a direction orthogonal to the surface of the recording medium.

9. A thin film magnetic head comprising:
a thin film coil for generating a magnetic flux;
a magnetic pole layer for emitting the magnetic flux generated by the thin film coil toward a recording medium,
the magnetic pole layer having a plane shape including a uniform width area having a uniform width which specifies a recording track width of a recording medium and a wide area which is wider than the uniform width area and having a stacked structure including: a main magnetic pole layer disposed so that one end face is exposed in a recording medium facing surface which faces the recording medium; an auxiliary magnetic pole layer of which one end face is recessed from the recording medium facing surface and which is disposed so as to face a part of the main magnetic pole layer; and a non-magnetic layer disposed so as to be sandwiched between the main magnetic pole layer and the auxiliary magnetic pole layer and, a return yoke layer for returning a magnetic flux emitted from the magnetic pole layer to the recording medium,
wherein the main magnetic pole layer in the magnetic pole layer includes a first main magnetic pole layer portion extended with a uniform width from the recording medium facing surface in a direction apart from the surface and a second main magnetic pole layer portion connected to the rear end of the first main magnetic pole layer portion and having a width larger than that of the first main magnetic pole layer portion, a width increase position from which the width of the magnetic pole layer increases from the uniform width area to the wide area is specified by a connection position of the first and second main magnetic pole layer portions, the second main magnetic pole layer portion in the main magnetic pole layer has a main magnetic pole wide portion of which width gradually increases from the width increase position in a direction apart from the width increase position, and wherein an end face on the side close to the recording medium facing surface of the main magnetic pole wide portion is gradually inclined with distance from the first main magnetic pole layer portion.

10. A thin film magnetic head comprising;

a thin film coil for generating a magnetic flux:

a magnetic pole layer for emitting the magnetic flux generated by the thin film coil toward a recording medium, the magnetic pole layer having a plane shape including a uniform width area having a uniform width which specifies a recording track width of a recording medium and a wide area which is wider than the uniform width area and having a stacked structure including: a main magnetic pole layer disposed so that one end face is exposed in a recording medium facing surface which faces the recording medium; an auxiliary magnetic pole layer of which one end face is recessed from the recording medium facing surface and which is disposed so as to face a part of the main magnetic pole layer; and a non-magnetic layer disposed so as to be sandwiched between the main magnetic pole layer and the auxiliary magnetic pole layer and, a return yoke layer for returning a magnetic flux emitted from the magnetic pole layer to the recording medium, wherein the main magnetic pole layer in the magnetic pole layer includes a first main magnetic pole layer portion extended with a uniform width from the recording medium facing surface in a direction apart from the surface and a second main magnetic pole layer portion connected to the rear end of the first main magnetic pole layer portion and having a width larger than that of the first main magnetic pole layer portion, a width increase position from which the width of the magnetic pole layer increases from the uniform width area to the wide area is specified by a connection position of the first and second main magnetic pole layer portions, the second main magnetic pole layer portion in the main magnetic pole layer has a main magnetic pole wide portion of which width gradually increases from the width increase position in a direction apart from the width increase position, and wherein the auxiliary magnetic pole layer includes:

a first auxiliary magnetic pole layer portion extended with a uniform width from the connection position in the same direction as the direction of extension of the first main magnetic pole layer portion; and a second auxiliary magnetic pole layer portion connected to the rear end of the first auxiliary magnetic pole layer portion and having a width larger than that of the first auxiliary magnetic pole layer portion, and the second auxiliary magnetic pole layer portion in the auxiliary magnetic pole layer has an auxiliary magnetic pole wide portion which is gradually widened from the connection position of the first and second auxiliary magnetic pole layer portions with distance from the position.

11. A thin film magnetic head according to claim 10, wherein a non-magnetic mask layer having a plane shape corresponding to a body obtained by combining the first main magnetic pole layer portion, the first auxiliary magnetic pole layer portion, and the second auxiliary magnetic pole layer portion is adjacent to the magnetic pole layer.

12. A method of manufacturing a thin film magnetic head comprising: a thin film coil for generating a magnetic flux; and a magnetic pole layer for emitting the magnetic flux generated by the thin film coil toward a recording medium, the magnetic pole layer having a stacked structure including a main magnetic pole layer disposed so as to be exposed in a recording medium facing surface which faces the recording medium, an auxiliary magnetic pole layer of which one end face is recessed from the recording medium facing surface and which is disposed so as to face a part of the main magnetic pole layer, and a non-magnetic layer disposed so as to be sandwiched between the main magnetic pole layer and the auxiliary magnetic pole layer, wherein a step of forming the auxiliary magnetic pole layer includes the steps of:

forming a first precursor auxiliary magnetic pole layer pattern as a preparation layer of the auxiliary magnetic pole layer, so as to have an end face including the one end face;

forming a second precursor auxiliary magnetic pole layer pattern so as to include a portion of which film thickness gradually degreases from a position backward of the end face recessed from the recording medium facing surface toward the end face by selectively etching a portion close to the end face in the first precursor auxiliary magnetic pole layer pattern; and forming the auxiliary magnetic pole layer so as to include the one end face and a film-thickness-changing portion of which film thickness gradually decreases from a position backward of the one end face recessed from the recording medium facing surface toward the one end face by patterning the second precursor auxiliary magnetic pole layer pattern by etching while using a mask for etching.

13. A method of manufacturing a thin film magnetic head according to claim 12, wherein the auxiliary magnetic pole layer further includes a film thickness uniform portion connected to the rear end of the film-thickness-changing portion and having a uniform film thickness, and a ratio of the film thickness of the one end face in the film-thickness-changing portion to the film thickness of the film thickness uniform portion lies within a range from 0 to 0.8.

14. A method of manufacturing a thin film magnetic head according to claim 12, wherein the first precursor auxiliary magnetic pole layer pattern is formed by growing a plating film.

15. A method of manufacturing a thin film magnetic head according to claim 12, wherein the first precursor auxiliary magnetic pole layer pattern is etched while being irradiated with an ion beam from a direction at an angle in a range of plus or minus 10 degrees of 35 degrees from a direction orthogonal to a plane extended from the first precursor auxiliary magnetic pole layer pattern by using ion milling.

16. A method of manufacturing a thin film magnetic head comprising:

a thin film coil for generating a magnetic flux, a magnetic pole layer for emitting the magnetic flux generated by the thin film coil toward a recording medium, the magnetic pole layer having a plane shape including a uniform width area having a uniform width which specifies a recording track width of a recording medium and a wide area which is wider than the uniform width area and having a stacked structure pattern including: a main magnetic pole layer disposed so that one end face is exposed in a recording medium facing surface which faces the recording medium; an auxiliary magnetic pole layer of which one end face is recessed from the recording medium facing surface and which is disposed so as to face a part of the main magnetic pole layer; and a non-magnetic layer disposed so as to be sandwiched between the main magnetic pole layer and the auxiliary magnetic pole layer; and a non-magnetic mask layer patterned so as to be adjacent to the magnetic pole layer, wherein a step of forming the magnetic pole layer includes:

a first step of forming and stacking a precursor main magnetic pole layer as a preparation layer of the main magnetic pole layer and a precursor non-magnetic layer as a preparation layer of the non-magnetic layer in accordance with this order;

a second step of forming a precursor auxiliary magnetic pole layer pattern defining the wide area, as a preparation layer of the auxiliary magnetic pole layer in an area corresponding to the wide area on the precursor non-magnetic layer;

a third step of forming a precursor non-magnetic mask layer as a preparation layer of the non-magnetic mask layer on the precursor auxiliary magnetic pole layer pattern and its peripheral area;

a fourth step of forming a mask layer in an area corresponding to both of the uniform width area and the wide area on the precursor non-magnetic mask layer;

a fifth step of forming the non-magnetic mask layer defining the uniform width area by patterning the precursor non-magnetic mask layer by etching by using the mask layer and, subsequently, forming a precursor non-magnetic layer pattern by patterning the precursor non-magnetic layer by etching by using both of the non-magnetic mask layer and the precursor auxiliary magnetic pole layer pattern as a mask; and a sixth step of forming the auxiliary magnetic pole layer by patterning the precursor auxiliary magnetic pole layer pattern by etching using the non-magnetic mask layer, subsequently, forming the non-magnetic layer by etching the precursor non-magnetic layer pattern together with the precursor main magnetic pole layer by using the non-magnetic mask layer, the precursor auxiliary magnetic pole layer pattern, and the precursor non-magnetic layer pattern as a mask to selectively etch both wings of the precursor non-magnetic layer pattern to be recessed so as to be gradually widened, and forming the main magnetic pole layer by patterning the precursor main magnetic pole layer in accordance with a change in the shape of the precursor non-magnetic layer pattern.

17. A method of manufacturing a thin film magnetic head according to claim 16, wherein in the first step, the precursor non-magnetic layer is formed by using a material of which etching rate is lower than that of the precursor auxiliary magnetic pole layer pattern, and in the third step, the precursor non-magnetic mask layer is formed by using a material of which etching rate is lower than that of each of the precursor auxiliary magnetic pole layer pattern and the precursor main magnetic pole layer.

18. A method of manufacturing a thin film magnetic head according to claim 16, wherein in the fourth step, the mask layer is formed and then a portion corresponding to the uniform width area in the mask layer is selectively etched in the width direction, thereby narrowing the portion corresponding to the uniform width area, and in the fifth step, an etching process is performed by using the mask layer having the narrowed portion corresponding to the uniform width area.

19. A method of manufacturing a thin film magnetic head according to claim 18, wherein the mask layer is etched while being irradiated with an ion beam from a direction at an angle in a range of plus or minus 5 degrees of 70 degrees from a direction orthogonal to a plane extended from the mask layer by using ion milling.

20. A method of manufacturing a thin film magnetic head according to claim 16, wherein in the fourth step, the mask layer is formed by growing a plating film.

21. A method of manufacturing a thin film magnetic head according to claim 16, wherein in the sixth step, an etching process is performed while being irradiated with an ion beam from a direction at an angle in a range of plus or minus 10 degrees of 35 degrees from a direction orthogonal to a plane extended from the precursor auxiliary magnetic pole layer pattern by using ion milling.

22. A method of manufacturing a thin film magnetic head according to claim 21, wherein in the sixth step, the main magnetic pole layer is formed, and after that, an etching process is performed on a portion corresponding to the uniform width area in the main magnetic pole layer by irradiating the portion with an ion beam from a direction at an angle in a range of plus or minus 10 degrees of 60 degrees from a direction orthogonal to a plane extended from the main magnetic pole layer by using ion milling.

* * * * *